US012776524B2

(12) United States Patent
Kurokawa et al.

(10) Patent No.: US 12,776,524 B2
(45) Date of Patent: Oct. 27, 2026

(54) CONTROL CIRCUIT OF SECONDARY BATTERY AND ELECTRONIC DEVICE

(71) Applicant: Semiconductor Energy Laboratory Co., Ltd., Kanagawa-ken (JP)

(72) Inventors: Yoshiyuki Kurokawa, Sagamihara (JP); Kazuki Tsuda, Atsugi (JP); Hiromichi Godo, Isehara (JP); Satoru Ohshita, Hadano (JP); Takuro Kanemura, Sapporo (JP); Hidefumi Rikimaru, Tokyo (JP); Takayuki Ikeda, Atsugi (JP); Yuto Yakubo, Atsugi (JP); Shunpei Yamazaki, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 881 days.

(21) Appl. No.: 18/024,198

(22) PCT Filed: Aug. 25, 2021

(86) PCT No.: PCT/IB2021/057775
§ 371 (c)(1),
(2) Date: Mar. 1, 2023

(87) PCT Pub. No.: WO2022/049455
PCT Pub. Date: Mar. 10, 2022

(65) Prior Publication Data

US 2023/0273637 A1 Aug. 31, 2023

(30) Foreign Application Priority Data

Sep. 7, 2020 (JP) ................................ 2020-149603

(51) Int. Cl.
*H03K 17/51* (2006.01)
*H01M 10/42* (2006.01)

(52) U.S. Cl.
CPC ................................ *H01M 10/425* (2013.01)

(58) Field of Classification Search
CPC ...... H03K 17/51; H03K 17/56; H03K 17/687; H03K 17/6871; H03K 17/693;
(Continued)

(56) References Cited

U.S. PATENT DOCUMENTS 4,499,416 A 2/1985 Koike
5,811,993 A * 9/1998 Dennard .................. G05F 3/30 327/54
(Continued)

FOREIGN PATENT DOCUMENTS

CN 102282739 A 12/2011
CN 103135649 A 6/2013
(Continued)

OTHER PUBLICATIONS

International Search Report (Application No. PCT/IB2021/057775) Dated Nov. 9, 2021.
(Continued)

*Primary Examiner* — Long Nguyen
(74) *Attorney, Agent, or Firm* — Husch Blackwell LLP

(57) ABSTRACT

A control circuit of a secondary battery with a novel structure is provided. The control circuit of a secondary battery includes a first transistor, a first voltage generation circuit generating a first voltage, and a second voltage generation circuit generating a second voltage. The first voltage generation circuit includes a second transistor and a first capacitor. The second voltage generation circuit includes a third transistor and a second capacitor. The difference between the first voltage and the second voltage is set in accordance with the threshold voltage of the first transistor. When the first transistor includes a back gate, a voltage retention circuit having a function of retaining the voltage of the back gate is
(Continued)

included. The voltage retention circuit includes a fourth transistor and a third capacitor. The third capacitor includes a ferroelectric layer between a pair of electrodes. The third capacitor retains a voltage applied to the back gate by being applied with a voltage for polarization inversion in the ferroelectric layer.

14 Claims, 32 Drawing Sheets

(58) Field of Classification Search
CPC ............. H01M 10/42; H01M 10/4207; H01M 10/425; H01M 10/4264; H01M 10/44; H01M 10/441; Y02E 60/10; G05F 3/08; G05F 3/10; G05F 3/16; G05F 3/20; G05F 3/205; G05F 3/24; G05F 3/247; H02J 7/02; H02J 7/04; H02J 7/06; G01R 1/28
See application file for complete search history.

(56) References Cited

U.S. PATENT DOCUMENTS

| | | | | |
|---|---|---|---|---|
| 9,188,998 | B2 | 11/2015 | Yano. et al. | |
| 9,231,283 | B2 | 1/2016 | Ikeuchi et al. | |
| 9,678,526 | B2 * | 6/2017 | Motozawa | G05F 3/30 |
| 9,742,356 | B2 | 8/2017 | Takahashi et al. | |
| 9,935,451 | B2 | 4/2018 | Ikeuchi et al. | |
| 10,168,723 | B2 | 1/2019 | Kang | |
| 11,362,647 | B2 | 6/2022 | Okamoto et al. | |
| 2011/0267726 | A1 | 11/2011 | Ikeuchi et al. | |
| 2013/0134954 | A1 | 5/2013 | Yano. et al. | |
| 2016/0079746 | A1 | 3/2016 | Ikeuchi et al. | |
| 2016/0170432 | A1 | 6/2016 | Kang | |
| 2021/0384751 | A1 | 12/2021 | Takahashi et al. | |
| 2021/0391604 | A1 | 12/2021 | Matsuzaki. et al. | |
| 2022/0006309 | A1 | 1/2022 | Takahashi et al. | |
| 2022/0011375 | A1 | 1/2022 | Takahashi et al. | |
| 2022/0045370 | A1 | 2/2022 | Matsuzaki et al. | |
| 2022/0045532 | A1 | 2/2022 | Onuki et al. | |
| 2022/0052387 | A1 | 2/2022 | Takahashi et al. | |
| 2022/0052535 | A1 | 2/2022 | Yamazaki et al. | |
| 2022/0052541 | A1 | 2/2022 | Kozuma et al. | |
| 2022/0077705 | A1 | 3/2022 | Takahashi et al. | |
| 2022/0085427 | A1 | 3/2022 | Tajima et al. | |
| 2022/0094177 | A1 | 3/2022 | Okamoto. et al. | |
| 2022/0102340 | A1 | 3/2022 | Takahashi et al. | |
| 2022/0131392 | A1 | 4/2022 | Isa et al. | |
| 2022/0187871 | A1 | 6/2022 | Yamazaki et al. | |
| 2022/0190398 | A1 | 6/2022 | Ikeda et al. | |
| 2022/0260643 | A1 | 8/2022 | Saito et al. | |
| 2022/0302880 | A1 | 9/2022 | Takahashi et al. | |
| 2023/0100524 | A1 | 3/2023 | Ikeda et al. | |
| 2024/0171158 | A1 * | 5/2024 | Wu | H03K 3/0231 |

FOREIGN PATENT DOCUMENTS

| | | | |
|---|---|---|---|
| CN | 106200733 | A | 12/2016 |
| DE | 3243674 | | 6/1983 |
| GB | 2113877 | | 8/1983 |
| JP | 58-090177 | A | 5/1983 |
| JP | 05-067964 | B | 9/1993 |
| JP | 2010-187532 | A | 8/2010 |
| JP | 2013-109699 | A | 6/2013 |
| JP | 5564955 | | 8/2014 |
| JP | 5867012 | | 2/2016 |
| JP | 2017-175688 | A | 9/2017 |
| JP | 6675243 | | 4/2020 |
| KR | 1998-0032230 | A | 7/1998 |
| KR | 2011-0118766 | A | 11/2011 |
| KR | 2016-0072703 | A | 6/2016 |
| WO | WO 2010/082608 | A1 | 7/2010 |
| WO | WO 2017/164023 | A1 | 9/2017 |

OTHER PUBLICATIONS

Written Opinion (Application No. PCT/IB2021/057775) Dated Nov. 9, 2021.

* cited by examiner

FIG. 21A
Intermediate state
New crystalline phase
| Amorphous | Crystalline | Crystal |
|---|---|---|
| ・completely amorphous | ・CAAC<br>・nc<br>・CAC<br>excluding single crystal and poly crystal | ・single crystal<br>・poly crystal |
FIG. 21B
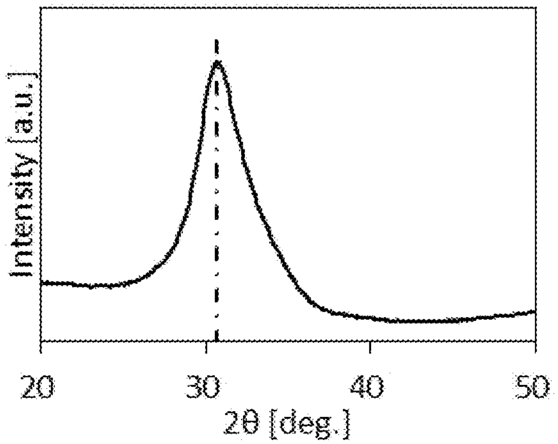
FIG. 21C
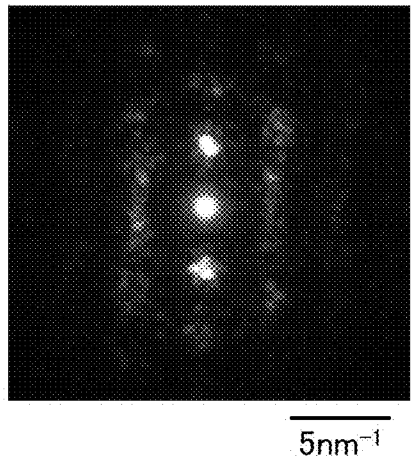

CONTROL CIRCUIT OF SECONDARY BATTERY AND ELECTRONIC DEVICE

This application is a 371 of international application PCT/IB2021/057775 filed on Aug. 25, 2021 which is incorporated herein by reference.

TECHNICAL FIELD

One embodiment of the present invention relates to a control circuit of a secondary battery and the like.

Note that one embodiment of the present invention is not limited to the above technical field. Examples of the technical field of one embodiment of the present invention disclosed in this specification and the like include a semiconductor device, an imaging device, a display device, a light-emitting device, a power storage device, a memory device, a display system, an electronic device, a lighting device, an input device, an input/output device, a driving method thereof, and a manufacturing method thereof. Note that a semiconductor device generally means a device that utilizes semiconductor characteristics, and a control circuit of a secondary battery is a semiconductor device.

BACKGROUND ART

Secondary batteries (also referred to as power storage devices) have been utilized in a wide range of areas from small electronic devices to automobiles.

The secondary battery is provided with a control circuit for charge and discharge management to prevent abnormality in charging and discharging, such as overdischarge, overcharge, overcurrent, or a short circuit. The control circuit obtains data such as voltage or current for charge and discharge management of the secondary battery. The control circuit controls charge and discharge on the basis of the observed data.

Patent Document 1 discloses a protective monitor circuit functioning as a control circuit of a secondary battery. Patent Document 1 discloses the protective monitor circuit that detects abnormality in charging and discharging by comparing, using a plurality of comparators provided inside, a reference voltage and a voltage of a terminal to which a secondary battery is connected.

Patent Document 2 discloses a control device performing trickle charge for compensation for a decrease in secondary battery that is due to self-discharge of the secondary battery. Patent Document 2 discloses the control device that sets the upper limit voltage and the lower limit voltage, and performs control for repeating a charged state and a cutoff state within the set voltage range.

REFERENCE

Patent Document

[Patent Document 1] United States Patent Application Publication No. 2011/267726

[Patent Document 2] Japanese Published Patent Application No. 2017-175688

SUMMARY OF THE INVENTION

Problems to be Solved by the Invention

The self-discharge amount of a secondary battery depends on temperature at which the secondary battery is used, deterioration over time, or the like. For example, in a high-temperature environment, the self-discharge amount increases. Therefore, each of the upper limit voltage and the lower limit voltage that are set by a control circuit need to be switched in accordance with the environment in which the secondary battery is used. In this case, a plurality of voltages for setting the upper limit voltage and the lower limit voltage are needed. The plurality of voltages are generated in a constant voltage generation circuit that generates a desired voltage by resistance division. The generated voltages are set as the upper limit voltage and the lower limit voltage, and compared with the voltage of the secondary battery. A plurality of comparators (comparison circuits) are needed for comparing the plurality of voltages with the voltage of the secondary battery. In the case of a control circuit including a constant voltage generation circuit that generates a plurality of voltages and a plurality of comparators, power consumption might increase.

An object of one embodiment of the present invention is to provide a novel control circuit of a secondary battery and the like. Another object of one embodiment of the present invention is to provide a control circuit of a secondary battery and the like that have novel structures and can reduce power consumption.

Note that the objects of one embodiment of the present invention are not limited to the objects listed above. The objects listed above do not preclude the existence of other objects. Note that the other objects are objects that are not described in this section and will be described below. The objects that are not described in this section are derived from the description of the specification, the drawings, and the like and can be extracted as appropriate from the description by those skilled in the art. Note that one embodiment of the present invention is to solve at least one of the objects listed above and/or the other objects.

Means for Solving the Problems

One embodiment of the present invention is a control circuit of a secondary battery in which a first transistor, a first voltage generation circuit generating a first voltage, and a second voltage generation circuit generating a second voltage are included; the first voltage generation circuit includes a second transistor and a first capacitor; the second voltage generation circuit includes a third transistor and a second capacitor; and the difference between the first voltage and the second voltage is set in accordance with the threshold voltage of the first transistor.

One embodiment of the present invention is a control circuit of a secondary battery in which a first transistor, a first voltage generation circuit generating a first voltage, a second voltage generation circuit generating a second voltage, and a voltage retention circuit are included; the first voltage generation circuit includes a second transistor and a first capacitor; the second voltage generation circuit includes a third transistor and a second capacitor; the first transistor includes a back gate; the voltage retention circuit has a function of retaining a voltage of the back gate; and the difference between the first voltage and the second voltage is set in accordance with the threshold voltage of the first transistor.

In the control circuit of a secondary battery of the above embodiment of the present invention, it is preferable that the voltage retention circuit include a fourth transistor and a third capacitor; the third capacitor include a ferroelectric layer between a pair of electrodes; and the third capacitor retain a voltage applied to the back gate by being applied with a voltage for polarization inversion in the ferroelectric layer.

In the control circuit of a secondary battery of the above embodiment of the present invention, the ferroelectric layer preferably contains hafnium oxide and/or zirconium oxide.

In the control circuit of a secondary battery of the above embodiment of the present invention, the first transistor to the third transistor contain oxide semiconductors in their channels.

In the control circuit of a secondary battery of the above embodiment of the present invention, the first transistor to the third transistor contain silicon in their channels.

One embodiment of the present invention is an electric device including the above control circuit of a secondary battery, a secondary battery, and a housing.

Note that other embodiments of the present invention are shown in the description of the following embodiments and the drawings.

Effect of the Invention

With one embodiment of the present invention, a novel control circuit of a secondary battery and the like can be provided. Another embodiment of the present invention can provide a control circuit of a secondary battery and the like that have novel structures and can reduce power consumption.

Note that the effects of one embodiment of the present invention are not limited to the effects listed above. The effects listed above do not preclude the existence of other effects. Note that the other effects are effects that are not described in this section and will be described below. The effects that are not described in this section are derived from the description of the specification, the drawings, and the like and can be extracted from the description by those skilled in the art. Note that one embodiment of the present invention has at least one of the effects listed above and/or the other effects. Accordingly, depending on the case, one embodiment of the present invention does not have the effects listed above in some cases.

BRIEF DESCRIPTION OF THE DRAWINGS

FIG. 21A is a diagram showing classifications of crystal structures of IGZO, FIG. 21B is a diagram showing an XRD spectrum of crystalline IGZO, and FIG. 21C is a diagram showing a nanobeam electron diffraction pattern of the crystalline IGZO.

MODE FOR CARRYING OUT THE INVENTION

Figure 1A:
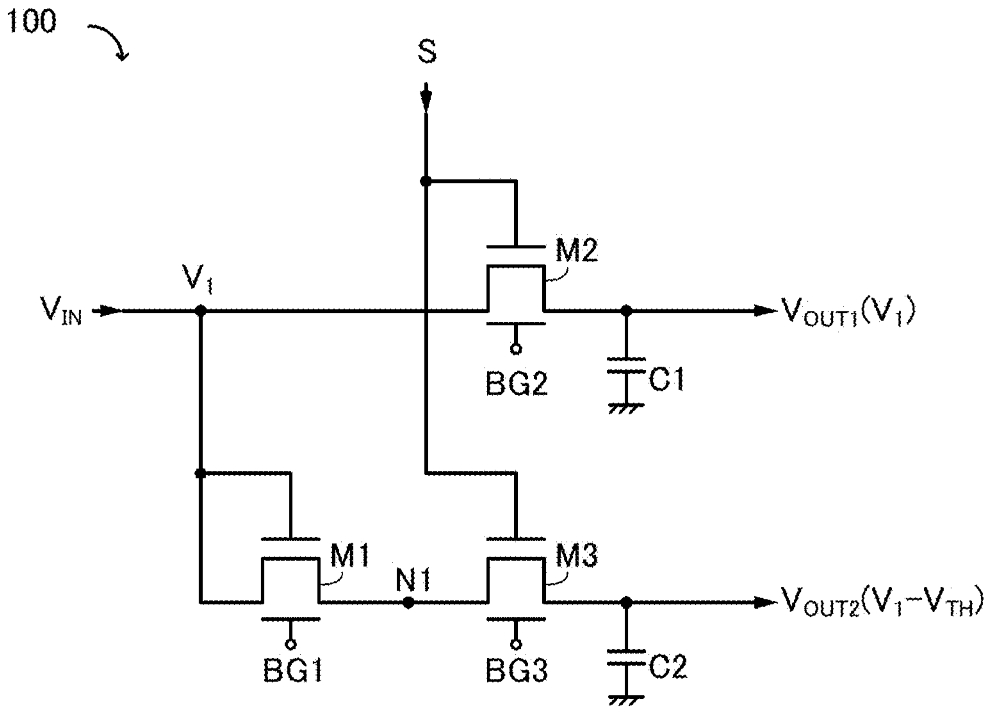
FIG. 1A and FIG. 1B are diagrams showing a structure example of a semiconductor device.

Embodiments will be described below with reference to the drawings. Note that the embodiments can be implemented with many different modes, and it is readily understood by those skilled in the art that modes and details thereof can be changed in various ways without departing from the spirit and scope thereof. Thus, the present invention should not be construed as being limited to the following description of the embodiments.

In addition, ordinal numbers such as “first”, “second”, and “third” in this specification and the like are used to avoid confusion among components. Thus, the ordinal numbers do not limit the number of components. Furthermore, the ordinal numbers do not limit the order of components. For example, a “first” component in one embodiment in this specification and the like can be referred to as a “second” component in other embodiments, or the scope of claims. For another example, a “first” component in one embodiment in this specification and the like can be omitted in other embodiments, or the scope of claims.

Note that in the drawings, the same elements, elements having similar functions, elements formed of the same material, elements formed at the same time, or the like are sometimes denoted by the same reference numerals, and repeated description thereof is omitted in some cases.

In this specification and the like, a metal oxide is an oxide of a metal in a broad sense. Metal oxides are classified into an oxide insulator, an oxide conductor (including a transparent oxide conductor), an oxide semiconductor (also simply referred to as an OS), and the like. For example, in the case where a metal oxide is used in an active layer of a transistor, the metal oxide is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor. In the case where an OS FET or an OS transistor is mentioned, it can also be referred to as a transistor including a metal oxide or an oxide semiconductor.

Embodiment 1

A structure of a control circuit of a secondary battery is described with reference to FIG. 1 to FIG. 9.

FIG. 1A illustrates a structure of a semiconductor device 100 included in the control circuit of a secondary battery. The semiconductor device 100 is a circuit that can be used as the control circuit of a secondary battery. The semiconductor device 100 includes a transistor M1, a transistor M2, a transistor M3, a capacitor C1, and a capacitor C2. The semiconductor device 100 is supplied with an input voltage $V_{IN}$ and has a function of outputting an output voltage $V_{OUT1}$ and an output voltage $V_{OUT2}$.

The input voltage $V_{IN}$ is supplied to a gate and one of a source and a drain of the transistor M1 and one of a source and a drain of the transistor M2. A selection signal S is supplied to a gate of the transistor M2 and a gate of the transistor M3. The other of the source and the drain of the transistor M1 is electrically connected to one of a source and a drain of the transistor M3. The other of the source and the drain of the transistor M2 is connected to the capacitor C1 and supplies the output voltage $V_{OUT1}$. The other of the source and the drain of the transistor M3 is connected to the capacitor C2 and supplies the output voltage $V_{OUT2}$.

A back gate potential BG1 is supplied to a back gate of the transistor M1. A back gate potential BG2 is supplied to a back gate of the transistor M2. A back gate potential BG3 is supplied to a back gate of the transistor M3. The back gate potential BG1 is a potential for controlling the threshold voltage ($V_{TH}$) of the transistor M1. The back gate potentials BG2 and BG3 are potentials for controlling leakage currents (off-state currents) flowing when the transistors M2 and M3 are turned off so that electric charge retained in the capacitor C1 and the capacitor C2 can be retained. The selection signal S is a signal for, when the transistors M2 and M3 are made to operate as switches, switching between on and off.

When the input voltage $V_{IN}$ is V1, the output voltage $V_{OUT1}$ is V1. In addition, the output voltage $V_{OUT2}$ is $V_1$-$V_{TH}$ corresponding to V1 decreased by the threshold voltage $V_{TH}$ of the transistor M1. That is, the semiconductor device 100 has a function of generating the input voltage V1 and $V_1$-$V_{TH}$ that corresponds to V1 decreased by the threshold voltage $V_{TH}$ of the transistor M1.

In one embodiment of the present invention, the generated voltages are retained when the transistor M1 to the transistor M3 are turned off. As each of the transistor M1 to the transistor M3, a transistor whose channel formation region contains silicon (hereinafter, referred to as a Si transistor), and/or a transistor whose channel formation region contains an oxide semiconductor (hereinafter, referred to as an OS transistor) can be used. In particular, the transistor M1 to the transistor M3 are preferably formed using OS transistors.

Note that silicon used in a channel formation region of a Si transistor can be, for example, amorphous silicon (sometimes referred to as hydrogenated amorphous silicon), microcrystalline silicon, polycrystalline silicon, or single crystal silicon. Furthermore, other than OS transistors and Si transistors, transistors each containing Ge or the like in a channel formation region, transistors each containing a compound semiconductor such as ZnSe, CdS, GaAs, InP, GaN, or SiGe in a channel formation region, transistors each containing a carbon nanotube in a channel formation region, transistors each containing an organic semiconductor in a channel formation region, or the like can be used as the transistor M1 to the transistor M3.

In the structure of one embodiment of the present invention, OS transistors are used as the transistor M1 to the transistor M3; thus, electric charge corresponding to the output voltage $V_{OUT1}$ and the output voltage $V_{OUT2}$ can be retained in the capacitors C1 and C2 by utilizing extremely low off-state currents.

An OS transistor can freely be placed by being stacked over a circuit using a Si transistor or the like, which facilitates integration. As the silicon, amorphous silicon (referred to as hydrogenated amorphous silicon in some cases), microcrystalline silicon, polycrystalline silicon, single crystal silicon, or the like can be used, for example. Furthermore, an OS transistor can be fabricated with a manufacturing apparatus similar to that for a Si transistor and thus can be fabricated at low cost.

Furthermore, electrical characteristics of the OS transistor are better than those of a Si transistor in a high-temperature environment. Specifically, the ratio between an on-state current and an off-state current is large even at a high temperature higher than or equal to 100° C. and lower than or equal to 200° C., preferably higher than or equal to 125° C. and lower than or equal to 150° C.; hence, favorable switching operation can be performed.

Figure 1B:
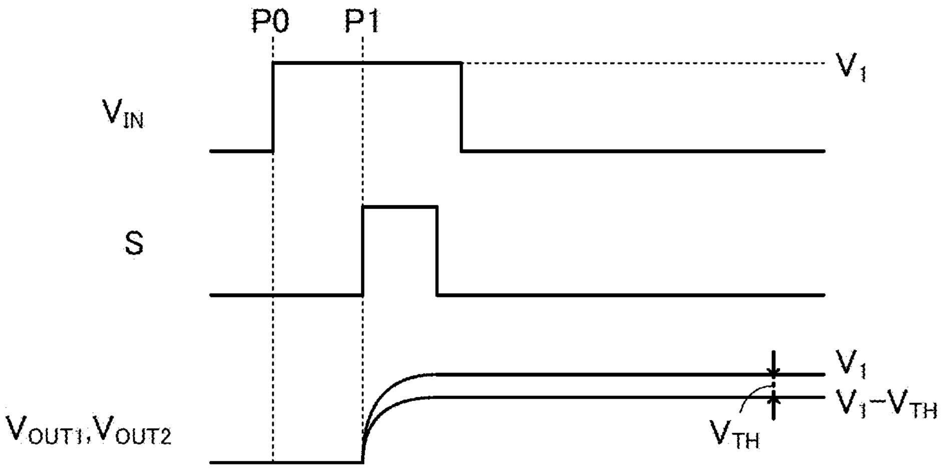
Figure 2A:
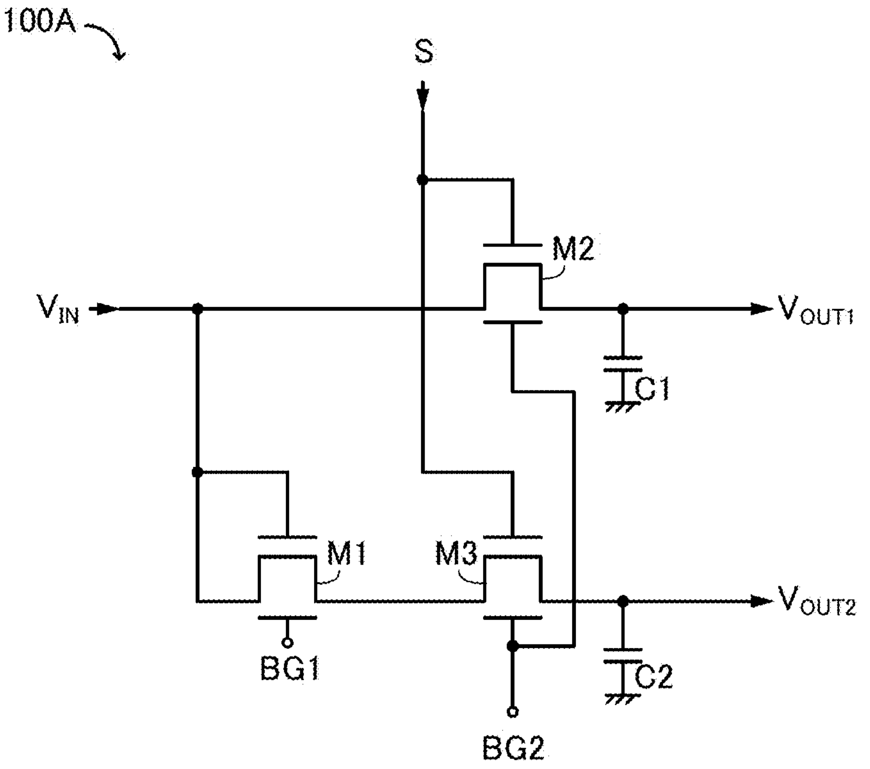
FIG. 2A and FIG. 2B are diagrams illustrating structure examples of semiconductor devices.
Figure 2B:
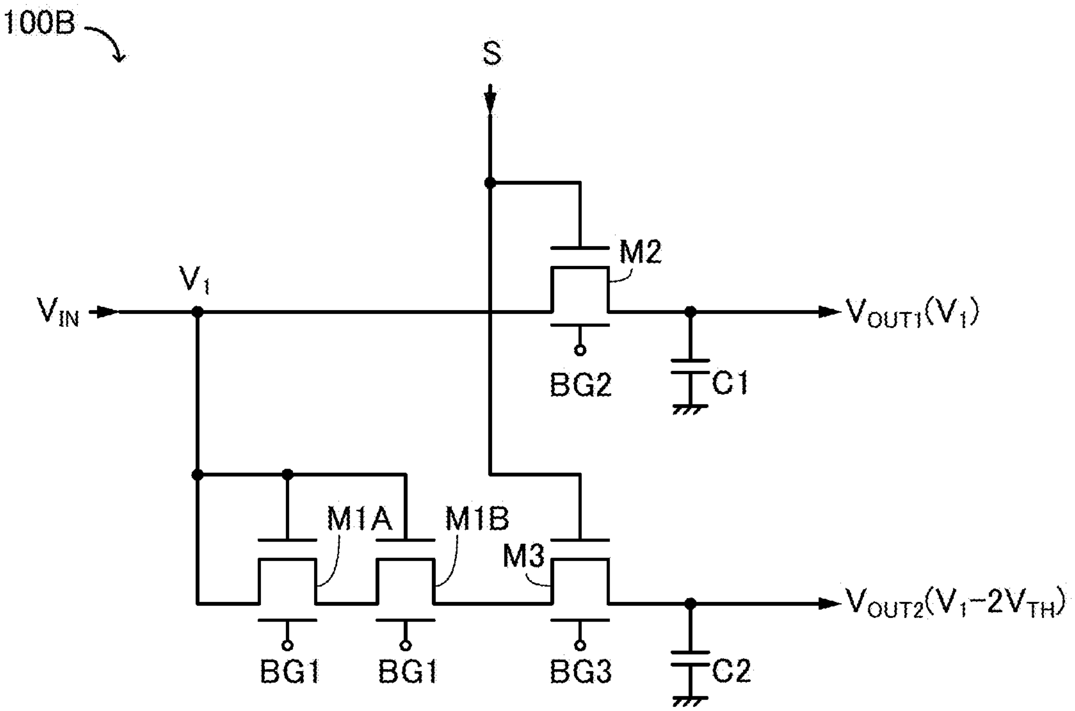

FIG. 1B shows a diagram explaining the operation of the semiconductor device 100 included in the control circuit of a secondary battery. Note that the description of FIG. 1B is made on the assumption that the transistor M1 to the transistor M3 are n-channel transistors, i.e., the transistors are turned on when the signal is at H level and are turned off when the signal is at L level. FIG. 1B shows states of the input voltage $V_{IN}$, the selection signal S, the output voltage $V_{OUT1}$, and the output voltage $V_{OUT2}$.

When the input voltage $V_{IN}$ is the voltage $V_1$ at Time P0, a current flows through the transistor M1. A node between the transistor M1 and the transistor M3 (a node N1 in FIG. 1A) has $V_1$-$V_{TH}$ that is a potential corresponding to the voltage $V_1$ decreased by the threshold voltage ($V_{TH}$) of the transistor M1.

When the selection signal is set at H level at Time P1, currents flow through the transistor M2 and the transistor M3, e.g., the transistors are turned on. The capacitor C1 and the capacitor C2 are charged, so that the output voltage $V_{OUT1}$ becomes $V_1$ and the output voltage $V_{OUT2}$ becomes $V_1$-$V_{TH}$. The semiconductor device 100 can have a structure in which the voltage of the input voltage $V_{IN}$ and the voltage decreased by the threshold voltage ($V_{TH}$) of the transistor M1 are output. That is, in the semiconductor device 100, the transistor M2 and the capacitor C1, and the transistors M1 and M3 and the capacitor C2 can function as separate constant voltage generation circuits generating different voltages. Note that the voltage difference between a pair of constant voltage generation circuits is the threshold voltage of the transistor M1; thus, the voltage output from the pair of constant voltage generation circuits can be adjusted by adjusting the threshold voltage of the transistor M1.

Furthermore, although the semiconductor device 100 is illustrated to have a structure in which the back gate potential BG2 and the back gate potential BG3 are supplied from the different terminals, another structure may be employed. For example, as in a semiconductor device 100A illustrated in FIG. 2A, the back gate potential BG2 may be supplied, as a common potential, to the back gate of the transistor M2 and the back gate of the transistor M3. With the structure, a wiring for supplying a back gate potential cab be short.

The output voltage $V_{OUT1}$ and the output voltage $V_{OUT2}$ shown in FIG. 1A and FIG. 1B can be used for a control circuit for preventing overcharge, overdischarge, or the like of a secondary battery such as a lithium-ion battery. A control circuit of a secondary battery has a function of generating a signal for cutting off an electrical connection between the secondary battery and a load (e.g., an electronic device such as a portable terminal) or between the secondary battery and a charger in the case where the voltage of the secondary battery exceeds a desired voltage or is lower than the desired voltage. The output voltage $V_{OUT1}$ and the output voltage $V_{OUT2}$ can be used as the upper limit voltage and the lower limit voltage for determining overcharge, overdischarge, or the like of the secondary battery.

With the structure, a constant voltage generation circuit generating a desired voltage as a reference voltage such as the upper limit voltage or the lower limit voltage can be small. When the constant voltage generation circuit has a structure in which a desired voltage is generated by resistance division of a voltage generated in a regulator, a digital-analog converter circuit (DAC), or the like, power consumption might increase. In particular, when a plurality of reference voltages such as the upper limit voltages and the lower limit voltages are needed in accordance with a temperature change, a constant voltage generation circuit generating a plurality of desired voltages is needed; in the structure of one embodiment of the present invention, the threshold voltage of the transistor can correspond to the difference between the upper limit voltage and the lower limit voltage, and the output voltage $V_{OUT1}$ and the output voltage $V_{OUT2}$ that are generated can be retained in the capacitors, and thus a circuit such as a DAC generating a voltage can be intermittently operated.

According to one embodiment of the present invention, a plurality of combinations of the upper limit voltage and the lower limit voltage can be generated. In order to prevent overcharge, a voltage for an operation in which charge is stopped when the voltage of a secondary battery exceeds the upper limit voltage of overcharge, and next charge is allowed when the voltage of the secondary battery is lower than the lower limit voltage of overcharge can be changed with an input voltage and the threshold voltage of a transistor; therefore, the on or off of charge can be optimized, and thus a load on the secondary battery can be reduced. Similarly, the on or off of discharge can be optimized, and thus the load on the secondary battery can be reduced.

Although the semiconductor device 100 is illustrated to have a structure in which one transistor functioning as the transistor M1 is included, another structure may be employed. For example, as in a semiconductor device 100B illustrated in FIG. 2B, a transistor M1A and a transistor M1B may function as the transistor M1. With the structure, the semiconductor device 100B can have a structure in which the voltage of the input voltage $V_{IN}$ and the voltage decreased by two threshold voltages ($2V_{TH}$) of the transistors M1A and M1B are output. That is, as the output voltages from the semiconductor device 100B functioning as the constant voltage generation circuit, the output voltage $V_{OUT1}$ can be $V_1$, and the output voltage $V_{OUT2}$ can be $V_1$-$2V_{TH}$.

In the case where the semiconductor device 100 is made to function as a constant voltage generation circuit generating a desired voltage, a structure is preferable in which the threshold voltage $V_{TH}$ of the transistor M1 corresponding to the difference between the output voltage $V_{OUT1}$ and the output voltage $V_{OUT2}$ is controlled. For example, in a semiconductor device 100C illustrated in FIG. 3, a voltage retention circuit VC has a function of retaining and controlling the back gate potential BG1 of the transistor M1.

When the voltage retention circuit VC that retains and controls the back gate potential BG1 of the transistor M1 is provided, a voltage generation circuit generating the back gate potential BG1 can be intermittently operated. Accordingly, power consumption of a control circuit of a secondary battery including a semiconductor device can be reduced. Furthermore, with a structure in which the back gate potential BG1 of the transistor M1 is adjusted, the threshold voltage $V_{TH}$ of the transistor M1 can be adjusted. Therefore, $V_1$-$V_{TH}$ generated as the output voltage $V_{OUT2}$ can be adjusted.

Figure 3:
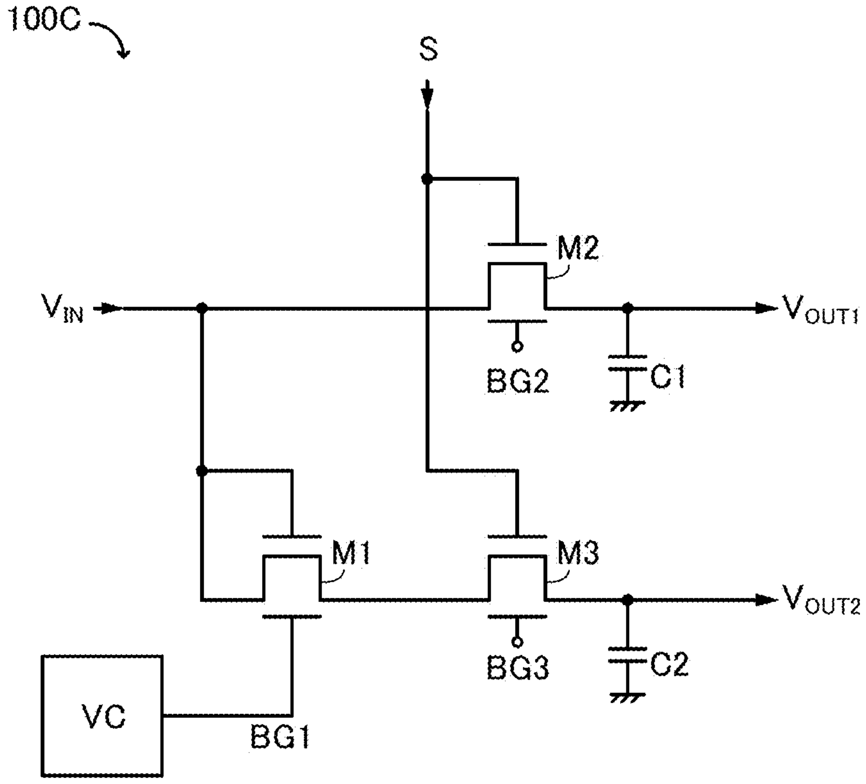
FIG. 3 is a diagram illustrating a structure example of a semiconductor device.

Structure examples of the voltage retention circuit VC illustrated in FIG. 3 are described with reference to FIG. 4A to FIG. 4C and FIG. 5.

Figure 4A:
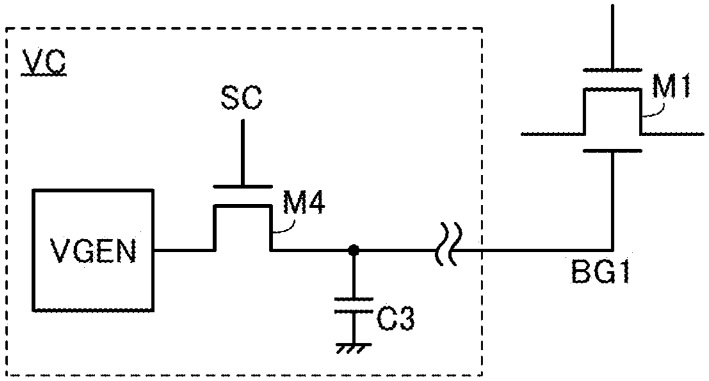
FIG. 4A, FIG. 4B, and FIG. 4C are diagrams illustrating structure examples of a semiconductor device.

The voltage retention circuit VC illustrated in FIG. 4A includes a voltage generation circuit VGEN, a transistor M4, and a capacitor C3. A signal SC for controlling the on or off of the transistor M4 functioning as a switch is supplied to a gate of the transistor M4. One of a source and a drain of the transistor M4 is connected to the voltage generation circuit VGEN. The other of the source and the drain of the transistor M4 is connected to the back gate of the transistor M1. The capacitor C3 is provided to retain the back gate potential BG1 supplied to the back gate of the transistor M1.

The transistor M4 is preferably an OS transistor. With a structure in which an OS transistor is used as the transistor M4, electric charge corresponding to the back gate potential BG1 can be retained in the capacitor C3 by utilizing an extremely low off-state current. Furthermore, when the electric charge corresponding to the back gate potential BG1 is retained in the capacitor C3, power supply to the voltage generation circuit VGEN can be intermittently performed, and thus power consumption can be reduced.

An OS transistor can be provided over a circuit formed using a Si transistor. The voltage generation circuit VGEN can be formed using a Si transistor, and the transistor M4 and the capacitor C3 can be provided thereover. Therefore, the voltage retention circuit VC can be downsized.

The capacitor C3 illustrated in FIG. 4A preferably has a structure in which a ferroelectric layer is included between a pair of electrodes. A capacitor including a ferroelectric layer can retain a voltage applied to a back gate by being applied with a voltage for polarization inversion. Furthermore, a capacitor including a ferroelectric layer can have a large capacitance value, and thus a large amount of electric charge can be accumulated. Therefore, a potential change due to electric charge leakage from the capacitor C3 can be small. The back gate potential BG1 supplied from the voltage generation circuit VGEN can be retained for a long period. Thus, the period during intermittently stopping power supply to the voltage generation circuit VGEN is made longer, and power consumption can be reduced.

Figure 4B:
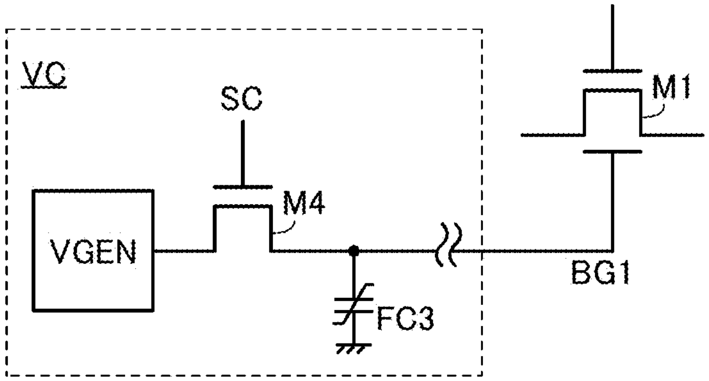

FIG. 4B illustrates a structure in which a capacitor FC3 including a ferroelectric layer is used instead of the capacitor C3 illustrated in FIG. 4A. The capacitor FC3 in FIG. 4B is illustrated as a symbol of the inclusion of a ferroelectric layer.

Figure 4C:
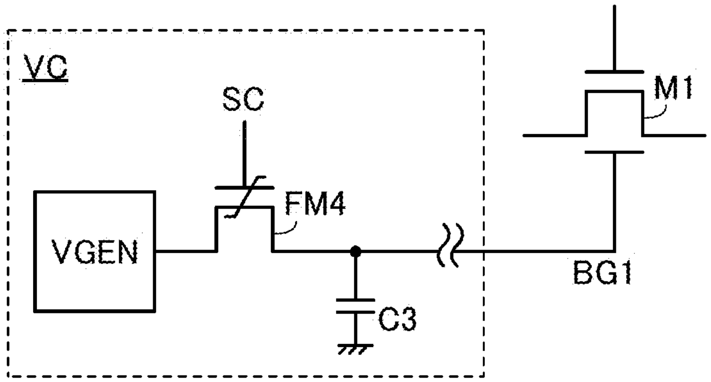

The transistor M4 illustrated in FIG. 4A preferably includes a ferroelectric layer between the gate and a channel formation region or between a back gate and the channel formation region. FIG. 4C illustrates a structure in which a transistor FM4 including a ferroelectric layer is used instead of the transistor M4 illustrated in FIG. 4A. The transistor FM4 in FIG. 4C is illustrated as a symbol of the inclusion of a ferroelectric layer.

The ferroelectric layer included in the capacitor FC3 is sandwiched between a pair of electrodes and includes a region in contact with the pair of electrodes.

As a material that can show ferroelectricity, hafnium oxide, zirconium oxide, $HfZrO_X$ (X is a real number larger than 0), a material in which an element J1 (here, the element J1 is zirconium (Zr), silicon (Si), aluminum (Al), gadolinium (Gd), yttrium (Y), lanthanum (La), strontium (Sr), or the like) is added to hafnium oxide, a material in which an element J2 (here, the element J2 is hafnium (Hf), silicon (Si), aluminum (Al), gadolinium (Gd), yttrium (Y), lanthanum (La), strontium (Sr), or the like) is added to zirconium oxide, and the like can be given. In addition, a piezoelectric ceramic having a perovskite structure, such as $PbTiO_X$, barium strontium titanate (BST), strontium titanate, lead zirconate titanate (PZT), strontium bismuth tantalate (SBT), bismuth ferrite (BFO), or barium titanate, may be used as the material that can show ferroelectricity. Furthermore, the material that can show ferroelectricity can be, for example, a plurality of materials selected from the above-listed materials or a stacked-layer structure of a plurality of materials selected from the above-listed materials. Since hafnium oxide, zirconium oxide, $HfZrO_X$, a material in which the element J1 is added to hafnium oxide, or the like may change its crystal structure (characteristics) according to processes and the like as well as deposition conditions, a material that exhibits ferroelectricity is referred to not only as a ferroelectric but also as a material that can show ferroelectricity or a material that shows ferroelectricity in this specification and the like.

In particular, as a material used for a ferroelectric layer, it is preferable to use hafnium oxide or hafnium oxide and zirconium oxide that can show ferroelectricity even when processed as a thin film having a thickness of several nanometers. Here, the thickness of the ferroelectric layer can be less than or equal to 100 nm, preferably less than or equal to 50 nm, further preferably less than or equal to 20 nm, still further preferably less than or equal to 10 nm (typically, greater than or equal to 2 nm and less than or equal to 9 nm). When the thickness of the ferroelectric layer can be small, a semiconductor device can be obtained by combining the ferroelectric layer with a miniaturized transistor.

A ferroelectric layer is an insulator and has a property in which application of an electric field from the outside causes internal polarization and the polarization remains even after the electric field is made to be zero (hysteresis characteristics).

Figure 5:
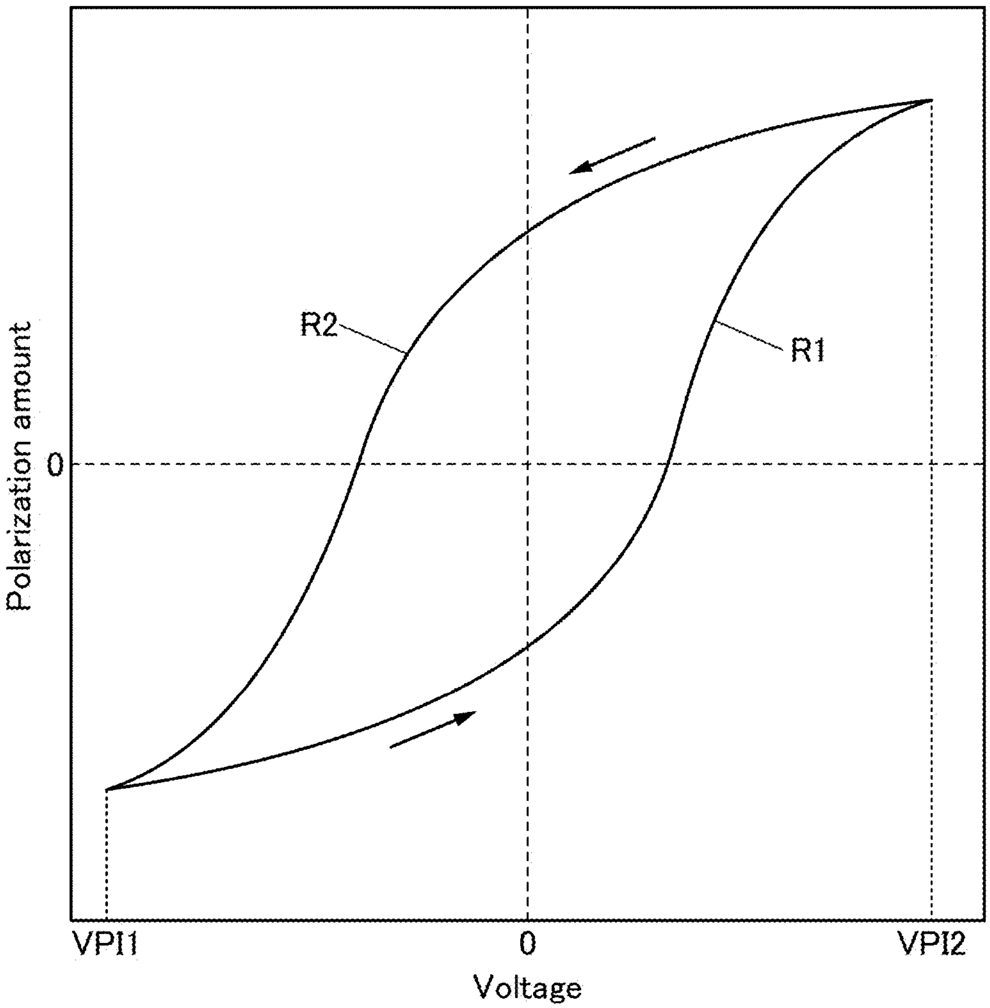
FIG. 5 is a diagram showing the hysteresis characteristics of a ferroelectric.

FIG. 5 is a graph showing the hysteresis characteristics of a ferroelectric layer. In FIG. 5, the horizontal axis represents a voltage applied to the ferroelectric layer. The vertical axis represents a polarization amount of the ferroelectric layer. As in FIG. 5, the hysteresis characteristics of the ferroelectric layer can be shown by a curve R1 and a curve R2. Voltages at the intersection points of the curve R1 and the curve R2 are voltage VPI1 and voltage VPI2. In FIG. 5, the voltage VPI1 has a negative value and the voltage VPI2 has a positive value.

After the voltage VPI1 is applied to the ferroelectric layer, a voltage applied to the ferroelectric layer is increased, whereby the polarization amount of the ferroelectric layer increases along the curve R1. Meanwhile, after the voltage VPI2 is applied to the ferroelectric layer, a voltage applied to the ferroelectric layer is decreased, whereby the polarization amount of the ferroelectric layer decreases along the curve R2. That is, the application of the voltage VPI1 or the voltage VPI2 to the ferroelectric layer causes polarization inversion. Thus, the voltage VPI1 and the voltage VPI2 can each be referred to as a polarization inversion voltage.

FIG. 5 shows that positive electric charge is biased to one electrode of the capacitor and negative electric charge is biased to the other electrode of the capacitor when the polarization amount is positive. In addition, it is shown that negative electric charge is biased to the one electrode and positive electric charge is biased to the other electrode when the polarization amount is negative. With the capacitor including a ferroelectric layer, a potential in accordance with a positive or negative polarization amount can be retained as the back gate potential BG1. Therefore, the operation frequency of the voltage generation circuit VGEN can be reduced, and thus power consumption of the voltage generation circuit VGEN can be reduced.

The capacitor C1 and the capacitor C2 illustrated in FIG. 1A may each be the capacitor including a ferroelectric layer illustrated in FIG. 4B. For example, as in a semiconductor device 100D in FIG. 6A, a capacitor FC1 and a capacitor FC2 can be included as capacitors including ferroelectric layers. With the structure, capacitance values of the capacitors can be large, which facilitates retention of electric charge corresponding to the output voltage $V_{OUT1}$ and the output voltage $V_{OUT2}$.

The transistor M2 and the transistor M3 illustrated in FIG. 1A may each be the transistor including a ferroelectric layer illustrated in FIG. 4C. For example, as in a semiconductor device 100E illustrated in FIG. 6B, a transistor FM2 and a transistor FM3 can be included as transistors including ferroelectric layers. With the structure, transistor characteristics such as a threshold voltage can be controlled, which facilitates retention of the electric charge corresponding to the output voltage $V_{OUT1}$ and the output voltage $V_{OUT2}$.

Figure 6A:
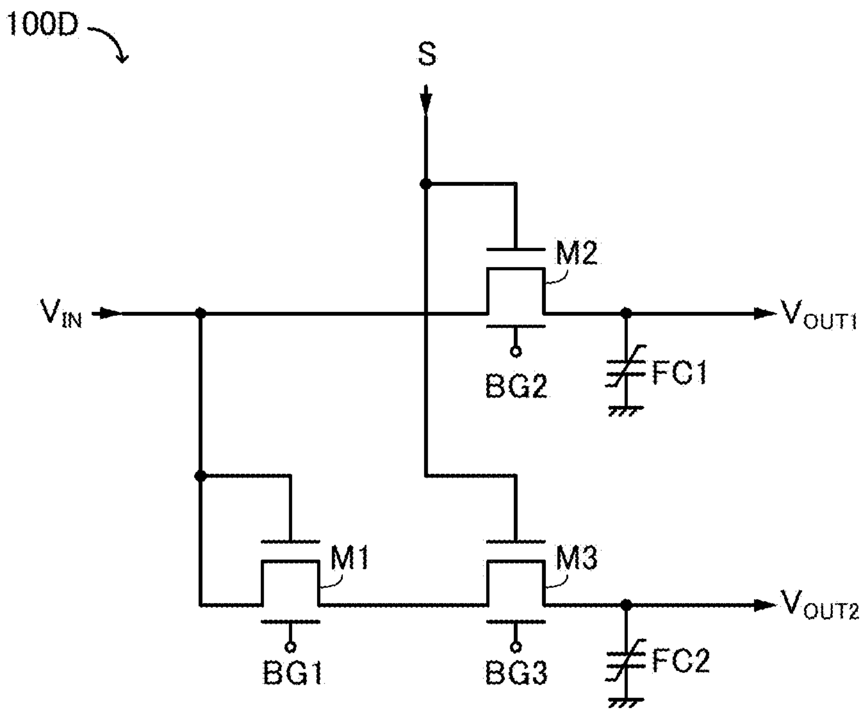
FIG. 6A and FIG. 6B are diagrams illustrating structure examples of semiconductor devices.
Figure 6B:
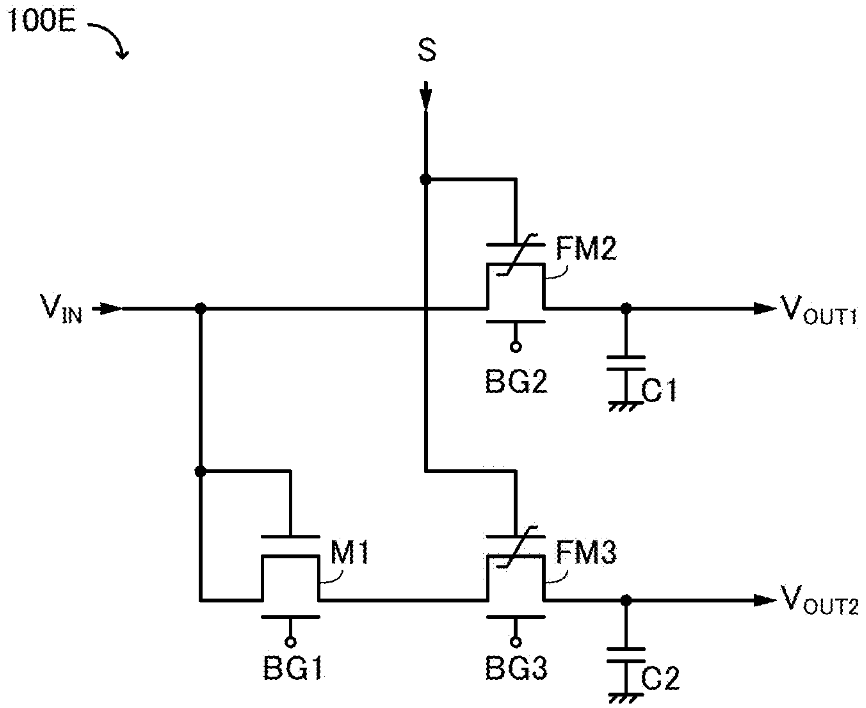
Figure 7A:
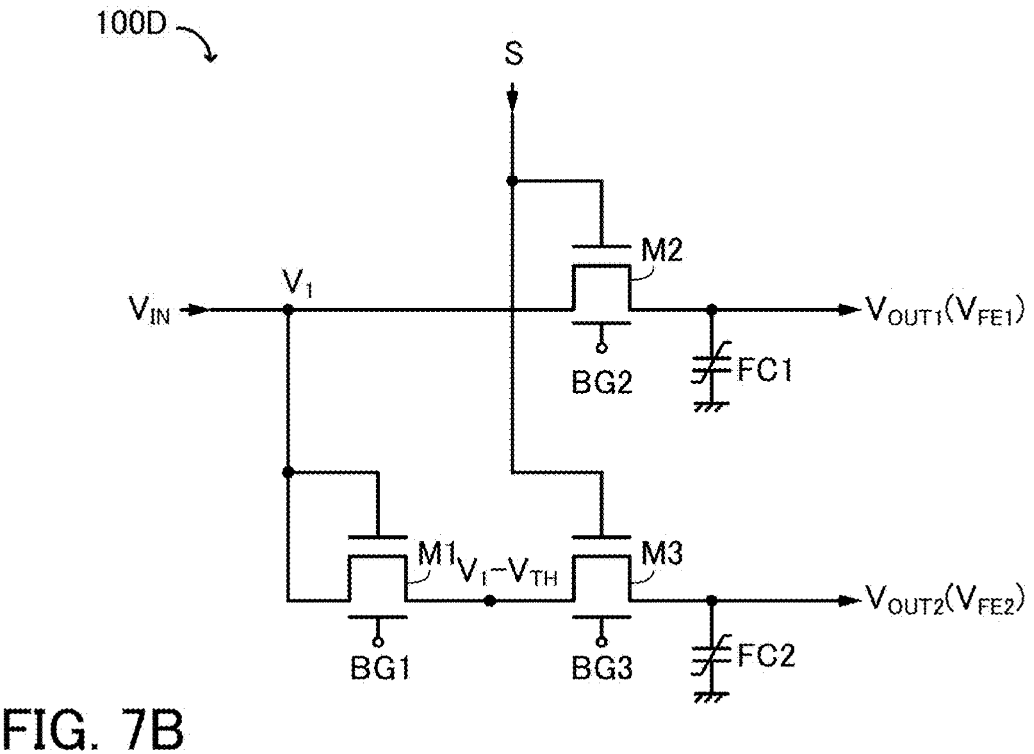
FIG. 7A and FIG. 7B are diagrams showing a structure example of a semiconductor device.
Figure 7B:
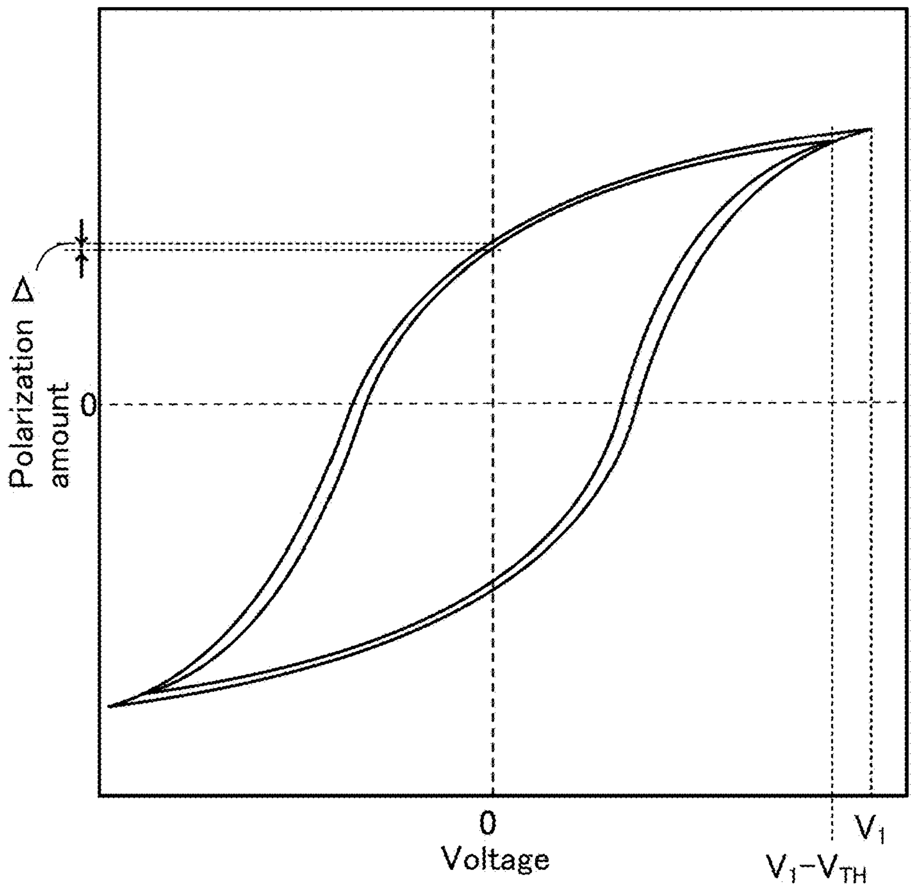

The operation of the semiconductor device 100D illustrated in FIG. 6A, which is different from that of the semiconductor device 100, is described with reference to FIG. 7A and FIG. 7B. In the semiconductor device 100D illustrated in FIG. 7A, the voltage ($V_1$) of the input voltage $V_{IN}$ and the voltage ($V_1-V_{TH}$) corresponding to the $V_1$ decreased by the threshold voltage of the transistor M1 are supplied to the capacitor FC1 and the capacitor FC2 by the selection signal S. That is, the capacitor FC1 and the capacitor FC2 are supplied with different voltages.

The hysteresis characteristics of the capacitor FC1 and the capacitor FC2 including ferroelectric layers vary in accordance with voltages. Specifically, when a high voltage is supplied, polarization at a voltage of 0 is large, and when a low voltage is supplied, polarization at a voltage of 0 is small compared with that in the case where a high voltage is supplied. Therefore, as illustrated in FIG. 7B, a polarization difference (Δ) at a voltage of 0 can be retained in accordance with the difference between the voltage $V_1$ and the voltage $V_1-V_{TH}$. Depending on the polarization difference, the amount of electric charge retained in the capacitor FC1 and the capacitor FC2 can be varied; thus, a voltage $V_{FE1}$ and a voltage $V_{FE2}$ with different values can be output as the output voltage $V_{OUT1}$ and the output voltage $V_{OUT2}$.

Figure 8A:
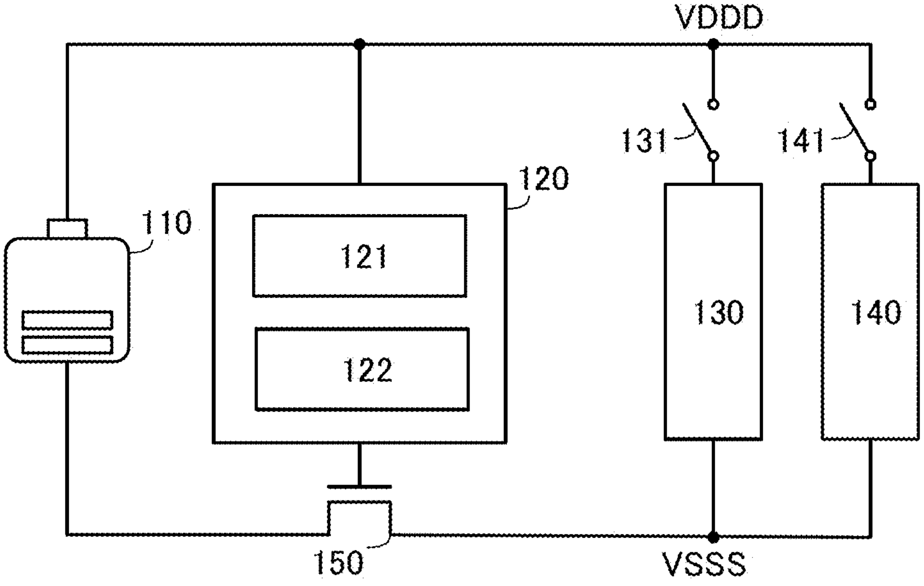
FIG. 8A and FIG. 8B are diagrams illustrating structure examples of a control circuit of a secondary battery.
Figure 8B:
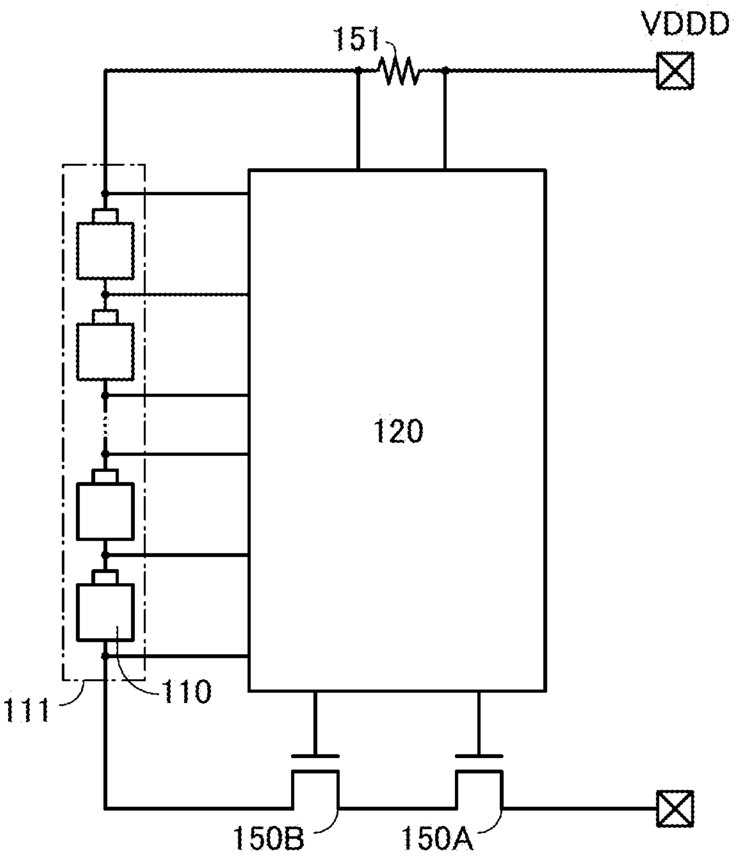

In FIG. 8A and FIG. 8B, a control circuit of a secondary battery that can use the semiconductor devices 100 and 100A to 100E is described. The block diagram in FIG. 8A illustrates a secondary battery 110, a control circuit 120, a load 130, a charger 140, and a power transistor 150. FIG. 8A further illustrates a switch 131 making a current flow to the load 130 with discharge of the secondary battery 110 and a switch 141 making a current flow from the charger 140 for charge of the secondary battery 110. In addition, FIG. 8A illustrates a terminal on the positive electrode side of the load 130 and the charger 140 as VDDD and a terminal on the negative electrode side as VSSS.

The control circuit 120 has a function of controlling the on or off of the power transistor 150 to prevent overcharge or overdischarge. The control circuit 120 is referred to as a battery control circuit or a battery protection circuit in some cases. The control circuit 120 includes a control portion 121 and a constant voltage generation portion 122. Any of the semiconductor devices 100 and 100A to 100E described above can be used for the constant voltage generation portion 122.

The constant voltage generation portion 122 includes any of the semiconductor devices 100 and 100A to 100E that can output two voltages (a pair of voltages) as a plurality of voltages. A voltage that is generated because of inclusion of a plurality of semiconductor devices outputting pairs of voltages can be used as a reference voltage for preventing overcharge, overdischarge, or the like of a secondary battery such as a lithium-ion battery. In particular, voltages obtained as a pair of voltages can be used as the upper limit voltage and the lower limit voltage for determining overcharge, overdischarge, or the like of the secondary battery. The control circuit 120 compares the voltage of the secondary battery with the obtained upper limit voltage and lower limit voltage and controls the power transistor 150.

FIG. 8B illustrates a structure in which the secondary battery is an assembled battery including a plurality of secondary batteries. FIG. 8B illustrates, in addition to an assembled battery 111 including the secondary batteries 110, a resistor 151 detecting a current for charging the secondary batteries 110, and power transistors 150A and 150B for controlling charge or discharge. As illustrated in FIG. 8B, the control circuit 120 is connected to terminals each detecting a voltage, a current, or the like of the secondary battery 110. The control circuit 120 processes the voltage, the current, or the like of the secondary battery 110 with internal analog circuits such as a comparison circuit and a constant voltage generation circuit to estimate the state of the secondary battery 110, and controls terminals connected to elements that control charge and discharge.

Structure examples of the control portion 121 and the constant voltage generation portion 122 that are included in the control circuit 120 are described with reference to FIG. 9 and FIG. 10.

Figure 9:
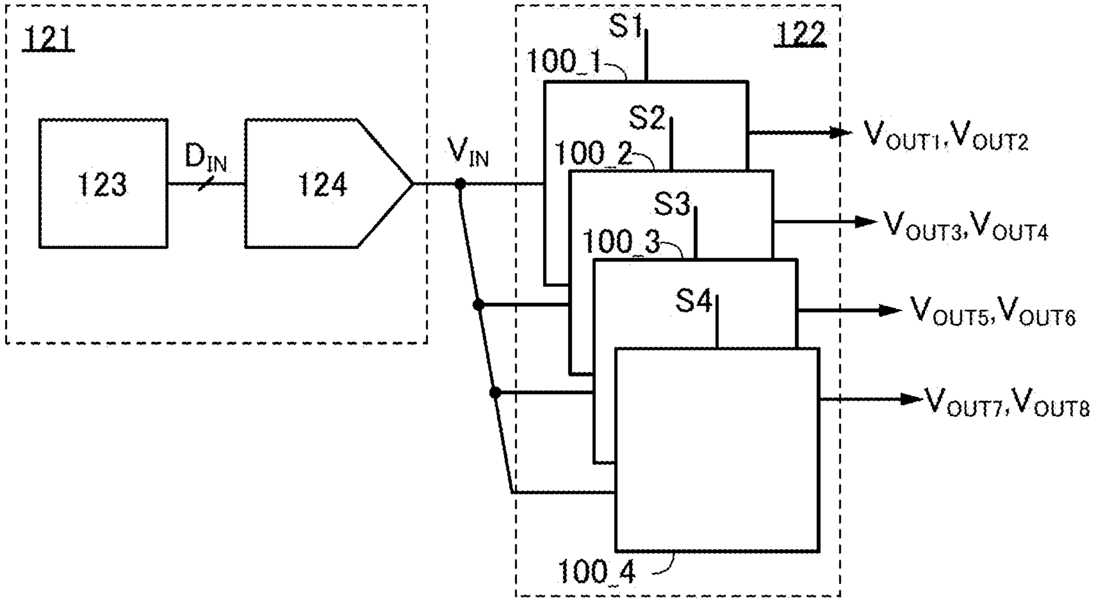
FIG. 9 is a diagram illustrating a structure example of a control circuit of a secondary battery.

FIG. 9 is a block diagram illustrating a structure example of the control circuit 120. The control portion 121 includes a data generation portion 123 and a digital-analog converter circuit 124. The data generation portion 123 generates data $D_{IN}$ for generating a reference voltage. The data $D_{IN}$ is digital data. The digital-analog converter circuit 124 has a function of converting the data $D_{IN}$ into the input voltage $V_{IN}$ that is a voltage with an analog value.

The constant voltage generation portion 122 includes four semiconductor devices 100_1 to 100_4, for example. As the semiconductor devices 100_1 to 100_4, any of the semiconductor devices 100 and 100A to 100E described above can be used. Selection signals S1 to S4 are respectively supplied to the semiconductor devices 100_1 to 100_4, and the input voltages $V_{IN}$ are supplied at a desired timing.

The operation of the control circuit 120 in FIG. 9 is described with reference to an example of a timing chart showing in FIG. 10.

At Time T11, data $D_{IN\_1}$ is input from the data generation portion 123 to the digital-analog converter circuit 124, and the input voltage $V_1$ is generated. In Period T12, the selection signal S1 is set at H level, whereby the semiconductor device 100_1 generates the output voltage $V_{OUT1}$ and the output voltage $V_{OUT2}$ based on the input voltage $V_1$. The output voltage $V_{OUT1}$ becomes the voltage $V_1$, and the output voltage $V_{OUT1}$ becomes the voltage $V_1-V_{TH}$ having the difference corresponding to the threshold voltage $V_{TH}$ of the transistor M1 included in the semiconductor device 100_1.

Next, at Time T21, data $D_{IN\_2}$ is input from the data generation portion 123 to the digital-analog converter circuit 124, and an input voltage $V_2$ is generated. In Period T22, the selection signal S2 is set at H level, whereby the semiconductor device 100_2 generates an output voltage $V_{OUT3}$ and an output voltage $V_{OUT4}$ based on the input voltage $V_2$. The output voltage $V_{OUT3}$ becomes the voltage $V_2$, and the output voltage $V_{OUT4}$ becomes a voltage $V_2$-$V_{TH}$ having the difference corresponding to the threshold voltage $V_{TH}$ of the transistor M1 included in the semiconductor device 100_2.

Next, at Time T31, data $D_{IN\_3}$ is input from the data generation portion 123 to the digital-analog converter circuit 124, and an input voltage $V_3$ is generated. In Period T32, the selection signal S3 is set at H level, whereby the semiconductor device 100_3 generates an output voltage $V_{OUT5}$ and an output voltage $V_{OUT6}$ based on the input voltage $V_3$. The output voltage $V_{OUT5}$ becomes the voltage $V_3$, and the output voltage $V_{OUT6}$ becomes a voltage $V_3$-$V_{TH}$ having the difference corresponding to the threshold voltage $V_{TH}$ of the transistor M1 included in the semiconductor device 100_3.

Next, at Time T41, data $D_{IN\_4}$ is input from the data generation portion 123 to the digital-analog converter circuit 124, and an input voltage $V_4$ is generated. In Period T42, the selection signal S4 is set at H level, whereby the semiconductor device 100_4 generates an output voltage $V_{OUT7}$ and an output voltage $V_{OUT8}$ based on the input voltage $V_4$. The output voltage $V_{OUT7}$ becomes the voltage $V_4$, and the output voltage $V_{OUT8}$ becomes a voltage $V_4$-$V_{TH}$ having the difference corresponding to the threshold voltage $V_{TH}$ of the transistor M1 included in the semiconductor device 100_4.

Here, even when the digital-analog converter circuit 124 is powered off after supplying the input voltages $V_1$ to $V_4$ to the semiconductor devices 100_1 to 100_4, the semiconductor devices 100_1 to 100_4 can generate reference voltages of the output voltage $V_{OUT1}$ and the output voltage $V_{OUT2}$, the output voltage $V_{OUT3}$ and the output voltage $V_{OUT4}$, the output voltage $V_{OUT5}$ and the output voltage $V_{OUT6}$, and the output voltage $V_{OUT7}$ and the output voltage $V_{OUT8}$. That is, power consumption can be reduced. Furthermore, each pair of reference voltages can be simultaneously set when the input voltages $V_1$ to $V_4$ are supplied. That is, the reference voltages can be efficiency set.

With the above structure, a control circuit of a secondary battery, which can reduce the power consumption of the control circuit and easily set a voltage for comparison, can be provided.

As described above, each pair of voltages can be used as the upper limit voltage and the lower limit voltage in the case of performing trickle charge, for example. The input voltages $V_{IN}$ supplied to the semiconductor devices 100_1 to 100_4 are preferably different so that each pair of voltages are different. In this manner, the output voltage $V_{OUT1}$ and the output voltage $V_{OUT2}$, the output voltage $V_{OUT3}$ and the output voltage $V_{OUT4}$, the output voltage $V_{OUT5}$ and the output voltage $V_{OUT6}$, and the output voltage $V_{OUT7}$ and the output voltage $V_{OUT8}$ can be retained as different voltages, and the pair of voltages can be switched in accordance with an environmental temperature change.

Figure 10:
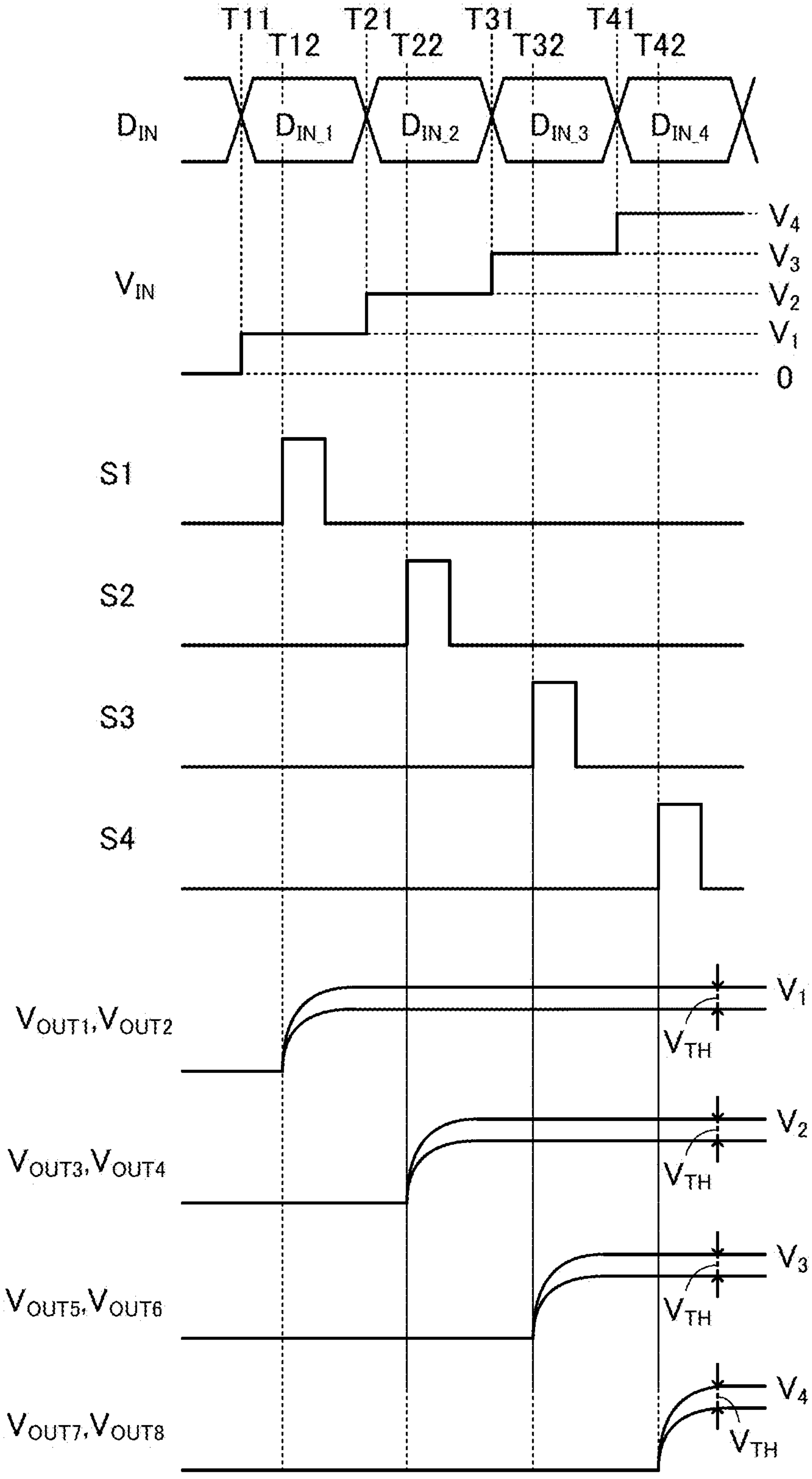
FIG. 10 is a diagram showing a structure example of a control circuit of a secondary battery.

With the structure in FIG. 9 and FIG. 10, in order to prevent overcharge, a voltage for an operation in which charge is stopped when the voltage of a secondary battery exceeds the upper limit voltage of overcharge, and next charge is allowed when the voltage of the secondary battery is lower than the lower limit voltage of overcharge can be changed with an input voltage and the threshold voltage of a transistor; therefore, the on or off of charge can be optimized, and thus a load on the secondary battery can be reduced. Similarly, the on or off of discharge can be optimized, and thus the load on the secondary battery can be reduced.

In a control circuit of a secondary battery, the structure of generating a reference voltage for voltage comparison is not limited to those in FIG. 1 to FIG. 10. A structure example of a circuit for generating a reference voltage is described with reference to FIG. 11A and FIG. 11B.

Figure 11A:
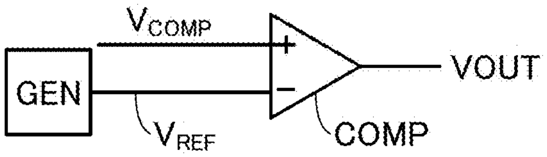
FIG. 11A and FIG. 11B are diagrams illustrating a structure example of a control circuit of a secondary battery.

FIG. 11A is a circuit diagram of a comparator COMP that is supplied with a voltage $V_{COMP}$ compared with a reference voltage and a reference voltage $V_{REF}$ generated in a reference voltage generation circuit GEN, and outputs a voltage VOUT corresponding to the comparison result.

The reference voltage $V_{REF}$ illustrated in the circuit diagram in FIG. 11A is supplied to the comparator COMP at the comparison. Therefore, the reference voltage generation circuit GEN generating the reference voltage $V_{REF}$ can generate the reference voltage $V_{REF}$ at the timing of the comparison operation of the voltage $V_{COMP}$, and stop the operation in the other period. Thus, the reference voltage generation circuit GEN does not have to always operate, so that power consumption can be reduced.

Figure 11B:
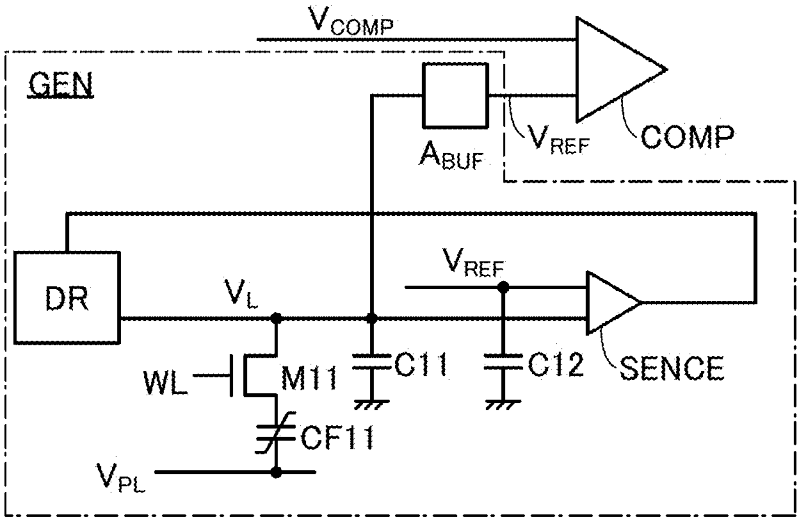

FIG. 11B illustrates a structure example of the reference voltage generation circuit GEN. The reference voltage generation circuit GEN includes an analog amplifier circuit $A_{BUF}$, a transistor M11, a capacitor CF11, a capacitor C11, a capacitor C12, a driver circuit DR, and a sense amplifier SENCE.

The analog amplifier circuit $A_{BUF}$ can be omitted. The transistor M11 is a Si transistor. For example, the transistor M11 may be an OS transistor. The on or off of the transistor M11 is controlled with a wiring WL.

The capacitor CF11 includes a ferroelectric layer between a pair of electrodes. A capacitor including a ferroelectric layer has a property in which application of an electric field from the outside causes internal polarization and the polarization remains even after the electric field is made to be zero (hysteresis characteristics). Therefore, when the electrodes has predetermined potentials, the capacitor CF11 can set a capacitance value. The capacitance value of the capacitor CF11 is set by a voltage $V_{PL}$ and a voltage supplied from the driver circuit DR in the state where the transistor M11 is turned on. The capacitance value of the capacitor CF11 is denoted as $C_{FE}$.

The capacitor CF11 can retain the set capacitance value as an analog value. Therefore, an element including the transistor M11 and the capacitor CF11 can be used as an analog memory. Note that although the capacitor CF11 is described as an analog memory retaining an analog value, the capacitor CF11 may be a digital memory retaining a digital value. In this case, a plurality of capacitors CF11 can be provided and used as digital memories due to the weight of the plurality of capacitors CF11. Each digital memory can retain the polarization state corresponding to data of 1 or 0. Alternatively, a digital value may be converted into an analog value in the digital-analog converter circuit on the basis of the data retained in the digital memory.

The capacitors C11 and C12 correspond to capacitors of input wirings of the sense amplifier SENCE. The capacitors C11 and C12 are preferably designed to have equal capacitance. The capacitance values of the capacitors C11 and C12 are each denoted as $C_L$. The sense amplifier SENCE amplifies and supplies, to the driver circuit DR, a potential difference between the input wirings.

The reference voltage $V_{REF}$ that is generated at the timing of the comparison operation of the voltage $V_{COMP}$ corresponds to a voltage $V_L$ of a wiring connected to the analog amplifier circuit $A_{BUF}$. The voltage $V_L$ depends on the capacitance value $C_{FE}$ of the capacitor CF11, the capacitance values $C_L$ of the capacitors C11 and C12, and the voltage $V_{PL}$ and can be expressed by Formula (1).

[Formula 1]

$$V_L = \frac{C_{FE}}{(C_{FE} + C_L)} \times V_{PL} \tag{1}$$

According to Formula (1), the voltage generated by the reference voltage generation circuit GEN depends on the capacitance value set in the capacitor CF11. Therefore, at the timing of the comparison operation of the voltage $V_{COMP}$, the voltage $V_{PL}$ is set and the transistor M11 is turned on, whereby the reference voltage $V_{REF}$ can be generated.

The structure described in this embodiment can be used in an appropriate combination with the structure described in the other embodiments.

Embodiment 2

In this embodiment, structure examples of transistors that can be used in a semiconductor device functioning as the control circuit of a secondary battery described in the above embodiment are described. As an example, a structure in which transistors having different electrical characteristics are stacked is described. With the structure, the flexibility in design of the semiconductor device can be increased. Stacking transistors having different electrical characteristics can increase the degree of integration of the semiconductor device.

<Structure Example of Semiconductor Device>

Figure 12:
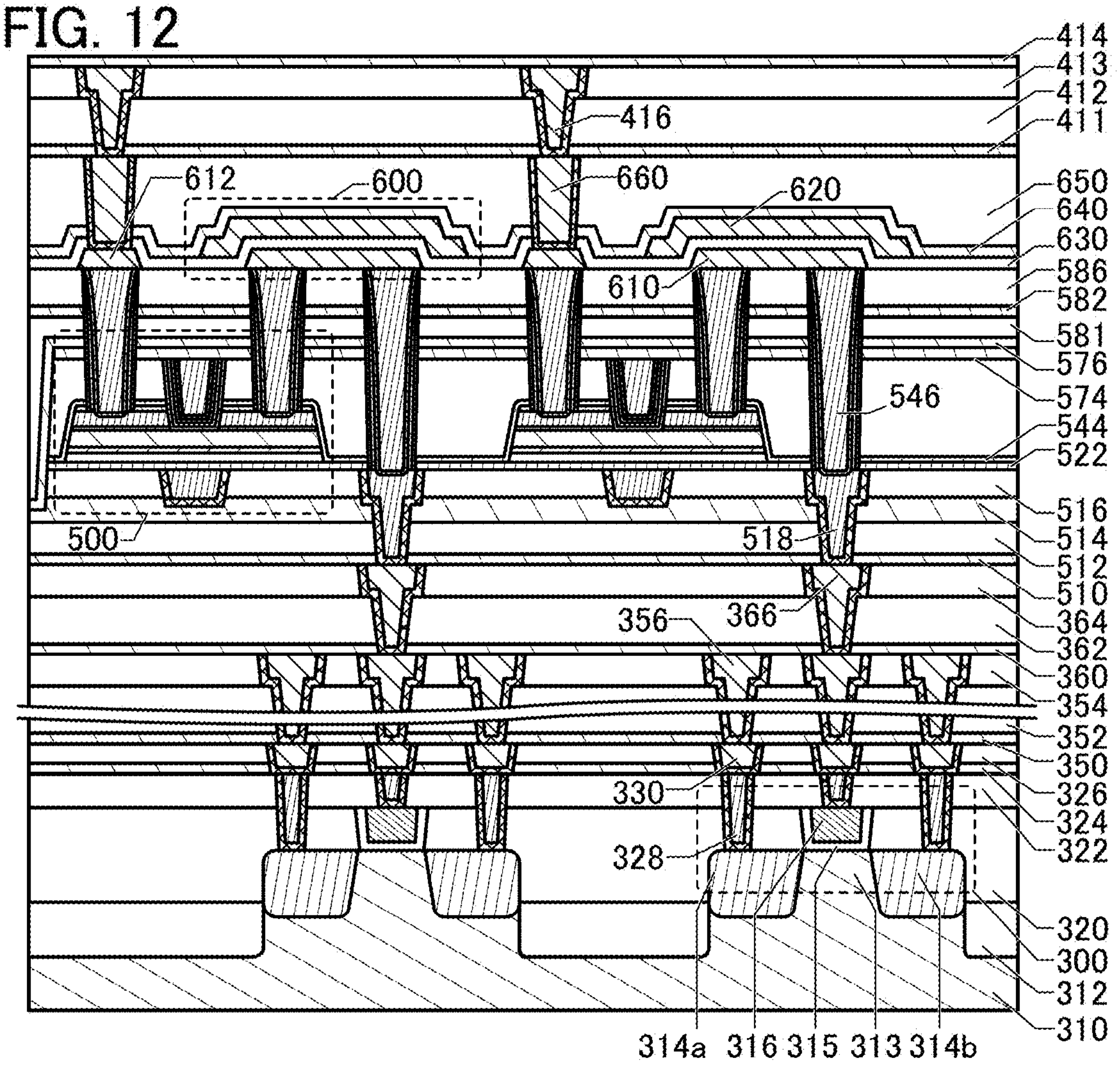
FIG. 12 is a schematic cross-sectional view illustrating a structure example of a semiconductor device.
Figure 13A:
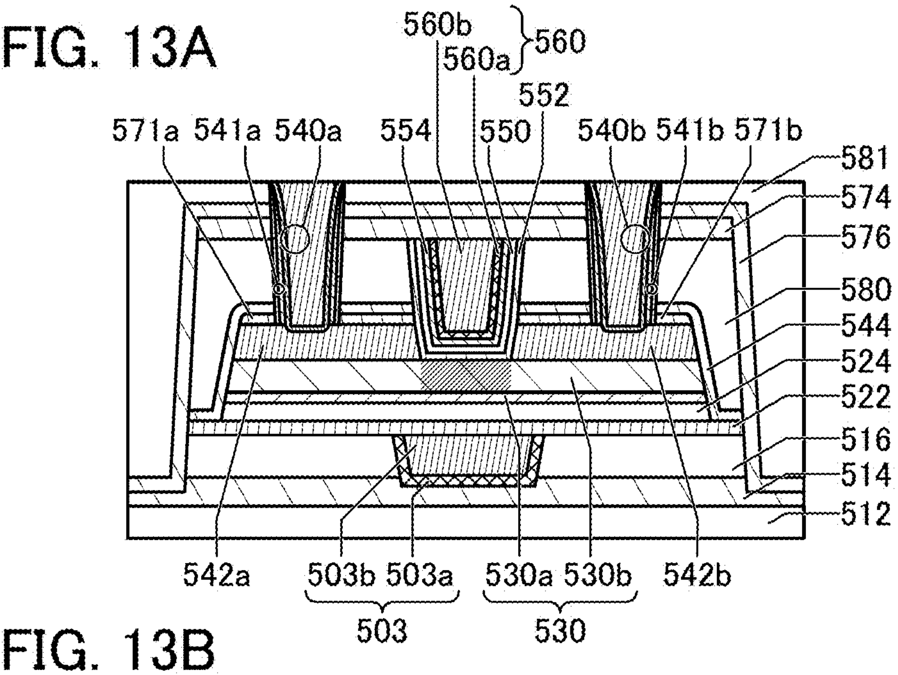
FIG. 13A to FIG. 13C are schematic cross-sectional views illustrating a structure example of a transistor.
Figure 13B:
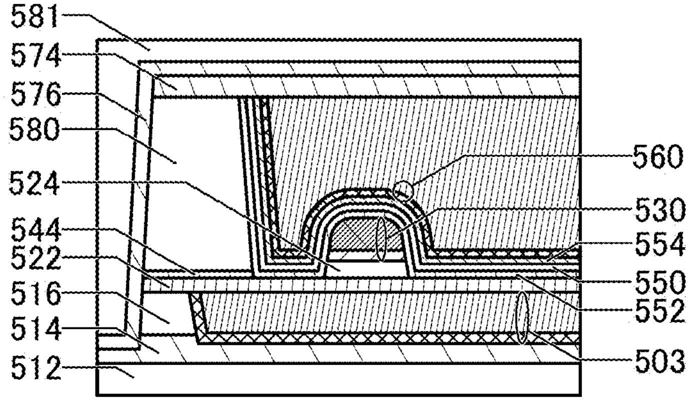
Figure 13C:
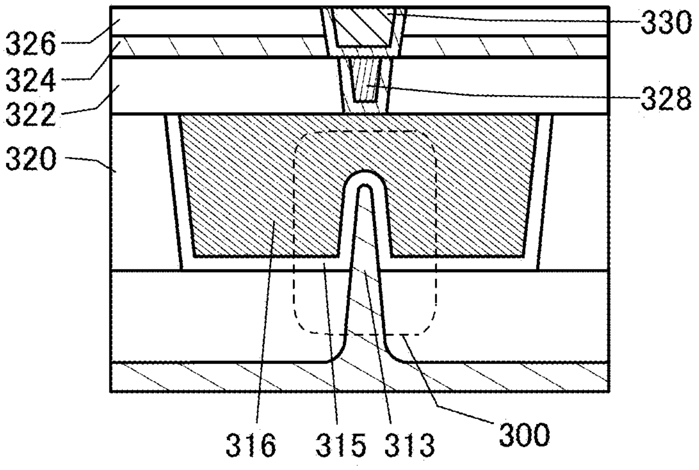

FIG. 12 illustrates the semiconductor device described in the above embodiment as an example, and the semiconductor device includes a transistor 300, a transistor 500, and a capacitor 600. FIG. 13A is a cross-sectional view of the transistor 500 in the channel length direction, FIG. 13B is a cross-sectional view of the transistor 500 in the channel width direction, and FIG. 13C is a cross-sectional view of the transistor 300 in the channel width direction.

The transistor 500 is a transistor containing a metal oxide in a channel formation region (an OS transistor). The transistor 500 has features that the off-state current is low and that the field-effect mobility hardly changes even at high temperatures. When the transistor 500 is used as a semiconductor device, e.g., the OS transistor described in the above embodiment, a semiconductor device whose operating capability is unlikely to deteriorate even at high temperatures can be achieved.

The transistor 500 is provided above the transistor 300, for example, and the capacitor 600 is provided above the transistor 300 and the transistor 500, for example. Note that the capacitor 600 can be the capacitor described in the above embodiment.

The transistor 300 is provided on a substrate 310 and includes an element isolation layer 312, a conductor 316, an insulator 315, a semiconductor region 313 that is part of the substrate 310, and a low-resistance region 314*a* and a low-resistance region 314*b* functioning as a source region and a drain region. Note that the transistor 300 can be used as the Si transistor or the like described in the above embodiment, for example. Note that FIG. 12 illustrates, as an example, a structure in which a gate of the transistor 300 is electrically connected to one of a source and a drain of the transistor 500 through a pair of electrodes of the capacitor 600.

A semiconductor substrate (e.g., a single crystal substrate or a silicon substrate) is preferably used as the substrate 310.

In the transistor 300, a top surface and a side surface in the channel width direction of the semiconductor region 313 are covered with the conductor 316 with the insulator 315 therebetween, as illustrated in FIG. 13C. Such a Fin-type transistor 300 can have an increased effective channel width, and thus the transistor 300 can have improved on-state characteristics. In addition, since contribution of an electric field of a gate electrode can be increased, the off-state characteristics of the transistor 300 can be improved.

Note that the transistor 300 may be either a p-channel transistor or an n-channel transistor.

A region of the semiconductor region 313 where a channel is formed, a region in the vicinity thereof, the low-resistance region 314*a* and the low-resistance region 314*b* functioning as a source region and a drain region, and the like preferably contain a semiconductor such as a silicon-based semiconductor, and preferably contain single crystal silicon. Alternatively, the regions may be formed using a material containing Ge (germanium), SiGe (silicon germanium), GaAs (gallium arsenide), GaAlAs (gallium aluminum arsenide), GaN (gallium nitride), or the like. A structure using silicon whose effective mass is controlled by applying stress to the crystal lattice and changing the lattice spacing may be employed. Alternatively, the transistor 300 may be an HEMT (High Electron Mobility Transistor) with GaAs and GaAlAs, or the like.

The low-resistance region 314*a* and the low-resistance region 314*b* contain an element that imparts n-type conductivity, such as arsenic or phosphorus, or an element that imparts p-type conductivity, such as boron, in addition to the semiconductor material used in the semiconductor region 313.

For the conductor 316 functioning as a gate electrode, a semiconductor material such as silicon containing an element that imparts n-type conductivity, such as arsenic or phosphorus, or an element that imparts p-type conductivity, such as boron, or a conductive material such as a metal material, an alloy material, or a metal oxide material can be used.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

The element isolation layer 312 is provided to separate a plurality of transistors on the substrate 310 from each other. The element isolation layer can be formed by, for example, a LOCOS (Local Oxidation of Silicon) method, an STI (Shallow Trench Isolation) method, a mesa isolation method, or the like.

Figure 14:
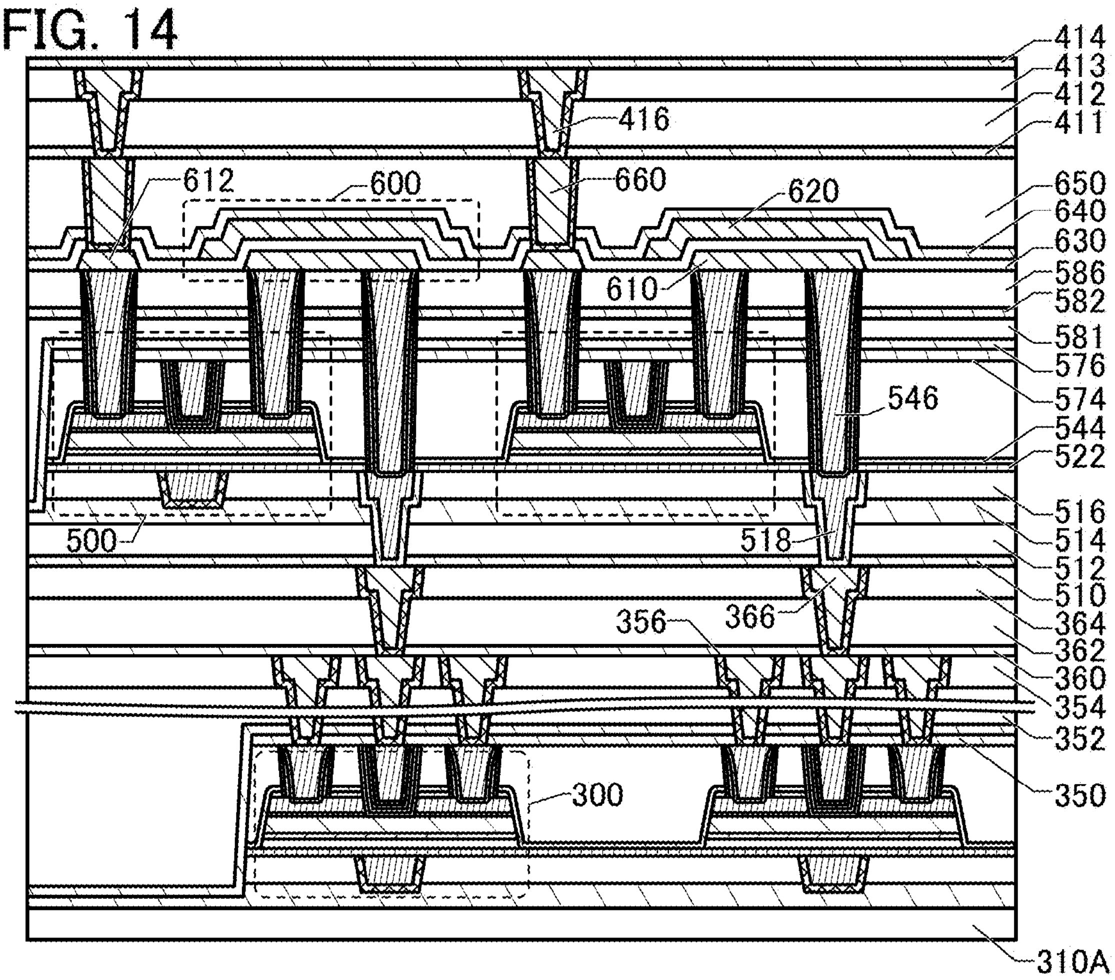
FIG. 14 is a schematic cross-sectional view illustrating a structure example of a semiconductor device.

Note that the transistor 300 illustrated in FIG. 12 is an example and the structure is not limited thereto; an appropriate transistor is used in accordance with a circuit structure, a driving method, or the like. For example, the transistor 300 may have a planar structure instead of a FIN-type structure illustrated in FIG. 13C. For example, when a semiconductor device is a single-polarity circuit using only OS transistors, the transistor 300 has a structure similar to that of the transistor 500 using an oxide semiconductor, as illustrated in FIG. 14. Note that the details of the transistor 500 will be described later. In this specification and the like, a single-polarity circuit refers to a circuit including only either n-channel transistors or p-channel transistors.

Note that in FIG. 14, the transistor 300 is provided over a substrate 310A; in this case, a semiconductor substrate may be used as the substrate 310A, as in the case of the substrate 310 in the semiconductor device in FIG. 12. As the substrate 310A, for example, an SOI substrate, a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, paper including a fibrous material, a base material film, or the like can be used. Examples of the glass substrate include barium borosilicate glass, aluminoborosilicate glass, and soda lime glass. As examples of the flexible substrate, the attachment film, the base material film, and the like, the following can be given. Examples include plastics typified by polyethylene terephthalate (PET), polyethylene naphthalate (PEN), polyether sulfone (PES), and polytetrafluoroethylene (PTFE). Another example is a synthetic resin such as acrylic. Other examples include polypropylene, polyester, polyvinyl fluoride, and polyvinyl chloride. Other examples include polyamide, polyimide, aramid, an epoxy resin, an inorganic vapor deposition film, and paper.

In the transistor 300 illustrated in FIG. 12, an insulator 320, an insulator 322, an insulator 324, and an insulator 326 are stacked in this order from the substrate 310 side.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, or aluminum nitride can be used, for example.

Note that in this specification, silicon oxynitride refers to a material that has a higher oxygen content than a nitrogen content, and silicon nitride oxide refers to a material that has a higher nitrogen content than an oxygen content. Moreover, in this specification, aluminum oxynitride refers to a material that has a higher oxygen content than a nitrogen content, and aluminum nitride oxide refers to a material that has a higher nitrogen content than an oxygen content.

The insulator 322 may have a function of a planarization film for planarizing a level difference caused by the transistor 300 or the like covered with the insulator 320 and the insulator 322. For example, a top surface of the insulator 322 may be planarized by planarization treatment using a chemical mechanical polishing (CMP) method or the like to improve planarity.

As the insulator 324, it is preferable to use a film having a barrier property that prevents diffusion of hydrogen, impurities, or the like from the substrate 310, the transistor 300, or the like into a region where the transistor 500 is provided.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

The amount of released hydrogen can be analyzed by thermal desorption spectroscopy (TDS), for example. The amount of hydrogen released from the insulator 324 that is converted into hydrogen atoms per area of the insulator 324 is less than or equal to $10\times10^{15}$ atoms/$cm^2$, preferably less than or equal to $5\times10^{15}$ atoms/$cm^2$, in the TDS analysis in a film-surface temperature range of 50° C. to 500° C., for example.

Note that the permittivity of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324. When a material with a low permittivity is used for the interlayer film, the parasitic capacitance generated between wirings can be reduced.

A conductor 328, a conductor 330, and the like that are connected to the capacitor 600 or the transistor 500 are embedded in the insulator 320, the insulator 322, the insulator 324, and the insulator 326. Note that the conductor 328 and the conductor 330 have a function of a plug or a wiring. A plurality of conductors having a function of a plug or a wiring are collectively denoted by the same reference numeral in some cases. Moreover, in this specification and the like, a wiring and a plug connected to the wiring may be a single component. That is, part of a conductor functions as a wiring in some cases and part of a conductor functions as a plug in other cases.

As a material of each of plugs and wirings (e.g., the conductor 328 and the conductor 330), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, a low-resistance conductive material such as aluminum or copper is preferably used. The use of a low-resistance conductive material can reduce wiring resistance.

A wiring layer may be provided over the insulator 326 and the conductor 330. For example, in FIG. 12, an insulator 350, an insulator 352, and an insulator 354 are provided to be stacked in this order above the insulator 326 and the conductor 330. Furthermore, a conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 and the conductor 330.

For example, like the insulator 324, the insulator 350 is preferably formed using an insulator having a barrier property against impurities such as hydrogen and water. The insulator 352 and the insulator 354 are preferably formed using an insulator having a relatively low dielectric constant to reduce the parasitic capacitance generated between wirings, like the insulator 326. Furthermore, the conductor 356 preferably contains a conductor having a barrier property against impurities such as hydrogen and water. In particular, the conductor having a barrier property against hydrogen is formed in an opening portion included in the insulator 350 having a barrier property against hydrogen. With this structure, the transistor 300 and the transistor 500 can be separated by the barrier layer, so that diffusion of hydrogen from the transistor 300 into the transistor 500 can be inhibited.

For the conductor having a barrier property against hydrogen, tantalum nitride is preferably used, for example. In addition, the use of a stack including tantalum nitride and tungsten, which has high conductivity, can inhibit diffusion of hydrogen from the transistor 300 while the conductivity of a wiring is kept. In that case, a structure is preferable in which a tantalum nitride layer having a barrier property against hydrogen is in contact with the insulator 350 having a barrier property against hydrogen.

An insulator 360, an insulator 362, and an insulator 364 are stacked in this order over the insulator 354 and the conductor 356.

Like the insulator 324 or the like, the insulator 360 is preferably formed using an insulator having a barrier property against impurities such as water and hydrogen. Thus, the insulator 360 can be formed using any of the materials usable for the insulator 324 or the like, for example.

The insulator 362 and the insulator 364 have functions of an interlayer insulating film and a planarization film. Like the insulator 324, the insulator 362 and the insulator 364 are preferably formed using an insulator having a barrier property against impurities such as water and hydrogen. Thus, the insulator 362 and/or the insulator 364 can be formed using any of the materials usable for the insulator 324.

An opening portion is provided in regions of the insulator 360, the insulator 362, and the insulator 364 that overlap with part of the conductor 356, and a conductor 366 is provided to fill the opening portion. The conductor 366 is also formed over the insulator 362. The conductor 366 has a function of a plug or a wiring connected to the transistor 300, for example. Note that the conductor 366 can be provided using a material similar to those for the conductor 328 and the conductor 330.

An insulator 510, an insulator 512, an insulator 514, and an insulator 516 are stacked in this order over the insulator 364 and the conductor 366. A substance with a barrier property against oxygen or hydrogen is preferably used for any of the insulator 510, the insulator 512, the insulator 514, and the insulator 516.

For example, as the insulator 510 and the insulator 514, it is preferable to use a film having a barrier property that prevents diffusion of hydrogen or impurities from the substrate 310, a region where the transistor 300 is provided, or the like into the region where the transistor 500 is provided. Thus, a material similar to that for the insulator 324 can be used.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

For the film having a barrier property against hydrogen, a metal oxide such as aluminum oxide, hafnium oxide, or tantalum oxide is preferably used for the insulator 510 and the insulator 514, for example.

In particular, aluminum oxide has an excellent blocking effect that prevents passage of oxygen and impurities such as hydrogen and moisture that would cause a change in the electrical characteristics of the transistor. Accordingly, aluminum oxide can prevent entry of impurities such as hydrogen and moisture into the transistor 500 in and after the manufacturing process of the transistor. In addition, release of oxygen from the oxide included in the transistor 500 can be inhibited. Therefore, aluminum oxide is suitably used for a protective film of the transistor 500.

For the insulator 512 and the insulator 516, a material similar to that for the insulator 320 can be used, for example. Furthermore, when a material with a relatively low permittivity is used for these insulators, parasitic capacitance generated between wirings can be reduced. A silicon oxide film, a silicon oxynitride film, or the like can be used for the insulator 512 and the insulator 516, for example.

A conductor 518, a conductor included in the transistor 500 (e.g., a conductor 503 illustrated in FIG. 13A and FIG. 13B), and the like are embedded in the insulator 510, the insulator 512, the insulator 514, and the insulator 516. Note that the conductor 518 has a function of a plug or a wiring that is connected to the capacitor 600 or the transistor 300. The conductor 518 can be provided using a material similar to those for the conductor 328 and the conductor 330.

In particular, a region of the conductor 518 that is in contact with the insulator 510 and the insulator 514 is preferably a conductor having a barrier property against oxygen, hydrogen, and water. With this structure, the transistor 300 and the transistor 500 can be separated by the layer having a barrier property against oxygen, hydrogen, and water; hence, diffusion of hydrogen from the transistor 300 into the transistor 500 can be inhibited.

The transistor 500 is provided above the insulator 516.

As illustrated in FIG. 13A and FIG. 13B, the transistor 500 includes the insulator 516 over the insulator 514, the conductor 503 (a conductor 503*a* and a conductor 503*b*) provided to be embedded in the insulator 514 or the insulator 516, an insulator 522 over the insulator 516 and the conductor 503, an insulator 524 over the insulator 522, an oxide 530*a* over the insulator 524, an oxide 530*b* over the oxide 530*a*, a conductor 542*a* over the oxide 530*b*, an insulator 571*a* over the conductor 542*a*, a conductor 542*b* over the oxide 530*b*, an insulator 571*b* over the conductor 542*b*, an insulator 552 over the oxide 530*b*, an insulator 550 over the insulator 552, an insulator 554 over the insulator 550, a conductor 560 (a conductor 560*a* and a conductor 560*b*) that is over the insulator 554 and overlaps with part of the oxide 530*b*, and an insulator 544 provided over the insulator 522, the insulator 524, the oxide 530*a*, the oxide 530*b*, the conductor 542*a*, the conductor 542*b*, the insulator 571*a*, and the insulator 571*b*. Here, as illustrated in FIG. 13A and FIG. 13B, the insulator 552 is in contact with a top surface of the insulator 522, a side surface of the insulator 524, a side surface of the oxide 530*a*, a side surface and a top surface of the oxide 530*b*, a side surface of the conductor 542 (the conductor 542*a* and the conductor 542*b*), a side surface of the insulator 571 (the insulator 571*a* and the insulator 571*b*), a side surface of the insulator 544, a side surface of an insulator 580, and a bottom surface of the insulator 550. A top surface of the conductor 560 is placed to be substantially level with an upper portion of the insulator 554, an upper portion of the insulator 550, an upper portion of the insulator 552, and a top surface of the insulator 580. An insulator 574 is in contact with part of at least one of the top surface of the conductor 560, the upper portion of the insulator 552, the upper portion of the insulator 550, the upper portion of the insulator 554, and the top surface of the insulator 580.

An opening reaching the oxide 530*b* is provided in the insulator 580 and the insulator 544. The insulator 552, the insulator 550, the insulator 554, and the conductor 560 are provided in the opening. The conductor 560, the insulator 552, the insulator 550, and the insulator 554 are provided between the conductor 542*a* and the conductor 542*b* and between the insulator 571*a* and the insulator 571*b* in the channel length direction of the transistor 500. The insulator 554 includes a region in contact with a side surface of the conductor 560 and a region in contact with a bottom surface of the conductor 560.

The oxide 530 preferably includes the oxide 530*a* provided over the insulator 524 and the oxide 530*b* provided over the oxide 530*a*. Including the oxide 530*a* under the oxide 530*b* makes it possible to inhibit diffusion of impurities into the oxide 530*b* from components formed below the oxide 530*a*.

Although a structure in which two layers, the oxide 530*a* and the oxide 530*b*, are stacked as the oxide 530 in the transistor 500 is described, the present invention is not limited thereto. For example, the transistor 500 can include a single-layer structure of the oxide 530*b* or a stacked-layer structure of three or more layers. Alternatively, the oxide 530*a* and the oxide 530*b* can each have a stacked-layer structure.

The conductor 560 functions as a first gate (also referred to as a top gate) electrode, and the conductor 503 functions as a second gate (also referred to as a back gate) electrode. The insulator 552, the insulator 550, and the insulator 554 function as a first gate insulator, and the insulator 522 and the insulator 524 function as a second gate insulator. Note that the gate insulator is also referred to as a gate insulating layer or a gate insulating film in some cases. The conductor 542*a* functions as one of a source and a drain, and the conductor 542*b* functions as the other of the source and the drain. At least part of a region of the oxide 530 that overlaps with the conductor 560 functions as a channel formation region.

Figure 15A:
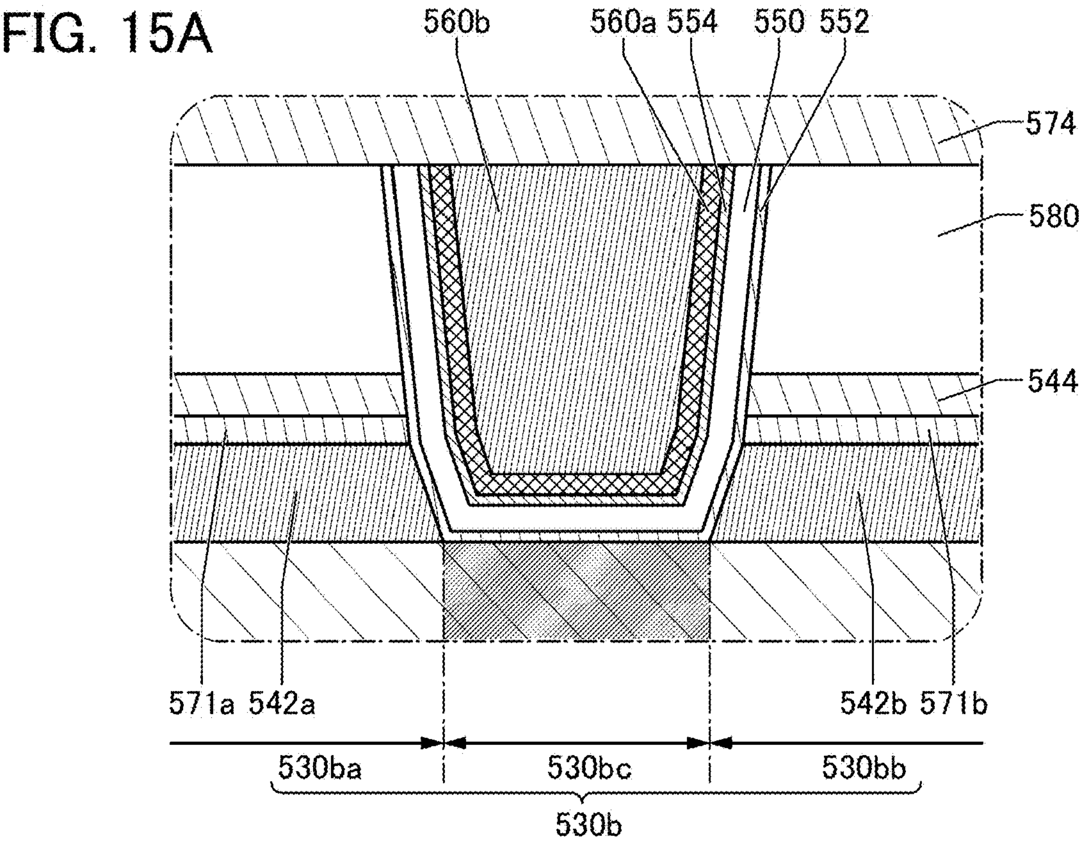
FIG. 15A and FIG. 15B are schematic cross-sectional views illustrating structure examples of a transistor.

Here, FIG. 15A is an enlarged view of the vicinity of the channel formation region in FIG. 13A. Supply of oxygen to the oxide 530*b* forms the channel formation region in a region between the conductor 542*a* and the conductor 542*b*. As illustrated in FIG. 15A, the oxide 530*b* includes a region 530*bc* functioning as the channel formation region of the transistor 500 and a region 530*ba* and a region 530*bb* that are provided to sandwich the region 530*bc* and function as a source region and a drain region. At least part of the region 530*bc* overlaps with the conductor 560. In other words, the region 530*bc* is provided between the conductor 542*a* and the conductor 542*b*. The region 530*ba* is provided to overlap with the conductor 542*a*, and the region 530*bb* is provided to overlap with the conductor 542*b*.

The region 530*bc* functioning as the channel formation region has a smaller amount of oxygen vacancies (an oxygen vacancy in a metal oxide is sometimes referred to as $V_O$ in this specification and the like) or a lower impurity concentration than the region 530*ba* and the region 530*bb* to be a high-resistance region having a low carrier concentration. Thus, the region 530*bc* can be regarded as being i-type (intrinsic) or substantially i-type.

A transistor using a metal oxide is likely to change its electrical characteristics when impurities or oxygen vacancies ($V_O$) exist in a region of the metal oxide where a channel is formed, which might degrade the reliability. In some cases, hydrogen in the vicinity of an oxygen vacancy ($V_O$) forms a defect that is an oxygen vacancy ($V_O$) into which hydrogen enters (hereinafter, sometimes referred to as $V_OH$), which generates an electron serving as a carrier. Therefore, when the region of the oxide semiconductor where a channel is formed includes oxygen vacancies, the transistor tends to have normally-on characteristics (even when no voltage is applied to the gate electrode, the channel exists and a current flows through the transistor). Thus, impurities, oxygen vacancies, and $V_OH$ are preferably reduced as much as possible in the region of the oxide semiconductor where a channel is formed.

The region 530*ba* and the region 530*bb* functioning as the source region and the drain region are each a low-resistance region with an increased carrier concentration because they include a large amount of oxygen vacancies ($V_O$) or have a high concentration of an impurity such as hydrogen, nitrogen, or a metal element. In other words, the region 530*ba* and the region 530*bb* are each an n-type region having a higher carrier concentration and a lower resistance than the region 530*bc*.

The carrier concentration in the region 530*bc* functioning as the channel formation region is preferably lower than or equal to $1\times10^{18}$ $cm^{-3}$, further preferably lower than $1\times10^{17}$ $cm^{-3}$, still further preferably lower than $1\times10^{16}$ $cm^{-3}$, yet further preferably lower than $1\times10^{13}$ $cm^{-3}$, yet still further preferably lower than $1\times10^{12}$ $cm^{-3}$. Note that the lower limit of the carrier concentration in the region 530*bc* functioning as the channel formation region is not particularly limited and can be, for example, $1\times10^{-9}$ $cm^{-3}$.

Between the region 530*bc* and the region 530*ba* or the region 530*bb*, a region having a carrier concentration that is lower than or substantially equal to the carrier concentrations in the region 530*ba* and the region 530*bb* and higher than or substantially equal to the carrier concentration in the region 530*bc* may be formed. That is, the region functions as a junction region between the region 530*bc* and the region 530*ba* or the region 530*bb*. The hydrogen concentration in the junction region is lower than or substantially equal to the hydrogen concentrations in the region 530*ba* and the region 530*bb* and higher than or substantially equal to the hydrogen concentration in the region 530*bc* in some cases. The amount of oxygen vacancies in the junction region is smaller than or substantially equal to the amounts of oxygen vacancies in the region 530*ba* and the region 530*bb* and larger than or substantially equal to the amount of oxygen vacancies in the region 530*bc* in some cases.

Although FIG. 15A illustrates an example in which the region 530*ba*, the region 530*bb*, and the region 530*bc* are formed in the oxide 530*b*, the present invention is not limited thereto. For example, the above regions may be formed not only in the oxide 530*b* but also in the oxide 530*a*.

In the oxide 530, the boundaries between the regions are difficult to detect clearly in some cases. The concentrations of a metal element and impurity elements such as hydrogen and nitrogen, which are detected in each region, may be not only gradually changed between the regions, but also continuously changed in each region. That is, the region closer to the channel formation region preferably has lower concentrations of a metal element and impurity elements such as hydrogen and nitrogen.

In the transistor 500, a metal oxide functioning as a semiconductor (such a metal oxide is hereinafter also referred to as an oxide semiconductor) is preferably used for the oxide 530 (the oxide 530*a* and the oxide 530*b*) including the channel formation region.

The metal oxide functioning as a semiconductor preferably has a band gap of 2 eV or more, further preferably 2.5 eV or more. With the use of a metal oxide having such a wide band gap, the off-state current of the transistor can be reduced.

As the oxide 530, it is preferable to use, for example, a metal oxide such as an In-M-Zn oxide containing indium, an element M, and zinc (the element M is one or more kinds selected from aluminum, gallium, yttrium, tin, copper, vanadium, beryllium, boron, titanium, iron, nickel, germanium, zirconium, molybdenum, lanthanum, cerium, neodymium, hafnium, tantalum, tungsten, magnesium, and the like). Alternatively, an In—Ga oxide, an In—Zn oxide, or an indium oxide may be used as the oxide 530.

Here, the atomic ratio of In to the element Min the metal oxide used as the oxide 530*b* is preferably greater than the atomic ratio of In to the element M in the metal oxide used as the oxide 530*a*.

The oxide 530*a* is provided under the oxide 530*b* in the above manner, whereby impurities and oxygen can be inhibited from diffusing into the oxide 530*b* from components formed below the oxide 530*a*.

When the oxide 530*a* and the oxide 530*b* contain a common element (as the main component) besides oxygen, the density of defect states at an interface between the oxide 530*a* and the oxide 530*b* can be made low. Since the density of defect states at the interface between the oxide 530*a* and the oxide 530*b* can be made low, the influence of interface scattering on carrier conduction is small, and a high on-state current can be obtained.

The oxide 530*b* preferably has crystallinity. It is particularly preferable to use a CAAC-OS (c-axis aligned crystalline oxide semiconductor) as the oxide 530*b*.

The CAAC-OS is a metal oxide having a dense structure with high crystallinity and small amounts of impurities and defects (e.g., oxygen vacancies ($V_O$)). In particular, after the formation of a metal oxide, heat treatment is performed at a temperature at which the metal oxide does not become a polycrystal (e.g., 400° C. to 600° C., inclusive), whereby a CAAC-OS having a dense structure with higher crystallinity can be obtained. When the density of the CAAC-OS is increased in such a manner, diffusion of impurities or oxygen in the CAAC-OS can be further reduced.

On the other hand, a clear crystal grain boundary is difficult to observe in the CAAC-OS; thus, it can be said that a reduction in electron mobility due to the crystal grain boundary is less likely to occur. Thus, a metal oxide including a CAAC-OS is physically stable. Therefore, the metal oxide including a CAAC-OS is resistant to heat and has high reliability.

If impurities and oxygen vacancies exist in a region of an oxide semiconductor where a channel is formed, a transistor using the oxide semiconductor might have variable electrical characteristics and poor reliability. In some cases, hydrogen in the vicinity of an oxygen vacancy forms a defect that is the oxygen vacancy into which hydrogen enters (hereinafter, sometimes referred to as $V_OH$), which generates an electron serving as a carrier. Therefore, when the region of the oxide semiconductor where a channel is formed includes oxygen vacancies, the transistor tends to have normally-on characteristics (even when no voltage is applied to the gate electrode, the channel exists and a current flows through the transistor). Thus, impurities, oxygen vacancies, and $V_OH$ are preferably reduced as much as possible in the region of the oxide semiconductor where a channel is formed. In other words, it is preferable that the region of the oxide semiconductor where a channel is formed have a reduced carrier concentration and be of an i-type (intrinsic) or substantially i-type.

As a countermeasure to the above, an insulator containing oxygen that is released by heating (hereinafter, sometimes referred to as excess oxygen) is provided in the vicinity of the oxide semiconductor and heat treatment is performed, so that oxygen can be supplied from the insulator to the oxide semiconductor to reduce oxygen vacancies and $V_OH$. However, supply of an excess amount of oxygen to the source region or the drain region might cause a decrease in the on-state current or field-effect mobility of the transistor 500. Furthermore, a variation of oxygen supplied to the source region or the drain region in the substrate plane leads to a variation in characteristics of the semiconductor device including the transistor.

Therefore, the region 530*bc* functioning as the channel formation region in the oxide semiconductor is preferably an i-type or substantially i-type region with a reduced carrier concentration, whereas the region 530*ba* and the region 530*bb* functioning as the source region and the drain region are preferably n-type regions with high carrier concentrations. That is, it is preferable that oxygen vacancies and $V_OH$ in the region 530*bc* of the oxide semiconductor be reduced and the region 530*ba* and the region 530*bb* not be supplied with an excess amount of oxygen.

Thus, in this embodiment, microwave treatment is performed in an oxygen-containing atmosphere in a state where the conductor 542*a* and the conductor 542*b* are provided over the oxide 530*b* so that oxygen vacancies and $V_OH$ in the region 530*bc* can be reduced. Here, the microwave treatment refers to, for example, treatment using an apparatus including a power source that generates high-density plasma with the use of a microwave.

The microwave treatment in an oxygen-containing atmosphere converts an oxygen gas into plasma using a high-frequency wave such as a microwave or RF and activates the oxygen plasma. At this time, the region 530*bc* can be irradiated with the high-frequency wave such as a microwave or RF. By the effect of the plasma, a microwave, or the like, $V_OH$ in the region 530*bc* can be cut; thus, hydrogen H can be removed from the region 530*bc* and an oxygen vacancy $V_O$ can be filled with oxygen. That is, the reaction "$V_OH \rightarrow H+V_O$" occurs in the region 530*bc*, so that the hydrogen concentration in the region 530*bc* can be reduced. As a result, oxygen vacancies and $V_OH$ in the region 530*bc* can be reduced to lower the carrier concentration.

In the microwave treatment in an oxygen-containing atmosphere, the high-frequency wave such as the microwave or RF, the oxygen plasma, or the like is blocked by the conductor 542*a* and the conductor 542*b* and does not affect the region 530*ba* nor the region 530*bb*. In addition, the effect of the oxygen plasma can be reduced by the insulator 571 and the insulator 580 that are provided to cover the oxide 530*b* and the conductor 542. Hence, a reduction in $V_OH$ and supply of an excess amount of oxygen do not occur in the region 530*ba* and the region 530*bb* in the microwave treatment, preventing a decrease in carrier concentration.

Microwave treatment is preferably performed in an oxygen-containing atmosphere after formation of an insulating film to be the insulator 552 or after formation of an insulating film to be the insulator 550. By performing the microwave treatment in an oxygen-containing atmosphere through the insulator 552 or the insulator 550 in such a manner, oxygen can be efficiently supplied into the region 530*bc*. In addition, the insulator 552 is provided to be in contact with the side surface of the conductor 542 and a surface of the region 530*bc*, thereby preventing oxygen more than necessary from being supplied to the region 530*bc* and preventing the side surface of the conductor 542 from being oxidized. Furthermore, the side surface of the conductor 542 can be inhibited from being oxidized when the insulating film to be the insulator 550 is formed.

The oxygen supplied into the region 530*bc* has any of a variety of forms such as an oxygen atom, an oxygen molecule, and an oxygen radical (an O radical, an atom or a molecule having an unpaired electron, or an ion). Note that the oxygen supplied into the region 530*bc* preferably has any one or more of the above forms, and is particularly preferably an oxygen radical. Furthermore, the film quality of the insulator 552 and the insulator 550 can be improved, leading to higher reliability of the transistor 500.

In the above manner, oxygen vacancies and $V_OH$ can be selectively removed from the region 530*bc* in the oxide semiconductor, whereby the region 530*bc* can be an i-type or substantially i-type region. Furthermore, supply of an excess amount of oxygen to the region 530*ba* and the region 530*bb* functioning as the source region and the drain region can be inhibited and the n-type conductivity can be maintained. As a result, a change in the electrical characteristics of the transistor 500 can be inhibited, and thus a variation in the electrical characteristics of the transistors 500 in the substrate plane can be reduced.

With the above structure, a semiconductor device with a small variation in transistor characteristics can be provided. A semiconductor device with favorable reliability can also be provided. A semiconductor device having favorable electrical characteristics can be provided.

As illustrated in FIG. 13B, a curved surface may be provided between the side surface of the oxide 530*b* and the top surface of the oxide 530*b* in a cross-sectional view of the transistor 500 in the channel width direction. In other words, an end portion of the side surface and an end portion of the top surface may be curved (hereinafter, also referred to as rounded).

The radius of curvature of the curved surface is preferably greater than 0 nm and less than the thickness of the oxide 530*b* in a region overlapping with the conductor 542, or less than half of the length of a region that does not have the curved surface. Specifically, the radius of curvature of the curved surface is greater than 0 nm and less than or equal to 20 nm, preferably greater than or equal to 1 nm and less than or equal to 15 nm, further preferably greater than or equal to 2 nm and less than or equal to 10 nm. Such a shape can improve the coverage of the oxide 530*b* with the insulator 552, the insulator 550, the insulator 554, and the conductor 560.

The oxide 530 preferably has a stacked-layer structure of a plurality of oxide layers with different chemical compositions. Specifically, the atomic ratio of the element M to a metal element that is a main component of the metal oxide used as the oxide 530*a* is preferably greater than the atomic ratio of the element M to a metal element that is a main component of the metal oxide used as the oxide 530*b*. Moreover, the atomic ratio of the element M to In in the metal oxide used as the oxide 530*a* is preferably greater than the atomic ratio of the element M to In in the metal oxide used as the oxide 530*b*. Furthermore, the atomic ratio of In to the element M in the metal oxide used as the oxide 530*b* is preferably greater than the atomic ratio of In to the element M in the metal oxide used as the oxide 530*a*.

The oxide 530*b* is preferably an oxide having crystallinity, such as a CAAC-OS. An oxide having crystallinity, such as a CAAC-OS, has a dense structure with small amounts of impurities and defects (e.g., oxygen vacancies) and high crystallinity. This can inhibit oxygen extraction from the oxide 530*b* by the source electrode or the drain electrode. This can reduce oxygen extraction from the oxide 530*b* even when heat treatment is performed; thus, the transistor 500 is stable with respect to high temperatures in a manufacturing process (what is called thermal budget).

Here, the conduction band minimum gradually changes at a junction portion of the oxide 530*a* and the oxide 530*b*. In other words, the conduction band minimum at the junction portion of the oxide 530*a* and the oxide 530*b* continuously changes or is continuously connected. To achieve this, the density of defect states in a mixed layer formed at the interface between the oxide 530*a* and the oxide 530*b* is preferably made low.

Specifically, when the oxide 530*a* and the oxide 530*b* contain a common element as a main component besides oxygen, a mixed layer with a low density of defect states can be formed. For example, in the case where the oxide 530*b* is an In-M-Zn oxide, an In-M-Zn oxide, an M-Zn oxide, an oxide of the element M, an In—Zn oxide, an indium oxide, or the like may be used as the oxide 530*a*.

Specifically, as the oxide 530*a*, a metal oxide with a composition of In:M:Zn=1:3:4 [atomic ratio] or in the neighborhood thereof, or a composition of In:M:Zn=1:1:0.5 [atomic ratio] or in the neighborhood thereof is used. As the oxide 530*b*, a metal oxide with a composition of In:M:Zn=1:1:1 [atomic ratio] or in the neighborhood thereof, or a composition of In:M:Zn=4:2:3 [atomic ratio] or in the neighborhood thereof is used. Note that a composition in the neighborhood includes the range of ±30% of an intended atomic ratio. Gallium is preferably used as the element M.

When the metal oxide is deposited by a sputtering method, the above atomic ratio is not limited to the atomic ratio of the deposited metal oxide and may be the atomic ratio of a sputtering target used for depositing the metal oxide.

As illustrated in FIG. 13A or the like, the insulator 552 formed using aluminum oxide or the like is provided in contact with the top and side surfaces of the oxide 530, whereby indium contained in the oxide 530 is unevenly distributed, in some cases, at an interface between the oxide 530 and the insulator 552 and in its vicinity. Accordingly, the vicinity of a surface of the oxide 530 comes to have an atomic ratio close to that of an indium oxide or that of an In—Zn oxide. Such an increase in the atomic ratio of indium in the vicinity of the surface of the oxide 530, especially the vicinity of the surface of the oxide 530*b*, can increase the field-effect mobility of the transistor 500.

When the oxide 530*a* and the oxide 530*b* have the above structure, the density of defect states at the interface between the oxide 530*a* and the oxide 530*b* can be made low. Thus, the influence of interface scattering on carrier conduction is small, and the transistor 500 can have a high on-state current and excellent frequency characteristics.

At least one of the insulator 512, the insulator 514, the insulator 544, the insulator 571, the insulator 574, an insulator 576, and an insulator 581 preferably functions as a barrier insulating film, which inhibits diffusion of impurities such as water and hydrogen from the substrate side or above the transistor 500 into the transistor 500. Thus, for at least one of the insulator 512, the insulator 514, the insulator 544, the insulator 571, the insulator 574, the insulator 576, and the insulator 581, it is preferable to use an insulating material having a function of inhibiting diffusion of impurities such as hydrogen atoms, hydrogen molecules, water molecules, nitrogen atoms, nitrogen molecules, nitrogen oxide molecules (e.g., $N_2O$, NO, or $NO_2$), or copper atoms (an insulating material through which the impurities are less likely to pass). Alternatively, it is preferable to use an insulating material having a function of inhibiting diffusion of oxygen (e.g., at least one of oxygen atoms, oxygen molecules, and the like) (an insulating material through which the oxygen is less likely to pass).

Note that in this specification, a barrier insulating film refers to an insulating film having a barrier property. A barrier property in this specification means a function of inhibiting diffusion of a targeted substance (also referred to as having low permeability). In addition, a barrier property in this specification means a function of capturing and fixing (also referred to as gettering) a targeted substance.

An insulator having a function of inhibiting diffusion of oxygen and impurities such as water and hydrogen is preferably used as the insulator 512, the insulator 514, the insulator 544, the insulator 571, the insulator 574, the insulator 576, and the insulator 581; for example, aluminum oxide, magnesium oxide, hafnium oxide, gallium oxide, indium gallium zinc oxide, silicon nitride, or silicon nitride oxide can be used. For example, silicon nitride, which has a higher hydrogen barrier property, is preferably used for the insulator 512, the insulator 544, and the insulator 576. For example, aluminum oxide or magnesium oxide, which has a function of capturing or fixing hydrogen well, is preferably used for the insulator 514, the insulator 571, the insulator 574, and the insulator 581. In this case, impurities such as water and hydrogen can be inhibited from diffusing to the transistor 500 side from the substrate side through the insulator 512 and the insulator 514. Impurities such as water and hydrogen can be inhibited from diffusing to the transistor 500 side from an interlayer insulating film and the like which are provided outside the insulator 581. Alternatively, oxygen contained in the insulator 524 and the like can be inhibited from diffusing to the substrate side through the insulator 512 and the insulator 514. Alternatively, oxygen contained in the insulator 580 and the like can be inhibited from diffusing to above the transistor 500 through the insulator 574 and the like. In this manner, it is preferable that the transistor 500 be surrounded by the insulator 512, the insulator 514, the insulator 571, the insulator 544, the insulator 574, the insulator 576, and the insulator 581, which have a function of inhibiting diffusion of oxygen and impurities such as water and hydrogen.

Here, an oxide having an amorphous structure is preferably used for the insulator 512, the insulator 514, the insulator 544, the insulator 571, the insulator 574, the insulator 576, and the insulator 581. For example, a metal oxide such as $AlO_x$ (x is a given number greater than 0) or $MgO_y$ (y is a given number greater than 0) is preferably used. In such a metal oxide having an amorphous structure, an oxygen atom has a dangling bond and sometimes has a property of capturing or fixing hydrogen with the dangling bond. When such a metal oxide having an amorphous structure is used as the component of the transistor 500 or provided around the transistor 500, hydrogen contained in the transistor 500 or hydrogen present around the transistor 500 can be captured or fixed. In particular, hydrogen contained in the channel formation region of the transistor 500 is preferably captured or fixed. The metal oxide having an amorphous structure is used as the component of the transistor 500 or provided around the transistor 500, whereby the transistor 500 and a semiconductor device, which have favorable characteristics and high reliability, can be manufactured.

Although each of the insulator 512, the insulator 514, the insulator 544, the insulator 571, the insulator 574, the insulator 576, and the insulator 581 preferably has an amorphous structure, a region having a polycrystalline structure may be partly formed. Alternatively, each of the insulator 512, the insulator 514, the insulator 544, the insulator 571, the insulator 574, the insulator 576, and the insulator 581 may have a multilayer structure in which a layer having an amorphous structure and a layer having a polycrystalline structure are stacked. For example, a stacked-layer structure in which a layer having a polycrystalline structure is formed over a layer having an amorphous structure may be employed.

The insulator 512, the insulator 514, the insulator 544, the insulator 571, the insulator 574, the insulator 576, and the insulator 581 can be deposited by a sputtering method, for example. Since a sputtering method does not need to use a molecule containing hydrogen as a deposition gas, the hydrogen concentrations in the insulator 512, the insulator 514, the insulator 544, the insulator 571, the insulator 574, the insulator 576, and the insulator 581 can be reduced. Note that the deposition method is not limited to a sputtering method, and a chemical vapor deposition (CVD) method, a molecular beam epitaxy (MBE) method, a pulsed laser deposition (PLD) method, an atomic layer deposition (ALD) method, or the like may be used as appropriate.

The resistivities of the insulator 512, the insulator 544, and the insulator 576 are preferably low in some cases. For example, by setting the resistivities of the insulator 512, the insulator 544, and the insulator 576 to approximately $1\times10^{13}$ Ωkm, the insulator 512, the insulator 544, and the insulator 576 can sometimes reduce charge up of the conductor 503, the conductor 542, the conductor 560, or the like in treatment using plasma or the like in the manufacturing process of a semiconductor device. The resistivities of the insulator 512, the insulator 544, and the insulator 576 are preferably higher than or equal to $1\times10^{10}$ Ωcm and lower than or equal to $1\times10^{15}$ Ωcm.

The insulator 516, the insulator 574, the insulator 580, and the insulator 581 each preferably have a lower permittivity than the insulator 514. When a material with a low permittivity is used for an interlayer film, parasitic capacitance generated between wirings can be reduced. For the insulator 516, the insulator 580, and the insulator 581, silicon oxide, silicon oxynitride, silicon oxide to which fluorine is added, silicon oxide to which carbon is added, silicon oxide to which carbon and nitrogen are added, porous silicon oxide, or the like is used as appropriate, for example.

The insulator 581 is preferably an insulator functioning as an interlayer film, a planarization film, or the like, for example.

The conductor 503 is provided to overlap with the oxide 530 and the conductor 560. Here, the conductor 503 is preferably provided to be embedded in an opening formed in the insulator 516. Part of the conductor 503 is embedded in the insulator 514 in some cases.

The conductor 503 includes the conductor 503*a* and the conductor 503*b*. The conductor 503*a* is provided in contact with a bottom surface and a sidewall of the opening. The conductor 503*b* is provided to be embedded in a recessed portion formed in the conductor 503*a*. Here, the upper portion of the conductor 503*b* is substantially level with the upper portion of the conductor 503*a* and the upper portion of the insulator 516.

Here, for the conductor 503*a*, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, or the like), and a copper atom. Alternatively, it is preferable to use a conductive material having a function of inhibiting diffusion of oxygen (e.g., at least one of an oxygen atom, an oxygen molecule, and the like).

When the conductor 503*a* is formed using a conductive material having a function of inhibiting diffusion of hydrogen, impurities such as hydrogen contained in the conductor 503*b* can be prevented from diffusing into the oxide 530 through the insulator 524 and the like. When the conductor 503*a* is formed using a conductive material having a function of inhibiting diffusion of oxygen, the conductivity of the conductor 503*b* can be inhibited from being lowered because of oxidation. As the conductive material having a function of inhibiting diffusion of oxygen, for example, titanium, titanium nitride, tantalum, tantalum nitride, ruthenium, or ruthenium oxide is preferably used. Thus, a single layer or a stacked layer of the above conductive material is used as the conductor 503*a*. For example, titanium nitride is used for the conductor 503*a*.

Moreover, the conductor 503*b* is preferably formed using a conductive material containing tungsten, copper, or aluminum as its main component. For example, tungsten is used for the conductor 503*b*.

The conductor 503 sometimes functions as a second gate electrode. In that case, by changing a potential applied to the conductor 503 not in conjunction with but independently of a potential applied to the conductor 560, the threshold voltage (Vth) of the transistor 500 can be controlled. In particular, Vth of the transistor 500 can be higher in the case where a negative potential is applied to the conductor 503, and the off-state current can be reduced. Thus, a drain current at the time when a potential applied to the conductor 560 is 0 V can be lower in the case where a negative potential is applied to the conductor 503 than in the case where a negative potential is not applied to the conductor 503.

The electric resistivity of the conductor 503 is designed in consideration of the potential applied to the conductor 503, and the thickness of the conductor 503 is determined in accordance with the electric resistivity. The thickness of the insulator 516 is substantially equal to that of the conductor 503. The conductor 503 and the insulator 516 are preferably as thin as possible in the allowable range of the design of the conductor 503. When the thickness of the insulator 516 is reduced, the absolute amount of impurities such as hydrogen contained in the insulator 516 can be reduced, reducing the amount of the impurities to be diffused into the oxide 530.

When seen from above, the conductor 503 is preferably provided to be larger than a region of the oxide 530 that does not overlap with the conductor 542*a* or the conductor 542*b*. As illustrated in FIG. 13B, it is particularly preferable that the conductor 503 extend to a region outside end portions of the oxide 530$a$ and the oxide 530$b$ in the channel width direction. That is, the conductor 503 and the conductor 560 preferably overlap with each other with the insulators therebetween on the outer side of the side surface of the oxide 530 in the channel width direction. With this structure, the channel formation region of the oxide 530 can be electrically surrounded by the electric field of the conductor 560 functioning as a first gate electrode and the electric field of the conductor 503 functioning as the second gate electrode. In this specification, a transistor structure in which a channel formation region is electrically surrounded by electric fields of a first gate and a second gate is referred to as a surrounded channel (S-channel) structure.

In this specification and the like, a transistor having the S-channel structure refers to a transistor having a structure in which a channel formation region is electrically surrounded by electric fields of a pair of gate electrodes. The S-channel structure disclosed in this specification and the like is different from a Fin-type structure and a planar structure. With the S-channel structure, resistance to a short-channel effect can be enhanced, that is, a transistor in which a short-channel effect is less likely to occur can be provided.

Furthermore, as illustrated in FIG. 13B, the conductor 503 is extended to function as a wiring as well. However, without limitation to this structure, a structure in which a conductor functioning as a wiring is provided below the conductor 503 may be employed. In addition, the conductor 503 is not necessarily provided in each transistor. For example, the conductor 503 may be shared by a plurality of transistors.

Although the transistor 500 having a structure in which the conductor 503 is a stack of the conductor 503$a$ and the conductor 503$b$ is illustrated, the present invention is not limited thereto. For example, the conductor 503 may be provided to have a single-layer structure or a stacked-layer structure of three or more layers.

The insulator 522 and the insulator 524 function as a gate insulator.

It is preferable that the insulator 522 have a function of inhibiting diffusion of hydrogen (e.g., at least one of a hydrogen atom, a hydrogen molecule, and the like). In addition, it is preferable that the insulator 522 have a function of inhibiting diffusion of oxygen (e.g., at least one of an oxygen atom, an oxygen molecule, and the like). For example, the insulator 522 preferably has a function of inhibiting diffusion of one or both of hydrogen and oxygen more than the insulator 524.

As the insulator 522, an insulator containing an oxide of one or both of aluminum and hafnium, which is an insulating material, is preferably used. For the insulator, aluminum oxide, hafnium oxide, an oxide containing aluminum and hafnium (hafnium aluminate), or the like is preferably used. In the case where the insulator 522 is formed using such a material, the insulator 522 functions as a layer that inhibits release of oxygen from the oxide 530 to the substrate side and diffusion of impurities such as hydrogen from the periphery of the transistor 500 into the oxide 530. Thus, providing the insulator 522 can inhibit diffusion of impurities such as hydrogen into the transistor 500 and inhibit generation of oxygen vacancies in the oxide 530. Moreover, the conductor 503 can be inhibited from reacting with oxygen contained in the insulator 524 or the oxide 530.

Alternatively, aluminum oxide, bismuth oxide, germanium oxide, niobium oxide, silicon oxide, titanium oxide, tungsten oxide, yttrium oxide, or zirconium oxide may be added to the above insulator, for example. Alternatively, these insulators may be subjected to nitriding treatment. A stack of silicon oxide, silicon oxynitride, or silicon nitride over these insulators may be used for the insulator 522.

For example, a single layer or stacked layers of an insulator containing what is called a high-k material such as aluminum oxide, hafnium oxide, tantalum oxide, or zirconium oxide may be used for the insulator 522. As miniaturization and high integration of transistors progress, a problem such as a leakage current may arise because of a thinner gate insulator. When a high-k material is used for an insulator functioning as the gate insulator, a gate potential at the time when the transistor operates can be reduced while the physical thickness is maintained. Furthermore, a substance with a high permittivity such as lead zirconate titanate (PZT), strontium titanate ($SrTiO_3$), or $(Ba,Sr)TiO_3$ (BST) may be used for the insulator 522.

Silicon oxide or silicon oxynitride, for example, can be used as appropriate for the insulator 524 that is in contact with the oxide 530.

In a manufacturing process of the transistor 500, heat treatment is preferably performed with the surface of the oxide 530 exposed. For example, the heat treatment is performed at a temperature higher than or equal to 100° C. and lower than or equal to 600° C., preferably higher than or equal to 350° C. and lower than or equal to 550° C. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. This can supply oxygen to the oxide 530 to reduce oxygen vacancies ($V_O$). The heat treatment may be performed under reduced pressure. Alternatively, the heat treatment may be performed in an atmosphere containing an oxidizing gas at 10 ppm or more, 1% or more, or 10% or more in order to compensate for released oxygen, after heat treatment in a nitrogen gas or inert gas atmosphere. Alternatively, the heat treatment may be performed in a nitrogen gas or inert gas atmosphere successively after heat treatment is performed in an atmosphere containing an oxidizing gas at 10 ppm or more, 1% or more, or 10% or more.

Note that oxygen adding treatment performed on the oxide 530 can promote a reaction in which oxygen vacancies in the oxide 530 are repaired with supplied oxygen, i.e., a reaction of "$V_O$+O→null". Furthermore, hydrogen remaining in the oxide 530 reacts with supplied oxygen, so that the hydrogen can be removed as $H_2O$ (dehydration). This can inhibit recombination of hydrogen remaining in the oxide 530 with oxygen vacancies and formation of $V_OH$.

Note that the insulator 522 and the insulator 524 may each have a stacked-layer structure of two or more layers. In that case, without limitation to a stacked-layer structure formed of the same material, a stacked-layer structure formed of different materials may be employed. The insulator 524 may be formed into an island shape so as to overlap with the oxide 530$a$. In this case, the insulator 544 is in contact with the side surface of the insulator 524 and the top surface of the insulator 522.

The conductor 542$a$ and the conductor 542$b$ are provided in contact with the top surface of the oxide 530$b$. The conductor 542$a$ and the conductor 542$b$ function as a source electrode and a drain electrode of the transistor 500.

For the conductor 542 (the conductor 542$a$ and the conductor 542$b$), for example, a nitride containing tantalum, a nitride containing titanium, a nitride containing molybdenum, a nitride containing tungsten, a nitride containing tantalum and aluminum, a nitride containing titanium and aluminum, or the like is preferably used. In one embodiment of the present invention, a nitride containing tantalum is particularly preferable. For another example, ruthenium oxide, ruthenium nitride, an oxide containing strontium and ruthenium, or an oxide containing lanthanum and nickel may be used. These materials are preferable because they are each a conductive material that is not easily oxidized or a material that maintains the conductivity even after absorbing oxygen.

Note that hydrogen contained in the oxide 530*b* or the like diffuses into the conductor 542*a* or the conductor 542*b* in some cases. In particular, when a nitride containing tantalum is used for the conductor 542*a* and the conductor 542*b*, hydrogen contained in the oxide 530*b* or the like is likely to diffuse into the conductor 542*a* or the conductor 542*b*, and the diffused hydrogen is bonded to nitrogen contained in the conductor 542*a* or the conductor 542*b* in some cases. That is, hydrogen contained in the oxide 530*b* or the like is absorbed by the conductor 542*a* or the conductor 542*b* in some cases.

No curved surface is preferably formed between the side surface of the conductor 542 and the top surface of the conductor 542. When no curved surface is formed in the conductor 542, the conductor 542 can have a large cross-sectional area in the channel width direction. Accordingly, the conductivity of the conductor 542 is increased, so that the on-state current of the transistor 500 can be increased.

The insulator 571*a* is provided in contact with the top surface of the conductor 542*a*, and the insulator 571*b* is provided in contact with the top surface of the conductor 542*b*. The insulator 571 preferably functions as at least a barrier insulating film against oxygen. Thus, the insulator 571 preferably has a function of inhibiting oxygen diffusion. For example, the insulator 571 preferably has a function of inhibiting diffusion of oxygen more than the insulator 580. For example, a nitride containing silicon such as silicon nitride may be used for the insulator 571. The insulator 571 preferably has a function of capturing impurities such as hydrogen. In that case, for the insulator 571, a metal oxide having an amorphous structure, for example, an insulator such as aluminum oxide or magnesium oxide, may be used. It is particularly preferable to use aluminum oxide having an amorphous structure or amorphous aluminum oxide for the insulator 571 because hydrogen can be captured or fixed more effectively in some cases. Accordingly, the transistor 500 and a semiconductor device, which have favorable characteristics and high reliability, can be manufactured.

The insulator 544 is provided to cover the insulator 524, the oxide 530*a*, the oxide 530*b*, the conductor 542, and the insulator 571. The insulator 544 preferably has a function of capturing and fixing hydrogen. In that case, the insulator 544 preferably includes silicon nitride, or a metal oxide having an amorphous structure, for example, an insulator such as aluminum oxide or magnesium oxide. Alternatively, for example, a stacked-layer film of aluminum oxide and silicon nitride over the aluminum oxide may be used as the insulator 544.

When the above insulator 571 and the insulator 544 are provided, the conductor 542 can be surrounded by the insulators having a barrier property against oxygen. That is, oxygen contained in the insulator 524 and the insulator 580 can be prevented from diffusing into the conductor 542. As a result, the conductor 542 can be inhibited from being directly oxidized by oxygen contained in the insulator 524 and the insulator 580, so that an increase in resistivity and a reduction in on-state current can be inhibited.

The insulator 552 functions as part of the gate insulator. As the insulator 552, a barrier insulating film against oxygen is preferably used. As the insulator 552, an insulator that can be used as the insulator 574 described above may be used. An insulator containing an oxide of one or both of aluminum and hafnium is preferably used as the insulator 552. As the insulator, aluminum oxide, hafnium oxide, an oxide containing aluminum and hafnium (hafnium aluminate), an oxide containing hafnium and silicon (hafnium silicate), or the like can be used. In this embodiment, aluminum oxide is used for the insulator 552. In this case, the insulator 552 is an insulator containing at least oxygen and aluminum.

As illustrated in FIG. 13B, the insulator 552 is provided in contact with the top surface and the side surface of the oxide 530*b*, the side surface of the oxide 530*a*, the side surface of the insulator 524, and the top surface of the insulator 522. That is, the regions of the oxide 530*a*, the oxide 530*b*, and the insulator 524 that overlap with the conductor 560 are covered with the insulator 552 in the cross section in the channel width direction. With this structure, the insulator 552 having a barrier property against oxygen can prevent release of oxygen from the oxide 530*a* and the oxide 530*b* at the time of heat treatment or the like. This can inhibit formation of oxygen vacancies ($V_O$) in the oxide 530*a* and the oxide 530*b*. Therefore, oxygen vacancies ($V_O$) and $V_OH$ formed in the region 530*bc* can be reduced. Thus, the transistor 500 can have favorable electrical characteristics and higher reliability.

Even when an excess amount of oxygen is contained in the insulator 580, the insulator 550, and the like, oxygen can be inhibited from being excessively supplied to the oxide 530*a* and the oxide 530*b*. Thus, the region 530*ba* and the region 530*bb* are inhibited from being excessively oxidized by oxygen through the region 530*bc*; a reduction in on-state current or field-effect mobility of the transistor 500 can be inhibited.

As illustrated in FIG. 13A, the insulator 552 is provided in contact with the side surfaces of the conductor 542, the insulator 544, the insulator 571, and the insulator 580. This can inhibit formation of an oxide film on the side surface of the conductor 542 by oxidization of the side surface. Accordingly, a reduction in on-state current or field-effect mobility of the transistor 500 can be inhibited.

Furthermore, the insulator 552 needs to be provided in an opening formed in the insulator 580 and the like, together with the insulator 554, the insulator 550, and the conductor 560. The thickness of the insulator 552 is preferably small for miniaturization of the transistor 500. The thickness of the insulator 552 is preferably greater than or equal to 0.1 nm, greater than or equal to 0.5 nm, or greater than or equal to 1.0 nm, and less than or equal to 1.0 nm, less than or equal to 3.0 nm, or less than or equal to 5.0 nm. Note that the above-described lower limits and upper limits can be combined with each other. In that case, at least part of the insulator 552 includes a region having the above-described thickness. The thickness of the insulator 552 is preferably smaller than that of the insulator 550. In that case, at least part of the insulator 552 includes a region having a thickness smaller than that of the insulator 550.

To form the insulator 552 having a small thickness as described above, an ALD method is preferably used for deposition. Examples of an ALD method include a thermal ALD method, in which a precursor and a reactant react with each other only by thermal energy, and a PEALD (Plasma Enhanced ALD) method, in which a reactant excited by plasma is used. The use of plasma in a PEALD method is sometimes preferable because deposition at a lower temperature is possible.

An ALD method, which enables an atomic layer to be deposited one by one using self-limiting characteristics by atoms, has advantages such as deposition of an extremely thin film, deposition on a component with a high aspect ratio, deposition of a film with a small number of defects such as pinholes, deposition with excellent coverage, and low-temperature deposition. Therefore, the insulator 552 can be formed on the side surface of the opening formed in the insulator 580 and the like to have a small thickness as described above and to have favorable coverage.

Note that some of precursors usable in an ALD method contain carbon or the like. Thus, in some cases, a film provided by an ALD method contains impurities such as carbon in a larger amount than a film provided by another deposition method. Note that impurities can be quantified by secondary ion mass spectrometry (SIMS) or X-ray photoelectron spectroscopy (XPS).

The insulator 550 functions as part of the gate insulator. The insulator 550 is preferably provided in contact with a top surface of the insulator 552. The insulator 550 can be formed using silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like. In particular, silicon oxide and silicon oxynitride, which have thermal stability, are preferable. The insulator 550 in this case is an insulator containing at least oxygen and silicon.

As in the insulator 524, the concentration of impurities such as water and hydrogen in the insulator 550 is preferably reduced. The thickness of the insulator 550 is preferably greater than or equal to 1 nm or greater than or equal to 0.5 nm and less than or equal to 15 nm or less than or equal to 20 nm. Note that the above-described lower limits and upper limits can be combined with each other. In that case, at least part of the insulator 550 includes a region having the above-described thickness.

Although FIG. 13A, FIG. 13B, and the like illustrate a single-layer structure of the insulator 550, the present invention is not limited to this structure, and a stacked-layer structure of two or more layers may be employed. For example, as illustrated in FIG. 15B, the insulator 550 may have a stacked-layer structure including two layers of an insulator 550*a* and an insulator 550*b* over the insulator 550*a*.

Figure 15B:
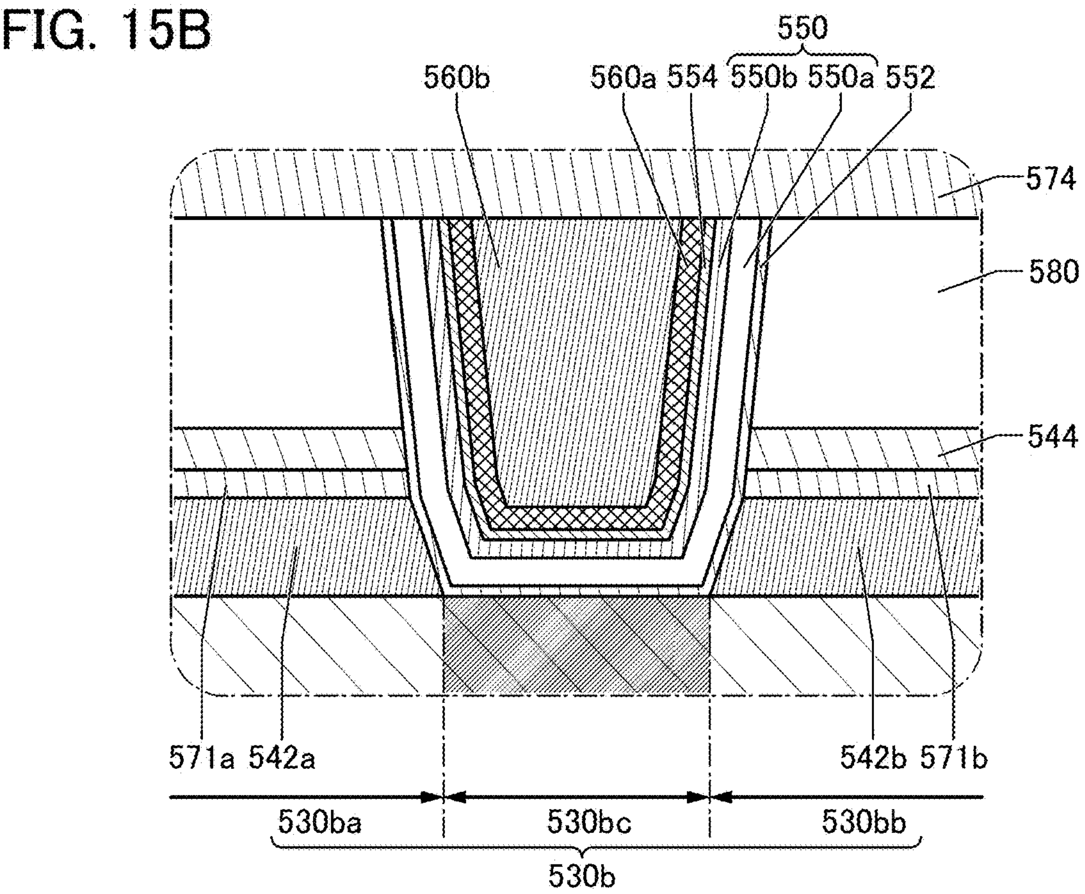

In the case where the insulator 550 has a stacked-layer structure of two layers as illustrated in FIG. 15B, it is preferable that the insulator 550*a* in a lower layer be formed using an insulator that is likely to transmit oxygen and the insulator 550*b* in an upper layer be formed using an insulator having a function of inhibiting oxygen diffusion. With such a structure, oxygen contained in the insulator 550*a* can be inhibited from diffusing into the conductor 560. That is, a reduction in the amount of oxygen supplied to the oxide 530 can be inhibited. In addition, oxidation of the conductor 560 due to oxygen contained in the insulator 550*a* can be inhibited. For example, it is preferable that the insulator 550*a* be provided using any of the above-described materials that can be used for the insulator 550 and the insulator 550*b* be provided using an insulator containing an oxide of one or both of aluminum and hafnium. As the insulator, aluminum oxide, hafnium oxide, an oxide containing aluminum and hafnium (hafnium aluminate), an oxide containing hafnium and silicon (hafnium silicate), or the like can be used. In this embodiment, hafnium oxide is used as the insulator 550*b*. In this case, the insulator 550*b* is an insulator containing at least oxygen and hafnium. The thickness of the insulator 550*b* is preferably greater than or equal to 0.5 nm or greater than or equal to 1.0 nm, and less than or equal to 3.0 nm or less than or equal to 5.0 nm. Note that the above-described lower limits and upper limits can be combined with each other. In that case, at least part of the insulator 550*b* includes a region having the above-described thickness.

In the case where silicon oxide, silicon oxynitride, or the like is used for the insulator 550*a*, the insulator 550*b* may be formed using an insulating material that is a high-k material having a high dielectric constant. The gate insulator having a stacked-layer structure of the insulator 550*a* and the insulator 550*b* can be thermally stable and can have a high dielectric constant. Thus, a gate potential that is applied during the operation of the transistor can be reduced while the physical thickness of the gate insulator is maintained. In addition, the equivalent oxide thickness (EOT) of the insulator functioning as the gate insulator can be reduced. Therefore, the withstand voltage of the insulator 550 can be increased.

The insulator 554 functions as part of a gate insulator. As the insulator 554, a barrier insulating film against hydrogen is preferably used. This can prevent diffusion of impurities such as hydrogen contained in the conductor 560 into the insulator 550 and the oxide 530*b*. As the insulator 554, an insulator that can be used as the insulator 576 described above may be used. For example, silicon nitride deposited by a PEALD method may be used as the insulator 554. In this case, the insulator 554 is an insulator containing at least nitrogen and silicon.

Furthermore, the insulator 554 may have a barrier property against oxygen. Thus, diffusion of oxygen contained in the insulator 550 into the conductor 560 can be inhibited.

Furthermore, the insulator 554 needs to be provided in an opening formed in the insulator 580 and the like, together with the insulator 552, the insulator 550, and the conductor 560. The thickness of the insulator 554 is preferably small for miniaturization of the transistor 500. The thickness of the insulator 554 is preferably greater than or equal to 0.1 nm, greater than or equal to 0.5 nm, or greater than or equal to 1.0 nm, and less than or equal to 3.0 nm or less than or equal to 5.0 nm. Note that the above-described lower limits and upper limits can be combined with each other. In that case, at least part of the insulator 554 includes a region having the above-described thickness. The thickness of the insulator 554 is preferably smaller than that of the insulator 550. In that case, at least part of the insulator 554 includes a region having a thickness smaller than that of the insulator 550.

The conductor 560 functions as the first gate electrode of the transistor 500. The conductor 560 preferably includes the conductor 560*a* and the conductor 560*b* provided over the conductor 560*a*. For example, the conductor 560*a* is preferably provided to cover a bottom surface and a side surface of the conductor 560*b*. As illustrated in FIG. 13A and FIG. 13B, the upper portion of the conductor 560 is substantially level with the upper portion of the insulator 550. Note that although the conductor 560 has a two-layer structure of the conductor 560*a* and the conductor 560*b* in FIG. 13A and FIG. 13B, the conductor 560 can have, besides the two-layer structure, a single-layer structure or a stacked-layer structure of three or more layers.

For the conductor 560*a*, a conductive material having a function of inhibiting diffusion of impurities such as a hydrogen atom, a hydrogen molecule, a water molecule, a nitrogen atom, a nitrogen molecule, a nitrogen oxide molecule, and a copper atom is preferably used. Alternatively, it is preferable to use a conductive material having a function of inhibiting diffusion of oxygen (e.g., at least one of an oxygen atom, an oxygen molecule, and the like).

In addition, when the conductor 560*a* has a function of inhibiting diffusion of oxygen, the conductivity of the conductor 560*b* can be inhibited from being lowered because of oxidation due to oxygen contained in the insulator 550. As the conductive material having a function of inhibiting diffusion of oxygen, for example, titanium, titanium nitride, tantalum, tantalum nitride, ruthenium, or ruthenium oxide is preferably used.

Furthermore, the conductor 560 also functions as a wiring and thus is preferably a conductor having high conductivity. For example, a conductive material containing tungsten, copper, or aluminum as its main component can be used for the conductor 560*b*. The conductor 560*b* can have a stacked-layer structure. Specifically, for example, the conductor 560*b* can have a stacked-layer structure of titanium or titanium nitride and the above conductive material.

In the transistor 500, the conductor 560 is formed in a self-aligned manner to fill the opening formed in the insulator 580 and the like. The formation of the conductor 560 in this manner allows the conductor 560 to be placed properly in a region between the conductor 542*a* and the conductor 542*b* without alignment.

As illustrated in FIG. 13B, in the channel width direction of the transistor 500, with reference to a bottom surface of the insulator 522, the level of the bottom surface of the conductor 560 in a region where the conductor 560 and the oxide 530*b* do not overlap with each other is preferably lower than the level of a bottom surface of the oxide 530*b*. When the conductor 560 functioning as the gate electrode covers the side surface and the top surface of the channel formation region of the oxide 530*b* with the insulator 550 and the like therebetween, the electric field of the conductor 560 can easily act on the entire channel formation region of the oxide 530*b*. Thus, the on-state current of the transistor 500 can be increased and the frequency characteristics of the transistor 500 can be improved. The difference between the level of the bottom surface of the conductor 560 in a region where the oxide 530*a* and the oxide 530*b* do not overlap with the conductor 560 and the level of the bottom surface of the oxide 530*b*, with reference to the bottom surface of the insulator 522, is preferably greater than or equal to 0 nm, greater than or equal to 3 nm, or greater than or equal to 5 nm, and less than or equal to 20 nm, less than or equal to 50 nm, or less than or equal to 100 nm. Note that the above-described lower limits and upper limits can be combined with each other.

The insulator 580 is provided over the insulator 544, and the opening is formed in a region where the insulator 550 and the conductor 560 are to be provided. In addition, the top surface of the insulator 580 may be planarized.

The insulator 580 functioning as an interlayer film preferably has a low permittivity. When a material with a low permittivity is used for an interlayer film, parasitic capacitance generated between wirings can be reduced. The insulator 580 is preferably provided using a material similar to that for the insulator 516, for example. In particular, silicon oxide and silicon oxynitride, which have thermal stability, are preferable. Materials such as silicon oxide, silicon oxynitride, and porous silicon oxide are particularly preferable because a region containing oxygen to be released by heating can be easily formed.

The concentration of impurities such as water and hydrogen in the insulator 580 is preferably reduced. An oxide containing silicon, such as silicon oxide or silicon oxynitride, is used as appropriate for the insulator 580, for example.

The insulator 574 preferably functions as a barrier insulating film that inhibits impurities such as water and hydrogen from diffusing into the insulator 580 from above and preferably has a function of capturing impurities such as hydrogen. The insulator 574 preferably functions as a barrier insulating film that inhibits passage of oxygen. For the insulator 574, a metal oxide having an amorphous structure, for example, an insulator such as aluminum oxide, can be used. In this case, the insulator 574 is an insulator containing at least oxygen and aluminum. The insulator 574, which has a function of capturing impurities such as hydrogen, is provided in contact with the insulator 580 in a region sandwiched between the insulator 512 and the insulator 581, whereby impurities such as hydrogen contained in the insulator 580 and the like can be captured and the amount of hydrogen in the region can be constant. It is particularly preferable to use aluminum oxide having an amorphous structure for the insulator 574, in which case hydrogen can sometimes be captured or fixed more effectively. Accordingly, the transistor 500 and a semiconductor device, which have favorable characteristics and high reliability, can be manufactured.

The insulator 576 functions as a barrier insulating film that inhibits impurities such as water and hydrogen from diffusing into the insulator 580 from above. The insulator 576 is provided over the insulator 574. The insulator 576 is preferably formed using a nitride containing silicon such as silicon nitride or silicon nitride oxide. For example, silicon nitride deposited by a sputtering method may be used for the insulator 576. When the insulator 576 is deposited by a sputtering method, a high-density silicon nitride film can be formed. To obtain the insulator 576, silicon nitride deposited by a PEALD method or a CVD method may be stacked over silicon nitride deposited by a sputtering method.

One of a first terminal and a second terminal of the transistor 500 is electrically connected to a conductor 540*a* serving as a plug, and the other of the first terminal and the second terminal of the transistor 500 is electrically connected to a conductor 540*b*. Note that in this specification and the like, the conductor 540*a* and the conductor 540*b* are collectively referred to as the conductor 540.

The conductor 540*a* is provided in a region overlapping with the conductor 542*a*, for example. Specifically, an opening portion is formed in the insulator 571, the insulator 544, the insulator 580, the insulator 574, the insulator 576, and the insulator 581 illustrated in FIG. 13A and in an insulator 582 and an insulator 586 illustrated in FIG. 12 in the region overlapping with the conductor 542*a*, and the conductor 540*a* is provided inside the opening portion. The conductor 540*b* is provided in a region overlapping with the conductor 542*b*, for example. Specifically, an opening portion is formed in the insulator 571, the insulator 544, the insulator 580, the insulator 574, the insulator 576, and the insulator 581 illustrated in FIG. 13A and in the insulator 582 and the insulator 586 illustrated in FIG. 12 in the region overlapping with the conductor 542*b*, and the conductor 540*b* is provided inside the opening portion. Note that the insulator 582 and the insulator 586 will be described later.

As illustrated in FIG. 13A, an insulator 541*a* as an insulator having an impurity barrier property may be provided between the conductor 540*a* and the side surface of the opening portion in the region overlapping with the conductor 542*a*. Similarly, an insulator 541*b* as an insulator having an impurity barrier property may be provided between the conductor 540*b* and the side surface of the opening portion in the region overlapping with the conductor 542*b*. Note that in this specification and the like, the insulator 541_a_ and the insulator 541_b_ are collectively referred to as the insulator 541.

For the conductor 540_a_ and the conductor 540_b_, a conductive material containing tungsten, copper, or aluminum as its main component is preferably used. The conductor 540_a_ and the conductor 540_b_ may each have a stacked-layer structure.

In the case where the conductor 540 has a stacked-layer structure, a conductive material having a function of inhibiting passage of impurities such as water and hydrogen is preferably used for a first conductor provided in the vicinity of the insulator 574, the insulator 576, the insulator 581, the insulator 580, the insulator 544, and the insulator 571. For example, tantalum, tantalum nitride, titanium, titanium nitride, ruthenium, ruthenium oxide, or the like is preferably used. The conductive material having a function of inhibiting passage of impurities such as water and hydrogen may be used as a single layer or stacked layers. Moreover, impurities such as water and hydrogen contained in a layer above the insulator 576 can be inhibited from entering the oxide 530 through the conductor 540_a_ and the conductor 540_b_.

For the insulator 541_a_ and the insulator 541_b_, a barrier insulating film that can be used for the insulator 544 or the like may be used. For the insulator 541_a_ and the insulator 541_b_, for example, an insulator such as silicon nitride, aluminum oxide, or silicon nitride oxide may be used. Since the insulator 541_a_ and the insulator 541_b_ are provided in contact with the insulator 574, the insulator 576, and the insulator 571, impurities such as water and hydrogen contained in the insulator 580 or the like can be inhibited from entering the oxide 530 through the conductor 540_a_ and the conductor 540_b_. In particular, silicon nitride is suitable because of its high blocking property against hydrogen. Furthermore, oxygen contained in the insulator 580 can be prevented from being absorbed by the conductor 540_a_ and the conductor 540_b_.

When the insulator 541_a_ and the insulator 541_b_ each have a stacked-layer structure as illustrated in FIG. 13A, a first insulator in contact with an inner wall of the opening in the insulator 580 and the like and a second insulator inside the first insulator are preferably formed using a combination of a barrier insulating film against oxygen and a barrier insulating film against hydrogen.

For example, aluminum oxide deposited by an ALD method may be used as the first insulator and silicon nitride deposited by a PEALD method may be used as the second insulator. With this structure, oxidation of the conductor 540 can be inhibited, and hydrogen can be inhibited from entering the conductor 540.

Although the first insulator of the insulator 541 and a second conductor of the insulator 541 are stacked in the transistor 500, the present invention is not limited thereto. For example, the insulator 541 may have a single-layer structure or a stacked-layer structure of three or more layers. Although the first conductor of the conductor 540 and a second conductor of the conductor 540 are stacked in the transistor 500, the present invention is not limited thereto. For example, the conductor 540 may have a single-layer structure or a stacked-layer structure of three or more layers.

As illustrated in FIG. 12, a conductor 610, a conductor 612, and the like serving as wirings may be provided in contact with the upper portion of the conductor 540_a_ and the upper portion of the conductor 540_b_. For the conductor 610 and the conductor 612, a conductive material containing tungsten, copper, or aluminum as its main component is preferably used. The conductors can each have a stacked-layer structure. Specifically, the conductors may each be a stack of titanium or a titanium nitride and any of the above conductive materials, for example. Note that the conductors may each be formed to be embedded in an opening provided in an insulator.

The structure of the transistor included in the semiconductor device of one embodiment of the present invention is not limited to that of the transistor 500 illustrated in FIG. 12, FIG. 13A, FIG. 13B, and FIG. 14. The structure of the transistor included in the semiconductor device of one embodiment of the present invention may be changed in accordance with circumstances.

Figure 16:
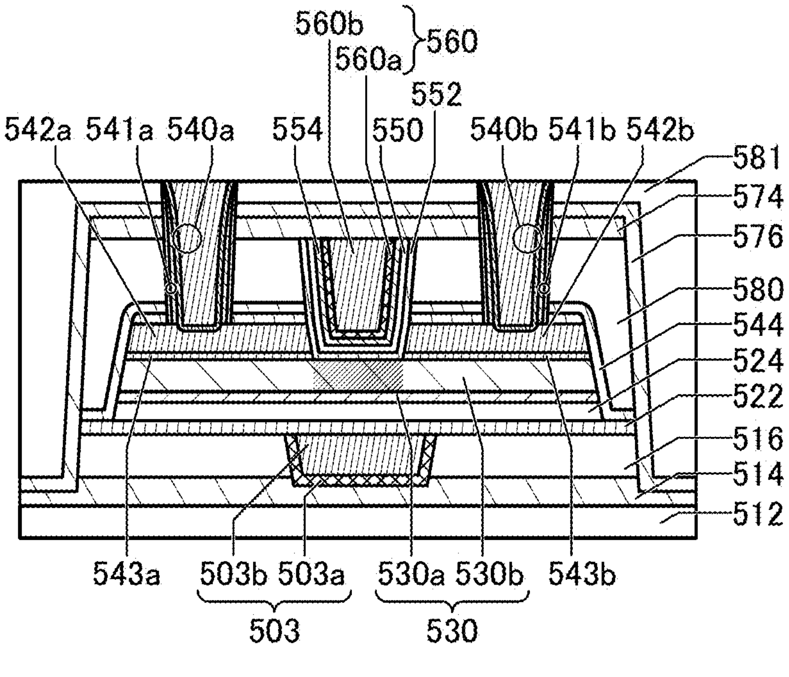
FIG. 16 is a schematic cross-sectional view illustrating a structure example of a transistor.

For example, the transistor 500 illustrated in FIG. 12, FIG. 13A, FIG. 13B, and FIG. 14 may have a structure illustrated in FIG. 16. The transistor in FIG. 16 is different from the transistor 500 illustrated in FIG. 12, FIG. 13A, FIG. 13B, and FIG. 14 in including an oxide 543_a_ and an oxide 543_b_. Note that in this specification and the like, the oxide 543_a_ and the oxide 543_b_ are collectively referred to as an oxide 543. The cross section in the channel width direction of the transistor in FIG. 16 can have a structure similar to the cross section of the transistor 500 illustrated in FIG. 13B.

The oxide 543_a_ is provided between the oxide 530_b_ and the conductor 542_a_, and the oxide 543_b_ is provided between the oxide 530_b_ and the conductor 542_b_. Here, the oxide 543_a_ is preferably in contact with the top surface of the oxide 530_b_ and a bottom surface of the conductor 542_a_. The oxide 543_b_ is preferably in contact with the top surface of the oxide 530_b_ and a bottom surface of the conductor 542_b_.

The oxide 543 preferably has a function of inhibiting passage of oxygen. The oxide 543 having a function of inhibiting passage of oxygen is preferably provided between the oxide 530_b_ and the conductor 542 functioning as the source electrode or the drain electrode, in which case the electric resistance between the conductor 542 and the oxide 530_b_ can be reduced. Such a structure can improve the electrical characteristics, the field-effect mobility, and the reliability of the transistor 500 in some cases.

A metal oxide containing the element M may be used as the oxide 543. In particular, aluminum, gallium, yttrium, or tin is preferably used as the element M. The concentration of the element Min the oxide 543 is preferably higher than that in the oxide 530_b_. Furthermore, gallium oxide may be used as the oxide 543. A metal oxide such as an In-M-Zn oxide may be used as the oxide 543. Specifically, the atomic ratio of the element M to In in the metal oxide used as the oxide is preferably greater than the atomic ratio of the element M to In in the metal oxide used as the oxide 530_b_. The thickness of the oxide 543 is preferably greater than or equal to 0.5 nm or greater than or equal to 1 nm, and less than or equal to 2 nm, less than or equal to 3 nm, or less than or equal to 5 nm. Note that the above-described lower limits and upper limits can be combined with each other. The oxide 543 preferably has crystallinity. In the case where the oxide 543 has crystallinity, release of oxygen from the oxide 530 can be suitably inhibited. When the oxide 543 has a hexagonal crystal structure, for example, release of oxygen from the oxide 530 can sometimes be inhibited.

The insulator 582 is provided over the insulator 581, and the insulator 586 is provided over the insulator 582.

A substance having a barrier property against oxygen and hydrogen is preferably used for the insulator 582. Thus, a material similar to that for the insulator 514 can be used for the insulator 582. For the insulator 582, a metal oxide such as aluminum oxide, hafnium oxide, or tantalum oxide is preferably used, for example.

For the insulator 586, a material similar to that for the insulator 320 can be used. Furthermore, when a material with a relatively low permittivity is used for these insulators, parasitic capacitance generated between wirings can be reduced. A silicon oxide film, a silicon oxynitride film, or the like can be used for the insulator 586, for example.

Next, the capacitor 600 and peripheral wirings or plugs included in the semiconductor device illustrated in FIG. 12 and FIG. 14 will be described. Note that the capacitor 600 and the wiring and/or the plug are provided above the transistor 500 illustrated in FIG. 12 and FIG. 14.

The capacitor 600 includes the conductor 610, a conductor 620, and an insulator 630, for example.

The conductor 610 is provided over one of the conductor 540*a* and the conductor 540*b*, 30 the conductor 546, and the insulator 586. The conductor 610 has a function of one of a pair of electrodes of the capacitor 600.

The conductor 612 is provided over the other of the conductor 540*a* and the conductor 540*b* and the insulator 586. The conductor 612 has a function of a plug, a wiring, a terminal, or the like for electrically connecting a circuit element, a wiring, or the like placed above to the transistor 500.

Note that the conductor 612 and the conductor 610 may be formed at the same time.

For the conductor 612 and the conductor 610, a metal film containing an element selected from molybdenum, titanium, tantalum, tungsten, aluminum, copper, chromium, neodymium, and scandium; a metal nitride film containing the above element as its component (a tantalum nitride film, a titanium nitride film, a molybdenum nitride film, or a tungsten nitride film); or the like can be used. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

The conductor 612 and the conductor 610 each have a single-layer structure in FIG. 12; however, the structure is not limited thereto, and a stacked-layer structure of two or more layers may be employed. For example, between a conductor having a barrier property and a conductor having high conductivity, a conductor that is highly adhesive to the conductor having a barrier property and the conductor having high conductivity may be formed.

The insulator 630 is provided over the insulator 586 and the conductor 610. The insulator 630 functions as a dielectric sandwiched between the pair of electrodes of the capacitor 600.

As the insulator 630, for example, silicon oxide, silicon oxynitride, silicon nitride oxide, silicon nitride, aluminum oxide, aluminum oxynitride, aluminum nitride oxide, aluminum nitride, hafnium oxide, hafnium oxynitride, hafnium nitride oxide, hafnium nitride, or zirconium oxide can be used. The insulator 630 can be provided to have a stacked-layer structure or a single-layer structure using any of the above materials.

For another example, the insulator 630 may have a stacked-layer structure using a material with high dielectric strength, such as silicon oxynitride, and a high-permittivity (high-k) material. In the capacitor 600 having such a structure, a sufficient capacitance can be ensured owing to the high-permittivity (high-k) insulator, and the dielectric strength can be increased owing to the insulator with high dielectric strength; hence, the electrostatic breakdown of the capacitor 600 can be inhibited.

Examples of an insulator that is the high-permittivity (high-k) material (a material having a high dielectric constant) include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Alternatively, for example, a single layer or stacked layers of an insulator containing a high-k material such as aluminum oxide, hafnium oxide, tantalum oxide, zirconium oxide, lead zirconate titanate (PZT), strontium titanate ($SrTiO_3$), or $(Ba,Sr)TiO_3$ (BST) may be used as the insulator 630. For the insulator 630, a compound containing hafnium and zirconium may be used, for example. As miniaturization and high integration of semiconductor devices progress, a problem such as a leakage current from a transistor, a capacitor, and the like might arise because of a thinner gate insulator and a thinner dielectric used in the capacitor. When a high-k material is used for an insulator functioning as the gate insulator and the dielectric used in the capacitor, a gate potential during the operation of the transistor can be lowered and the capacitance of the capacitor can be ensured while the physical thicknesses of the gate insulator and the dielectric are maintained.

The conductor 620 is provided to overlap with the conductor 610 with the insulator 630 therebetween. The conductor 610 has a function of one of the pair of electrodes of the capacitor 600.

For the conductor 620, a conductive material such as a metal material, an alloy material, or a metal oxide material can be used. It is preferable to use a high-melting-point material that has both heat resistance and conductivity, such as tungsten or molybdenum, and it is particularly preferable to use tungsten. In the case where the conductor 620 is formed concurrently with another component such as a conductor, Cu (copper), Al (aluminum), or the like, which is a low-resistance metal material, is used. For example, the conductor 620 can be formed using a material that can be used for the conductor 610. The conductor 620 may have a stacked-layer structure of two or more layers instead of a single-layer structure.

An insulator 640 is provided over the conductor 620 and the insulator 630. The insulator 640 is preferably formed using a film having a barrier property that prevents hydrogen, impurities, or the like from diffusing into the region where the transistor 500 is provided, for example. Thus, a material similar to that for the insulator 324 can be used.

An insulator 650 is provided over the insulator 640. The insulator 650 can be provided using a material similar to that for the insulator 320. The insulator 650 may function as a planarization film that covers an uneven shape thereunder. Thus, the insulator 650 can be formed using any of the materials that can be used for the insulator 324, for example.

Although the capacitor 600 illustrated in FIG. 12 and FIG. 14 is a planar capacitor, the shape of the capacitor is not limited thereto. For example, the capacitor 600 may be a cylindrical capacitor instead of a planar capacitor.

A wiring layer may be provided above the capacitor 600. For example, in FIG. 12, an insulator 411, an insulator 412, an insulator 413, and an insulator 414 are provided in this order above the insulator 650. In addition, a conductor 416 serving as a plug or a wiring is provided in the insulator 411, the insulator 412, and the insulator 413. The conductor 416 can be provided, for example, in a region overlapping with a conductor 660 to be described later.

In addition, in the insulator 630, the insulator 640, and the insulator 650, an opening portion is provided in a region overlapping with the conductor 612, and the conductor 660 is provided to fill the opening portion. The conductor 660 serves as a plug or a wiring that is electrically connected to the conductor 416 included in the above-described wiring layer.

Like the insulator 324 or the like, the insulator 411 and the insulator 414 are each preferably formed using an insulator having a barrier property against impurities such as water and hydrogen, for example. Thus, the insulator 411 and the insulator 414 can be formed using any of the materials that can be used for the insulator 324 or the like, for example.

Like the insulator 326, the insulator 412 and the insulator 413 are each preferably formed using, for example, an insulator having a relatively low dielectric constant to reduce the parasitic capacitance generated between wirings.

The conductor 612 and the conductor 416 can be provided using materials similar to those for the conductor 328 and the conductor 330, for example.

<Structure Examples of Transistor and Ferroelectric Capacitor>

Next, a structure in which a dielectric that can show ferroelectricity is provided in or around the transistor 500 containing a metal oxide in the channel formation region will be described.

Figure 17A:
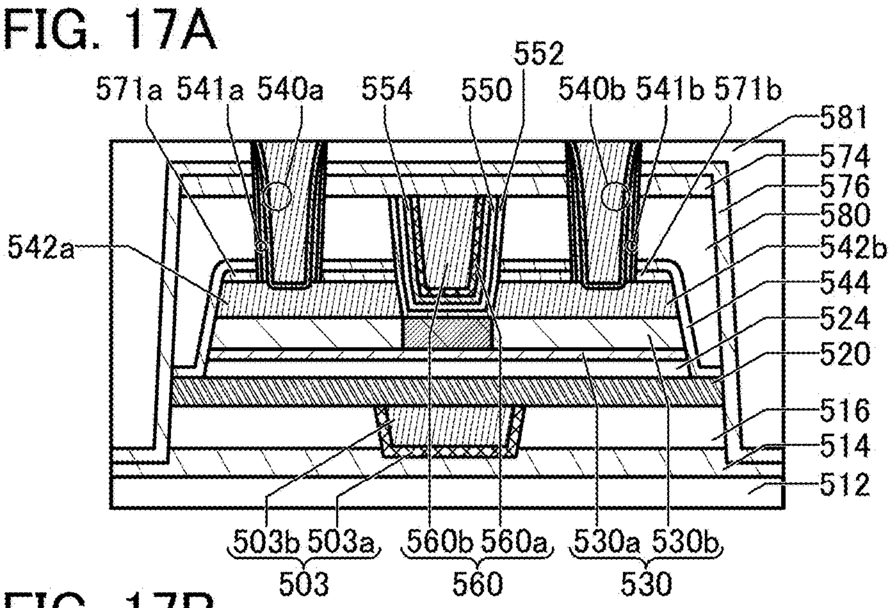
FIG. 17A to FIG. 17C are schematic cross-sectional views illustrating structure examples of transistors.

FIG. 17A illustrates a structure example of a transistor in which a dielectric that can show ferroelectricity is provided in the structure of the transistor 500 in FIG. 12, FIG. 13A, and the like.

The transistor illustrated in FIG. 17A has a structure in which the insulator 522 functioning as a second gate insulator is replaced with an insulator 520. For the insulator 520, a dielectric that can show ferroelectricity can be used, for example.

Therefore, in the transistor in FIG. 17A, a ferroelectric capacitor can be provided between the conductor 503 functioning as the second gate electrode and the oxide 530. In other words, the transistor in FIG. 17A can be a FeFET (Ferroelectric FET) in which a dielectric that can show ferroelectricity is provided in part of the second gate insulator.

As a material that can show ferroelectricity, hafnium oxide, zirconium oxide, $HfZrO_X$ (X is a real number larger than 0), a material in which an element J1 (here, the element J1 is zirconium (Zr), silicon (Si), aluminum (Al), gadolinium (Gd), yttrium (Y), lanthanum (La), strontium (Sr), or the like) is added to hafnium oxide, a material in which an element J2 (here, the element J2 is hafnium (Hf), silicon (Si), aluminum (Al), gadolinium (Gd), yttrium (Y), lanthanum (La), strontium (Sr), or the like) is added to zirconium oxide, and the like can be given. In addition, a piezoelectric ceramic having a perovskite structure, such as $PbTiO_X$, barium strontium titanate (BST), strontium titanate, lead zirconate titanate (PZT), strontium bismuth tantalate (SBT), bismuth ferrite (BFO), or barium titanate, may be used as the material that can show ferroelectricity. Furthermore, the material that can show ferroelectricity can be, for example, a plurality of materials selected from the above-listed materials or a stacked-layer structure of a plurality of materials selected from the above-listed materials. Since hafnium oxide, zirconium oxide, $HfZrO_X$, a material in which the element J1 is added to hafnium oxide, or the like may change its crystal structure (characteristics) according to processes and the like as well as deposition conditions, a material that exhibits ferroelectricity is referred to not only as a ferroelectric but also as a material that can show ferroelectricity or a material that shows ferroelectricity in this specification and the like.

Figure 17B:
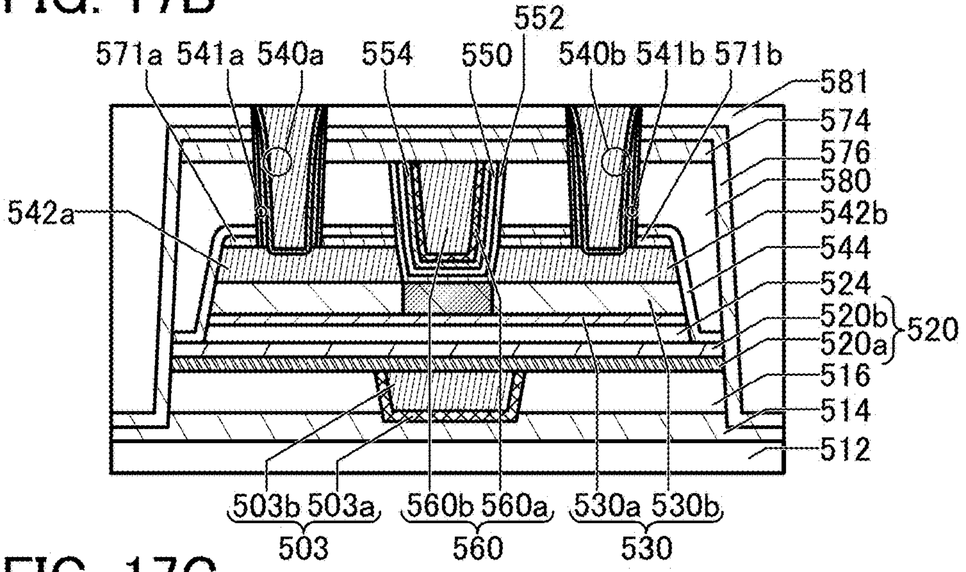

Although in FIG. 17A, the insulator 520 is illustrated as one layer, the insulator 520 may have two or more insulating films including a dielectric that can show ferroelectricity. A specific example of such transistor is illustrated in FIG. 17B. In FIG. 17B, for example, the insulator 520 includes an insulator 520*a* and an insulator 520*b*. The insulator 520*a* is provided on each top surface of the insulator 516 and the conductor 503, and the insulator 520*b* is provided on a top surface of the insulator 520*a*.

For the insulator 520*a*, for example, a dielectric that can show ferroelectricity can be used. Furthermore, silicon oxide can be used for the insulator 520*b*, for example. Alternatively, for example, silicon oxide may be used for the insulator 520*a*, and a dielectric that can show ferroelectricity can be used for the insulator 520*b*.

As illustrated in FIG. 17B, the insulator 520 has two layers: a dielectric that can show ferroelectricity is provided in one layer, and silicon oxide is provided in the other layer. Thus, a leakage current flowing between the conductor 503 functioning as the gate electrode and the oxide 530 can be reduced.

Figure 17C:
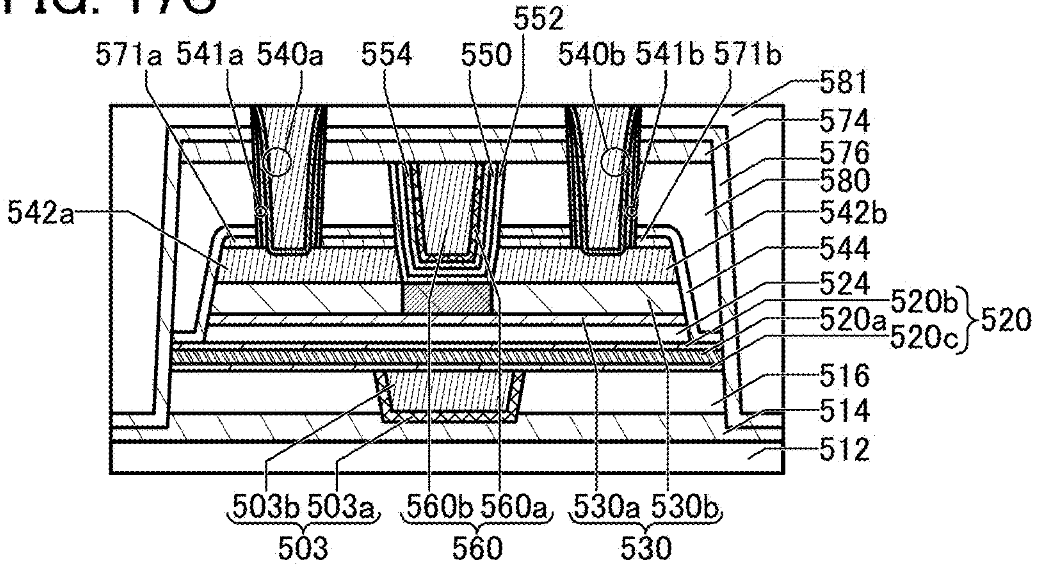

FIG. 17C illustrates a structure example of a transistor in which the insulator 520 has three layers. In FIG. 17C, for example, the insulator 520 includes the insulator 520*a*, the insulator 520*b*, and an insulator 520*c*. The insulator 520*c* is provided on each top surface of the insulator 516 and the conductor 503, the insulator 520*a* is provided on a top surface of the insulator 520*c*, and the insulator 520*b* is provided on a top surface of the insulator 520*a*.

For the insulator 520*a*, for example, a dielectric that can show ferroelectricity can be used. Furthermore, silicon oxide can be used for the insulator 520*b* and the insulator 520*c*, for example.

Each of the structures of the transistor and the ferroelectric capacitor illustrated in FIG. 17A to FIG. 17C can be applied to the transistors FM1 to FM3 described in Embodiment 1, for example.

Figure 18:
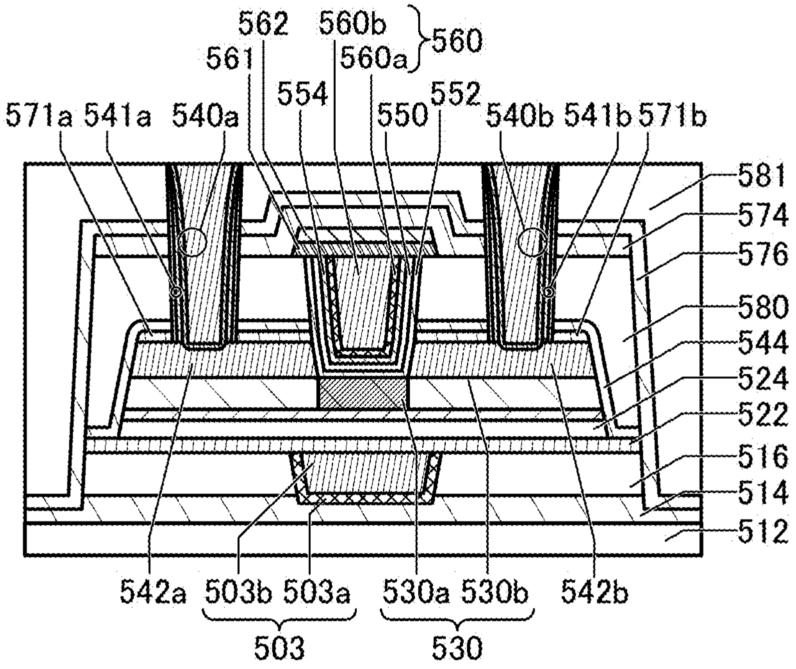
FIG. 18 is a schematic cross-sectional view illustrating a structure example of a transistor.

FIG. 18 illustrates a structure example of a transistor in which a dielectric that can show ferroelectricity is provided in the structure of the transistor 500 in FIG. 12, FIG. 13A, and the like, and the transistor is different from each of the transistors in FIG. 17A to FIG. 17C.

The transistor illustrated in FIG. 18 shows a structure example where a dielectric that can show ferroelectricity is provided above the insulator 552, the insulator 550, and the insulator 554 that function as the first gate insulator, the conductor 560 functioning as the first gate electrode, and part of a region of the insulator 580.

Specifically, an insulator 561 is provided to be in contact with the insulator 552, the insulator 550, the insulator 554, the conductor 560, and the part of the region of the insulator 580. For the insulator 561, for example, a dielectric that can show ferroelectricity and can be applied to the insulator 520 in FIG. 17A can be used.

A conductor 562 is provided to be in contact with an upper portion of the insulator 561. The conductor 562 can be provided using a material similar to those for the conductor 328 and the conductor 330, for example.

Therefore, with the structure of the transistor in FIG. 18, a ferroelectric capacitor can be provided between the conductor 503 functioning the first gate electrode and the conductor 562.

Note that the insulator 561 may have a stacked-layer structure of two or more layers like the insulator 520 illustrated in FIG. 17B and FIG. 17C.

Each of the structures of the transistor and the ferroelectric capacitor illustrated in FIG. 18 can be applied to the transistor M1 and the capacitor FC1 that are described in Embodiment 1, for example.

Figure 19A:
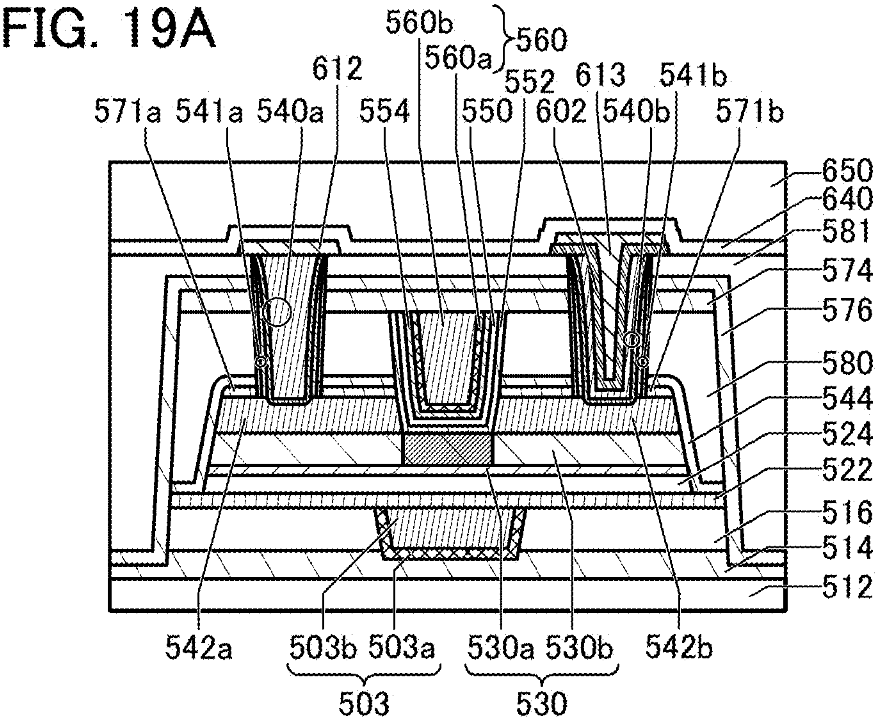
FIG. 19A and FIG. 19B are schematic cross-sectional views illustrating structure examples of transistors.

FIG. 19A illustrates a structure example of a transistor in which a dielectric that can show ferroelectricity is provided in the structure of the transistor 500 in FIG. 12, FIG. 13A, and the like, and the transistor is different from each of the transistors in FIG. 17A to FIG. 17C and FIG. 18.

In the transistor illustrated in FIG. 19A, an insulator 602 is provided in an opening portion formed in the insulator 544, the insulator 571*b*, the insulator 580, the insulator 574, the 35 insulator 576, and the insulator 581 in a region overlapping with the conductor 542*b*. Specifically, in the opening portion, the insulator 541*b* is provided on a side surface of the opening portion, the conductor 540*b* is provided over the insulator 541*b* and the conductor 542*b* that is a bottom portion of the opening portion, the insulator 602 is provided in part of a region of the insulator 581 and over the conductor 540*b*, and a conductor 613 is provided over the insulator 602 to fill the rest of the opening portion.

In another specific structure example, in the opening portion, the insulator 541*b* is provided on the side surface of the opening portion, the conductor 540*b* is provided over the insulator 541*b*, the insulator 602 is provided in part of the region of the insulator 581, over the conductor 540*b*, and over the conductor 542*b* that is the bottom portion of the opening portion, and the conductor 613 is provided over the insulator 602 to fill the rest of the opening portion.

For the insulator 602, for example, a dielectric that can show ferroelectricity and can be applied to the insulator 520 in FIG. 17A can be used.

In particular, as a dielectric that can show ferroelectricity, it is preferable to use a material containing hafnium oxide or hafnium oxide and zirconium oxide that can show ferroelectricity even when processed as a thin film having a thickness of several nanometers. Here, the thickness of the insulator 602 can be less than or equal to 100 nm, preferably lees than or equal to 50 nm, further preferably less than or equal to 10 nm. When the insulator 602 is made thin, a semiconductor device can be formed by combining the insulator 602 with a miniaturized transistor.

In the case of using a material containing hafnium oxide and zirconium oxide ($HfZrO_X$) as the insulator 602, a thermal ALD method is preferably used for deposition.

In the case of depositing the insulator 602 by a thermal ALD method, a material not containing hydrocarbon (also referred to as Hydro Carbon or HC) is suitably used as a precursor. When any one or both of hydrogen and carbon are contained in the insulator 602, the crystallization of the insulator 602 is hindered in some cases. Therefore, as described above, the concentration of any one or both of hydrogen and carbon in the insulator 602 is preferably reduced using a precursor not containing hydrocarbon. For example, as a precursor not containing hydrocarbon, a chlorine-based material can be given. Note that when a material containing hafnium oxide and zirconium oxide ($HfZrO_X$) is used as the insulator 602, $HfCl_4$ and/or $ZrCl_4$ may be used as a precursor.

In the case of depositing the insulator 602 by a thermal ALD method, $H_2O$ or $O_3$ can be used as an oxidizer. Note that as an oxidizer for a thermal ALD method, the use of $O_3$ is more preferable than the use of $H_2O$ because the hydrogen concentration in the film can be reduced. However, an oxidizer for a thermal ALD method is not limited thereto. Examples of an oxidizer for a thermal ALD method may include any one or more selected from $O_2$, $O_3$, $N_2O$, $NO_2$, $H_2O$, and $H_2O_2$.

The conductor 613 can be provided using a material similar to those for the conductor 328 and the conductor 330, for example.

The conductor 613 can be deposited by an ALD method, a CVD method, or the like. For example, titanium nitride can be deposited by a thermal ALD method. Here, the conductor 613 is preferably deposited by a method in which deposition is performed while a substance is heated, such as a thermal ALD method. For example, deposition is performed with the substrate temperature set at higher than or equal to room temperature, preferably higher than or equal to 300° C., further preferably higher than or equal to 325° C., still further preferably higher than or equal to 350° C. Furthermore, for example, deposition is performed with the substrate temperature set at lower than or equal to 500° C., preferably lower than or equal to 450° C. For example, the substrate temperature is set at approximately 400° C.

When the conductor 613 is deposited within the above temperature range, the insulator 602 can have ferroelectricity even without a bake treatment at a high temperature (e.g., a bake treatment with the heat treatment temperature of higher than or equal to 400° C. or higher than or equal to 500° C.) after the formation of the conductor 613. Furthermore, when the conductor 613 is deposited by an ALD method causing relatively less damage to a base as described above, the crystal structure of the insulator 602 is inhibited from being excessively destroyed; thus, the ferroelectricity of the insulator 602 can be increased.

For example, in the case where the conductor 613 is formed by a sputtering method, damage might enter a base film, i.e., the insulator 602. For example, in the case where a material containing hafnium oxide and zirconium oxide ($HfZrO_X$) is used as the insulator 602 and the conductor 613 is formed by a sputtering method, damage might enter $HfZrO_X$ that is the base film by the sputtering method and the crystal structure of $HfZrO_X$ (typically, a crystal structure such as an orthorhombic system) might be broken. After that, by performing a heat treatment, the damage to the crystal structure of $HfZrO_X$ can be recovered; however, in some cases, the damage in $HfZrO_X$ formed by the sputtering method, e.g., a dangling bond (e.g., O*) in $HfZrO_X$, is bonded to hydrogen contained in $HfZrO_X$, and thus the damage to the crystal structure of $HfZrO_X$ cannot be recovered.

Therefore, for $HfZrO_X$ used as the insulator 602, a material containing no hydrogen or having an extremely low hydrogen content is suitably used. A material not containing hydrogen or having an extremely low hydrogen content is used for the insulator 602, whereby the crystallinity of the insulator 602 can be improved, and the structure can have a high ferroelectricity.

As described above, in one embodiment of the present invention, for example, a ferroelectric material is formed, as the insulator 602, by a thermal ALD method using a precursor not containing hydrocarbon (typically, a chlorine-based precursor) and an oxidizer (typically, $O_3$). After that, the conductor 613 is formed by deposition by a thermal ALD method (typically, deposition at higher than or equal to 400° C.), whereby the crystallinity or ferroelectricity of the insulator 602 can be improved without annealing after the deposition, in other words, with the use of the temperature in the deposition of the conductor 613. Note that improving the crystallinity or ferroelectricity of the insulator 602 without annealing after the deposition of the conductor 613 and with the use of the temperature in the deposition of the conductor 613 is referred to as self-annealing, in some cases.

With the transistor structure in FIG. 19A, a ferroelectric capacitor can be provided between the conductor 540*b* and the conductor 613 in the opening portion included in the region overlapping with the conductor 542*b*.

Note that the insulator 602 may have a stacked-layer structure of two or more layers like the insulator 520 illustrated in FIG. 17B and FIG. 17C.

Figure 19B:
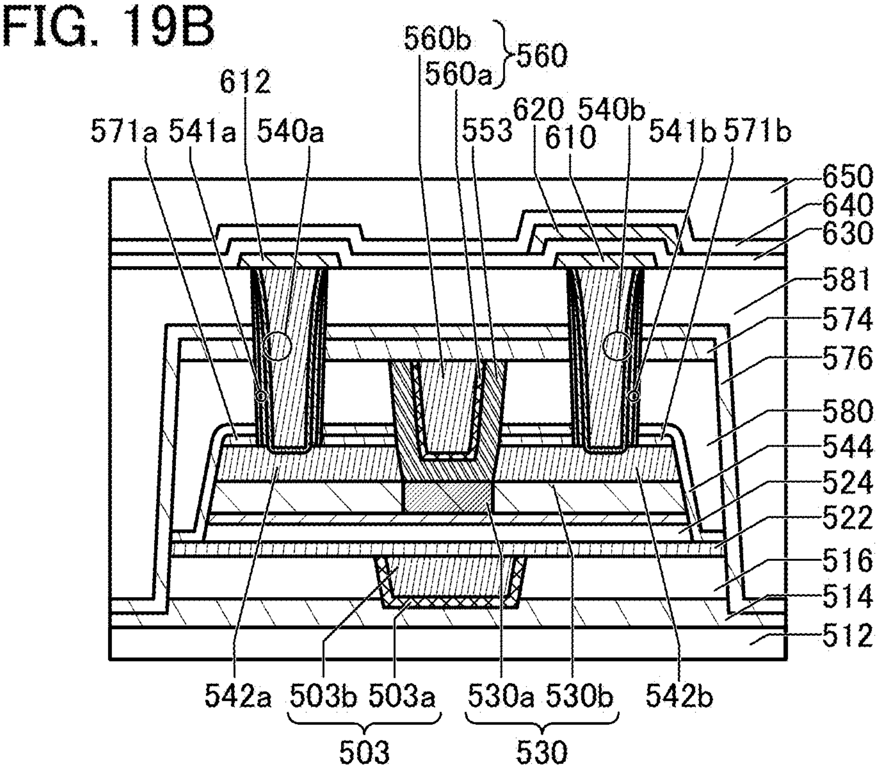

FIG. 19B illustrates a structure example of a transistor in which a dielectric that can show ferroelectricity is provided in the structure of the transistor 500 in FIG. 12, FIG. 13A, and the like, and the transistor is different from each of the transistors in FIG. 17A to FIG. 17C, FIG. 18, and FIG. 19A.

The transistor illustrated in FIG. 19B has a structure in which the insulator 552, the insulator 550, and the insulator 554 that function as the first gate insulator are replaced with an insulator 553. For the insulator 553, for example, a dielectric that can show ferroelectricity and can be applied to the insulator 520 in FIG. 17A can be used.

Therefore, in the transistor in FIG. 19B, a ferroelectric capacitor can be provided between the conductor 560 functioning as the first gate electrode and the oxide 530. In other words, the transistor in FIG. 19B can be a FeFET in which a dielectric that can show ferroelectricity is provided in part of the first gate insulator.

Note that the insulator 553 may have a stacked-layer structure of two or more layers like the insulator 520 illustrated in FIG. 17B and FIG. 17C.

In FIG. 19B, the insulator 552, the insulator 550, and the insulator 554 are replaced with the insulator 553; in another structure example, at least one of the insulator 552, the insulator 550, and the insulator 554 may be replaced with the insulator 553, and the rest of the insulators and the insulator 553 may be stacked.

Each of the structures of the transistor and the ferroelectric capacitor illustrated in FIG. 19A and FIG. 19B can be applied to the transistors M1 and the capacitor FC1 described in Embodiment 1, for example.

Figure 20A:
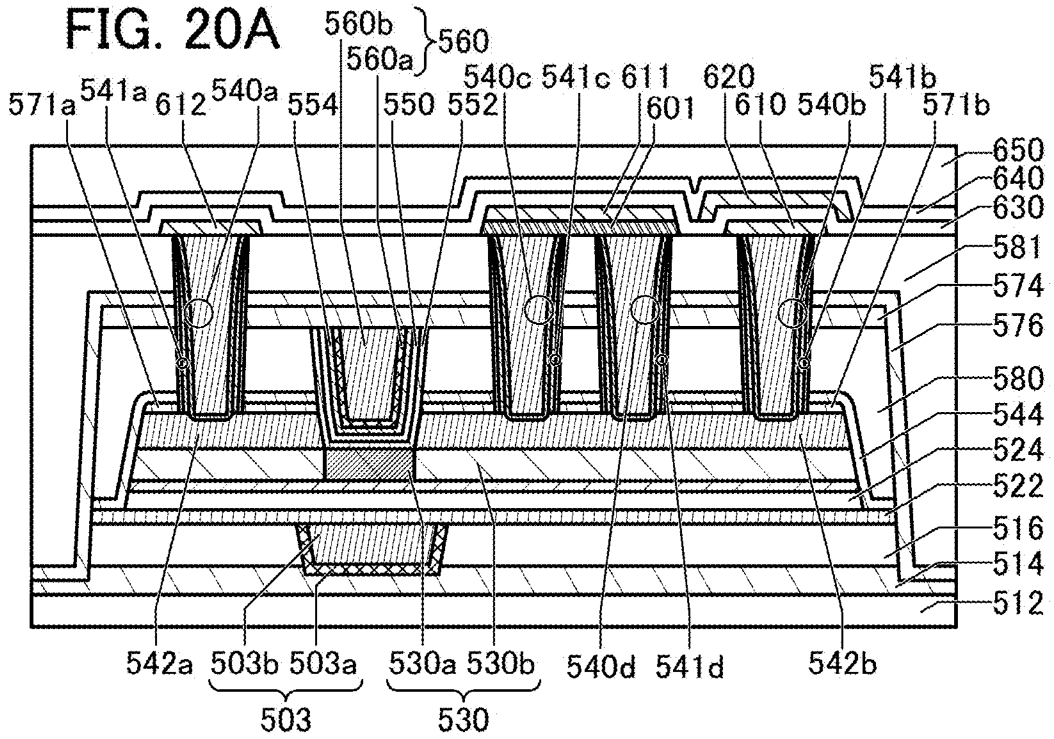
FIG. 20A and FIG. 20B are schematic cross-sectional views illustrating structure examples of a transistor.

FIG. 20A illustrates a structure example of the transistor 500 and a capacitor which is provided with a dielectric that can show ferroelectricity around the transistor 500.

In the transistor illustrated in FIG. 20A, for example, a plurality of opening portions are formed in the insulator 544, the insulator 571*b*, the insulator 580, the insulator 574, the insulator 576, and the insulator 581 in a region overlapping with the conductor 542*b*. A conductor 540*c* functioning as a plug is provided inside one opening portion, and an insulator 541*c* is provided, as an insulator having a barrier property against an impurity, between a side surface of the opening portion and the conductor 540*c*. A conductor 540*d* functioning as a plug is provided inside 30 another opening portion, and an insulator 541*d* is provided, as an insulator having a barrier property against an impurity, between a side surface of the opening portion and the conductor 540*d*. Note that for the conductor 540*c* and conductor 540*d*, for example, materials that can be applied for the conductor 540*a* and the conductor 540*b* can be used; and for the insulator 541*c* and the insulator 541*d*, for example, materials that can be applied for the insulator 541*a* and the insulator 541*b* can be used.

The insulator 601 is provided to be in contact with upper portions of the conductor 540*c* and the conductor 540*d*. For the insulator 601, for example, a dielectric that can show ferroelectricity and can be applied to the insulator 520 in FIG. 17A can be used.

A conductor 611 is provided to be in contact with an upper portion of the insulator 601. The conductor 611 can be provided using a material similar to those for the conductor 328 and the conductor 330, for example.

Therefore, with the structure illustrated in FIG. 20A, a ferroelectric capacitor can be provided between the conductor 611 and the conductor 540*c* and the conductor 540*d* that function as plugs.

Note that the insulator 601 may have a stacked-layer structure of two or more layers like the insulator 520 illustrated in FIG. 17B and FIG. 17C.

Although in FIG. 20A, two plugs (the conductor 540*c* and the conductor 540*d*) are in contact with the insulator 601, one or three or more plugs may be in contact with the insulator 601. In other words, although FIG. 20A illustrates an example where, in a region overlapping with the insulator 601, two opening portions including conductors are provided as plugs, one or three or more opening portions may be provided in the region overlapping with the insulator 601.

Figure 20B:
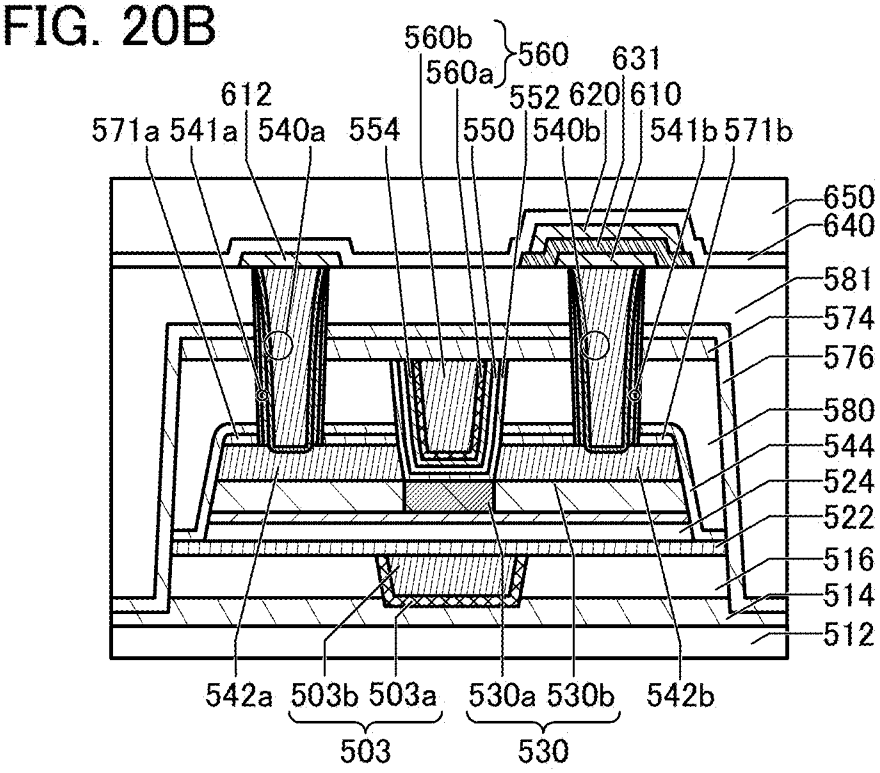

FIG. 20B illustrates a structure example of the transistor 500 and a capacitor which is provided with a dielectric that can show ferroelectricity around the transistor 500, which is different from that in FIG. 20A.

In the transistor illustrated in FIG. 20B, an insulator 631 is provided on a top surface of the conductor 610 over the conductor 540*b* functioning as a plug and a top surface of part of a region of the insulator 581. For the insulator 631, for example, a dielectric that can show ferroelectricity and can be applied to the insulator 520 in FIG. 17A can be used.

The conductor 620 is provided on a top surface of the insulator 631, and the insulator 640 and the insulator 650 are provided in this order on the top surfaces of the insulator 581, the conductor 612, the conductor 620, and part of a region of the insulator 631.

Therefore, with the structure illustrated in FIG. 20B, a ferroelectric capacitor can be provided between the conductor 610 and the conductor 620.

Note that the insulator 631 may have a stacked-layer structure of two or more layers like the insulator 520 illustrated in FIG. 17B and FIG. 17C.

Each of the structures of the transistor and the ferroelectric capacitor illustrated in FIG. 20A and FIG. 20B can be applied to the transistors M1 and the capacitor FC1 described in Embodiment 1, for example.

When a semiconductor device using a transistor including an oxide semiconductor has the structure described in this embodiment, a change in electrical characteristics of the transistor can be inhibited and the reliability can be improved. Alternatively, a semiconductor device using a transistor including an oxide semiconductor can be miniaturized or highly integrated.

Note that this embodiment can be combined with any of the other embodiments in this specification as appropriate.

Embodiment 3

Described in this embodiment is a metal oxide (hereinafter also referred to as an oxide semiconductor) that can be used in an OS transistor described in the above embodiment.

A metal oxide preferably contains at least indium or zinc. In particular, indium and zinc are preferably contained. In addition, aluminum, gallium, yttrium, tin, or the like is preferably contained. Furthermore, one or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

<Classification of Crystal Structures>

First, the classification of the crystal structures of an oxide semiconductor will be described with reference to FIG. 21A. FIG. 21A is a diagram showing the classification of crystal structures of an oxide semiconductor, typically IGZO (a metal oxide containing In, Ga, and Zn).

As shown in FIG. 21A, an oxide semiconductor is roughly classified into "Amorphous", "Crystalline", and "Crystal". The term "Amorphous" includes completely amorphous. The term "Crystalline" includes CAAC (c-axis-aligned crystalline), nc (nanocrystalline), and CAC (Cloud-Aligned Composite). Note that single crystal, poly crystal, and completely amorphous are excluded from the category of "Crystalline" (in the diagram, denoted as "excluding single crystal and poly crystal"). The term "Crystal" includes single crystal and poly crystal.

Note that the structures in the thick frame in FIG. 21A are in an intermediate state between "Amorphous" and "Crystal", and belong to a new crystalline phase. That is, these structures are completely different from "Amorphous", which is energetically unstable, and "Crystal".

A crystal structure of a film or a substrate can be evaluated with an X-Ray Diffraction (XRD) spectrum. FIG. 21B shows an XRD spectrum, which is obtained by GIXD (Grazing-Incidence XRD) measurement, of a CAAC-IGZO film classified into "Crystalline". Note that a GIXD method is also referred to as a thin film method or a Seemann-Bohlin method. The XRD spectrum that is shown in FIG. 21B and obtained by GIXD measurement is hereinafter simply referred to as an XRD spectrum. The CAAC-IGZO film in FIG. 21B has a composition in the neighborhood of In:Ga:Zn=4:2:3 [atomic ratio]. The CAAC-IGZO film in FIG. 21B has a thickness of 500 nm.

As shown in FIG. 21B, a clear peak indicating crystallinity is detected in the XRD spectrum of the CAAC-IGZO film. Specifically, a peak indicating c-axis alignment is detected at 2θ of around 31° in the XRD spectrum of the CAAC-IGZO film. As shown in FIG. 21B, the peak at 2θ of around 31° is asymmetric with respect to the axis of the angle at which the peak intensity is detected.

A crystal structure of a film or a substrate can also be evaluated with a diffraction pattern obtained by a nanobeam electron diffraction (NBED) method (such a pattern is also referred to as a nanobeam electron diffraction pattern). FIG. 21C shows a diffraction pattern of the CAAC-IGZO film. FIG. 21C shows a diffraction pattern obtained by the NBED method in which an electron beam is incident in the direction parallel to the substrate. The composition of the CAAC-IGZO film in FIG. 21C is In:Ga:Zn=4:2:3 [atomic ratio] or the neighborhood thereof. In the nanobeam electron diffraction method, electron diffraction is performed with a probe diameter of 1 nm.

As shown in FIG. 21C, a plurality of spots indicating c-axis alignment are observed in the diffraction pattern of the CAAC-IGZO film.

<<Structure of Oxide Semiconductor>>

Oxide semiconductors might be classified in a manner different from that in FIG. 21A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a stacked-layer structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear crystal grain boundary (grain boundary) cannot be observed even in the vicinity of the distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an inter-atomic bond distance changed by substitution of a metal atom, and the like.

A crystal structure in which a clear crystal grain boundary is observed is what is called polycrystal. It is highly probable that the crystal grain boundary becomes a recombination center and captures carriers and thus decreases the on-state current and field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, a reduction in electron mobility due to the crystal grain boundary is unlikely to occur. Entry of impurities, formation of defects, and the like might decrease the crystallinity of an oxide semiconductor, which means that the CAAC-OS can be referred to as an oxide semiconductor having small amounts of impurities, defects (e.g., oxygen vacancies), and the like. Therefore, an oxide semiconductor including the CAAC-OS is physically stable. Accordingly, the oxide semiconductor including the CAAC-OS is resistant to heat and has high reliability. In addition, the CAAC-OS is stable with respect to high temperatures in the manufacturing process (i.e., thermal budget). Accordingly, the use of the CAAC-OS for the OS transistor can extend the degree of freedom of the manufacturing process.

[nc-OS]

In the nc-OS, a microscopic region (e.g., a region greater than or equal to 1 nm and less than or equal to 10 nm, in particular, a region greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. There is no regularity of crystal orientation between different nanocrystals in the nc-OS. Hence, the orientation in the whole film is not observed. Accordingly, in some cases, the nc-OS cannot be distinguished from an a-like OS or an amorphous oxide semiconductor, depending on the analysis method. For example, when an nc-OS film is subjected to structural analysis by out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., larger than or equal to 1 nm and smaller than or equal to 30 nm).

[A-Like OS]

The a-like OS is an oxide semiconductor having a structure between those of the nc-OS and the amorphous oxide semiconductor. The a-like OS has a void or a low-density region. That is, the a-like OS has lower crystallinity than the nc-OS and the CAAC-OS. Moreover, the a-like OS has higher hydrogen concentration in the film than the nc-OS and the CAAC-OS.

<<Composition of Oxide Semiconductor>>

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted by [In], [Ga], and [Zn], respectively. For example, the first region in the CAC-OS in the In—Ga—Zn oxide has [In] higher than that in the composition of the CAC-OS film. Moreover, the second region has [Ga] higher than that in the composition of the CAC-OS film. For example, the first region has higher [In] than the second region and lower [Ga] than the second region. Moreover, the second region has higher [Ga] than the first region and lower [In] than the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, energy dispersive X-ray spectroscopy (EDX) is used to obtain EDX mapping, and according to the EDX mapping, the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, a high on-state current (Ion), high field-effect mobility (μ), and excellent switching operation can be achieved.

An oxide semiconductor can have any of various structures that show various different properties. Two or more kinds among the amorphous oxide semiconductor, the polycrystalline oxide semiconductor, the a-like OS, the CAC-OS, the nc-OS, and the CAAC-OS may be included in an oxide semiconductor of one embodiment of the present invention.

<Transistor Including Oxide Semiconductor>

Next, a case where the above-described oxide semiconductor is used for a transistor is described.

When the above-described oxide semiconductor is used for a transistor, a transistor with high field-effect mobility can be achieved. In addition, a highly reliable transistor can be achieved.

An oxide semiconductor having a low carrier concentration is preferably used for the transistor. For example, the carrier concentration of an oxide semiconductor is lower than or equal to $1\times10^{17}$ $cm^{-3}$, preferably lower than or equal to $1\times10^{15}$ $cm^{-3}$, further preferably lower than or equal to $1\times10^{13}$ $cm^{-3}$, still further preferably lower than or equal to $1\times10^{11}$ $cm^{-3}$, yet further preferably lower than $1\times10^{10}$ $cm^{-3}$, and higher than or equal to $1\times10^{-9}$ $cm^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Electric charge trapped by the trap states in the oxide semiconductor takes a long time to disappear and might behave like fixed electric charge. A transistor whose channel formation region is formed in an oxide semiconductor having a high density of trap states has unstable electrical characteristics in some cases.

In order to obtain stable electrical characteristics of the transistor, it is effective to reduce the impurity concentration in the oxide semiconductor. In order to reduce the impurity concentration in the oxide semiconductor, the impurity concentration in a film that is adjacent to the oxide semiconductor is preferably reduced. Examples of impurities include hydrogen, nitrogen, an alkali metal, an alkaline earth metal, iron, nickel, and silicon.

<Impurities>

Here, the influence of each impurity in the oxide semiconductor is described.

When silicon or carbon, which is a Group 14 element, is contained in an oxide semiconductor, defect states are formed in the oxide semiconductor. Thus, the concentration of silicon or carbon in the oxide semiconductor and in the vicinity of an interface with the oxide semiconductor (the concentration obtained by secondary ion mass spectrometry (SIMS)) is lower than or equal to $2\times10^{18}$ $atoms/cm^3$, preferably lower than or equal to $2\times10^{17}$ $atoms/cm^3$.

When the oxide semiconductor contains an alkali metal or an alkaline earth metal, defect states are formed and carriers are generated in some cases. Accordingly, a transistor using an oxide semiconductor that contains an alkali metal or an alkaline earth metal tends to have normally-on characteristics. Thus, the concentration of an alkali metal or an alkaline earth metal in the oxide semiconductor, which is obtained by SIMS, is lower than or equal to $1\times10^{18}$ $atoms/cm^3$, preferably lower than or equal to $2\times10^{16}$ $atoms/cm^3$.

An oxide semiconductor containing nitrogen easily becomes n-type by generation of electrons serving as carriers and an increase in carrier concentration. Thus, a transistor using an oxide semiconductor that contains nitrogen as the semiconductor tends to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained by SIMS, is set lower than $5\times10^{19}$ $atoms/cm^3$, preferably lower than or equal to $5\times10^{18}$ $atoms/cm^3$, further preferably lower than or equal to $1\times10^{18}$ $atoms/cm^3$, still further preferably lower than or equal to $5\times10^{17}$ $atoms/cm^3$.

Hydrogen contained in an oxide semiconductor reacts with oxygen bonded to a metal atom to be water, and thus causes an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor that contains hydrogen tends to have normally-on characteristics. For this reason, hydrogen in the oxide semiconductor is preferably reduced as much as possible. Specifically, the hydrogen concentration in the oxide semiconductor, which is obtained by SIMS, is set lower than $1\times10^{20}$ $atoms/cm^3$, preferably lower than $1\times10^{19}$ $atoms/cm^3$, further preferably lower than $5\times10^{18}$ $atoms/cm^3$, still further preferably lower than $1\times10^{18}$ $atoms/cm^3$.

When an oxide semiconductor with sufficiently reduced impurities is used for a channel formation region in a transistor, the transistor can have stable electrical characteristics.

Note that this embodiment can be combined with any of the other embodiments in this specification as appropriate.

Embodiment 4

In this embodiment, an example in which the semiconductor device functioning as the control circuit of a secondary battery described in the above embodiment is made into an electronic component is described with reference to FIG. 22.

In this embodiment, an example of system on chip 1204 on which the semiconductor device is mounted is described with reference to FIG. 22. A plurality of circuits (systems) are mounted on the system on chip 1204. A technique for integrating a plurality of circuits (systems) into one chip is referred to as system on chip (SoC) in some cases.

Figure 22:
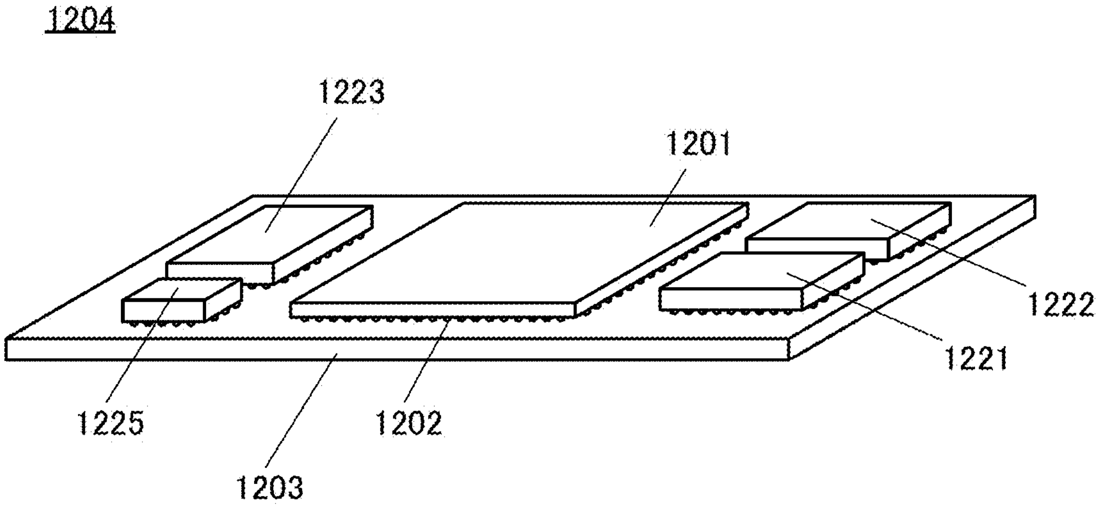
FIG. 22 is a diagram illustrating an example of an electronic component.

FIG. 22 illustrates an example in which a plurality of chips are provided over a printed circuit board (PCB) 1203. In FIG. 22, a chip 1201 is provided over the printed circuit board 1203. In the chip 1201, the semiconductor device functioning as the control circuit of a secondary battery is provided. A plurality of bumps 1202 are provided on a rear surface of the chip 1201 and are connected to the printed circuit board 1203.

The semiconductor device functioning as the control circuit of a secondary battery of one embodiment of the present invention is provided, whereby a chip can be downsized in an electronic component.

When the semiconductor device functioning as the control circuit of a secondary battery of one embodiment of the present invention is provided, chips can be integrated; accordingly, the volume occupied by the control circuit can be small in portable terminals and other various 30 electronic devices, and thus the electronic devices can be downsized. Furthermore, the volume occupied by a secondary battery can be increased thanks to the downsizing of the control circuit. As a result, the duration time of a storage battery can be increased. Moreover, power consumption can be reduced by the downsizing of the control circuit in some cases.

The printed circuit board 1203 is preferably provided with an integrated circuit 1223 as a second chip. The integrated circuit 1223 has a function of supplying a control signal, power, or the like to the chip 1201.

Memory devices such as a DRAM 1221 or a flash memory 1222 may be provided as a variety of chips provided on the printed circuit board 1203. The printed circuit board 1203 may be provided with a chip 1225 as a chip having a function of performing wireless communication.

The integrated circuit 1223 may have a function of performing image processing, product-sum operation, or the like.

The integrated circuit 1223 may include one or both of an A/D (analog/digital) converter circuit and a D/A (digital/analog) converter circuit.

This embodiment can be combined with the description of the other embodiments as appropriate.

Embodiment 5

This embodiment will describe structures of a power storage device to which the electronic component including the control circuit of a secondary battery described in the above embodiment can be applied.

[Cylindrical Secondary Battery]

Figure 23A:
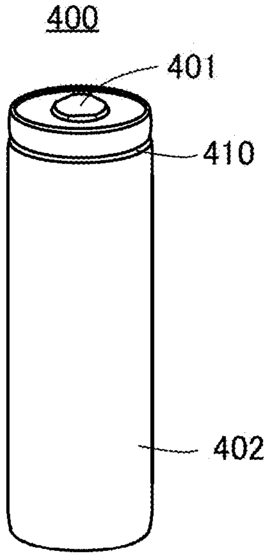
FIG. 23A, FIG. 23B, FIG. 23C, and FIG. 23D are diagrams illustrating an example of a secondary battery.

An example of a cylindrical secondary battery is described with reference to FIG. 23A. A cylindrical secondary battery 400 includes, as illustrated in FIG. 23A, a positive electrode cap (battery lid) 401 on a top surface and a battery can (outer can) 402 on a side surface and a bottom surface. The positive electrode cap 401 and the battery can (outer can) 402 are insulated from each other by a gasket (insulating packing) 410.

Figure 23B:
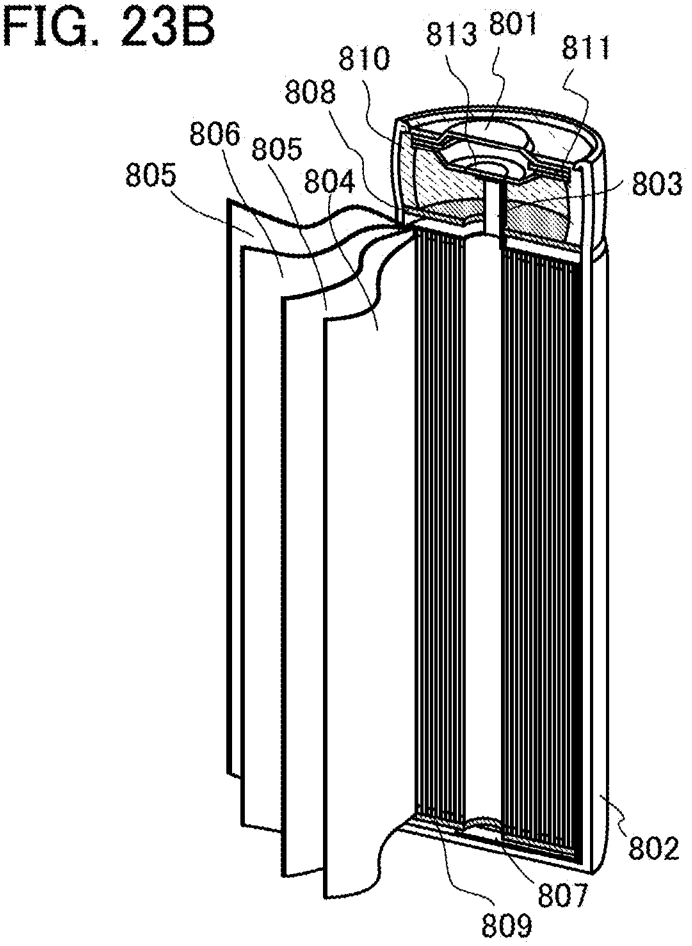

FIG. 23B is a schematic cross-sectional diagram of a cylindrical secondary battery. The cylindrical secondary battery illustrated in FIG. 23B includes a positive electrode cap (battery lid) 801 on a top surface and a battery can (outer can) 802 on a side surface and a bottom surface. The positive electrode cap and the battery can (outer can) 802 are insulated from each other by a gasket (insulating gasket) 810.

Inside the battery can 802 having a hollow cylindrical shape, a battery element in which a strip-like positive electrode 804 and a strip-like negative electrode 806 are wound with a separator 805 located therebetween is provided. Although not illustrated, the battery element is wound around a center pin. One end of the battery can 802 is close and the other end thereof is open. For the battery can 802, a metal having corrosion resistance to an electrolyte solution, such as nickel, aluminum, or titanium, an alloy of such a metal, or an alloy of such a metal and another metal (e.g., stainless steel) can be used. The battery can 802 is preferably covered with nickel, aluminum, or the like in order to prevent corrosion due to the electrolyte solution. Inside the battery can 802, the battery element in which the positive electrode, the negative electrode, and the separator are wound is provided between a pair of insulating plates 808 and 809 that face each other. Furthermore, a nonaqueous electrolyte solution (not illustrated) is injected inside the battery can 802 provided with the battery element. As the nonaqueous electrolyte, a nonaqueous electrolyte that is similar to that for a coin-type secondary battery can be used.

Since a positive electrode and a negative electrode that are used for a cylindrical storage battery are wound, active materials are preferably formed on both surfaces of a current collector. A positive electrode terminal (positive electrode current collecting lead) 803 is connected to the positive electrode 804, and a negative electrode terminal (negative electrode current collecting lead) 807 is connected to the negative electrode 806. Both the positive electrode terminal 803 and the negative electrode terminal 807 can be formed using a metal material such as aluminum. The positive electrode terminal 803 and the negative electrode terminal 807 are resistance-welded to a safety valve mechanism 813 and the bottom of the battery can 802, respectively. The safety valve mechanism 813 is electrically connected to the positive electrode cap 801 through a PTC element (Positive Temperature Coefficient) 811. The safety valve mechanism 813 cuts off electrical connection between the positive electrode cap 801 and the positive electrode 804 when the internal pressure of the battery exceeds a predetermined threshold. In addition, the PTC element 811 is a thermally sensitive resistor whose resistance increases as temperature rises, and limits the amount of current by increasing the resistance to prevent abnormal heat generation. Barium titanate ($BaTiO_3$)-based semiconductor ceramics or the like can be used for the PTC element.

Figure 23C:
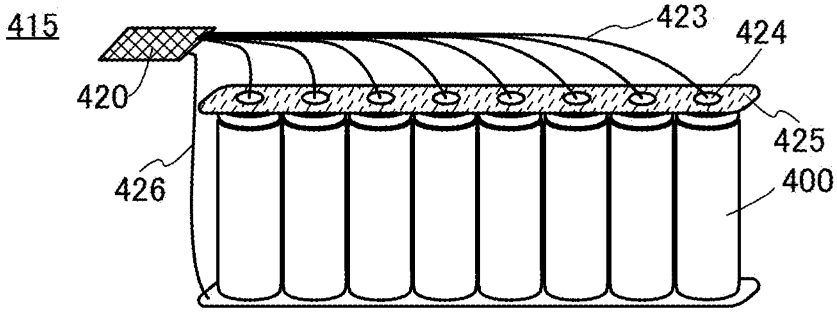

FIG. 23C illustrates an example of a power storage device 415. The power storage device 415 includes a plurality of secondary batteries 400. Positive electrodes of the secondary batteries are in contact with and electrically connected to conductors 424 isolated by an insulator 425. The conductor 424 is electrically connected to a control circuit 420 through a wiring 423. Negative electrodes of the secondary batteries are electrically connected to the control circuit 420 through a wiring 426. As the control circuit 420, the control circuit described in the above embodiment can be used.

Figure 23D:
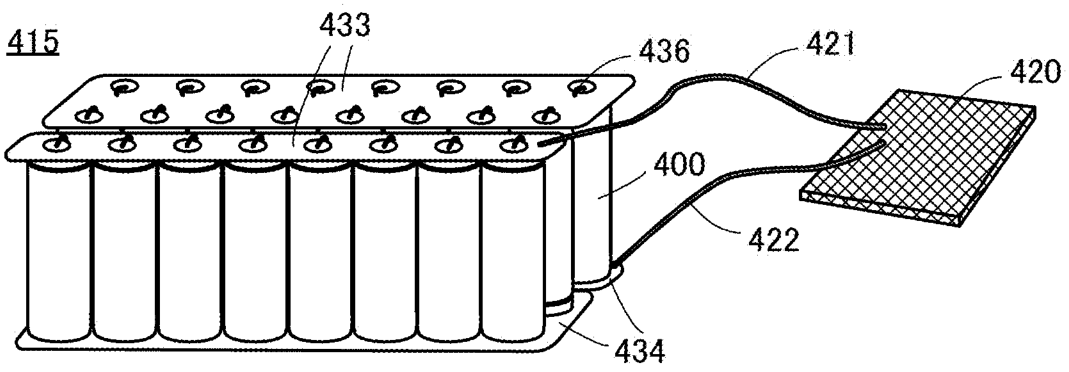

FIG. 23D illustrates an example of the power storage device 415. The power storage device 415 includes a plurality of secondary batteries 400, and the plurality of secondary batteries 400 are sandwiched between a conductive plate 433 and a conductive plate 434. The plurality of secondary batteries 400 are electrically connected to the conductive plate 433 and the conductive plate 434 through a wiring 436. The plurality of secondary batteries 400 may be connected in parallel, connected in series, or connected in series after being connected in parallel. With the power storage device 415 including the plurality of secondary batteries 400, large electric power can be extracted.

A temperature control device may be provided between the plurality of secondary batteries 400. When the secondary batteries 400 are heated excessively, the temperature control device can cool them, and when the secondary batteries 400 get too cold, the temperature control device can heat them. Thus, the performance of the power storage device 415 is not easily influenced by the outside temperature.

In FIG. 23D, the power storage device 415 is electrically connected to the control circuit 420 through a wiring 421 and a wiring 422. As the control circuit 420, the control circuit of a secondary battery described in the above embodiment can be used. The wiring 421 is electrically connected to the positive electrodes of the plurality of secondary batteries 400 through the conductive plate 433. The wiring 422 is electrically connected to the negative electrodes of the plurality of secondary batteries 400 through the conductive plate 434.

Figure 24A:
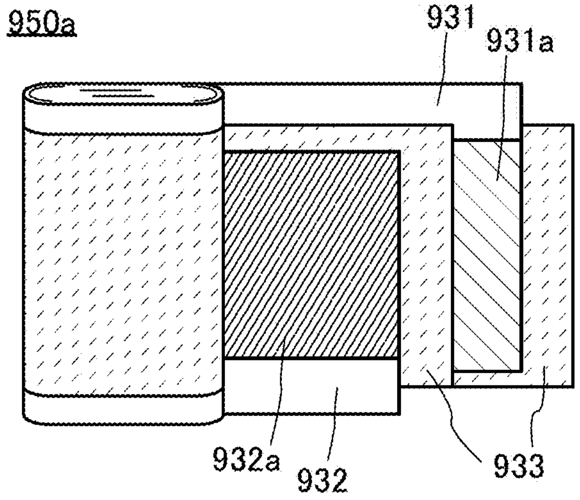
FIG. 24A, FIG. 24B, and FIG. 24C are diagrams illustrating an example of a secondary battery.
Figure 24B:
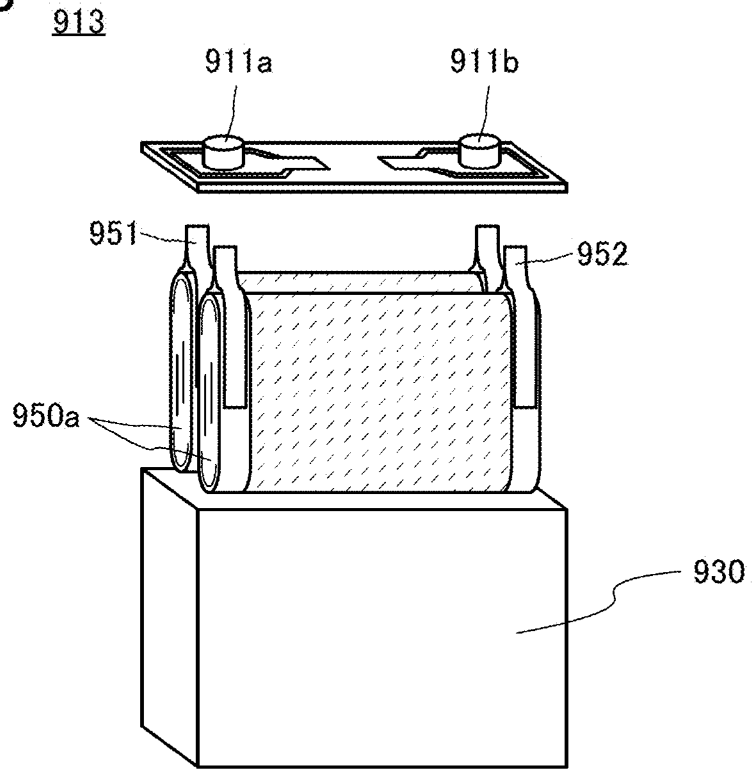
Figure 24C:
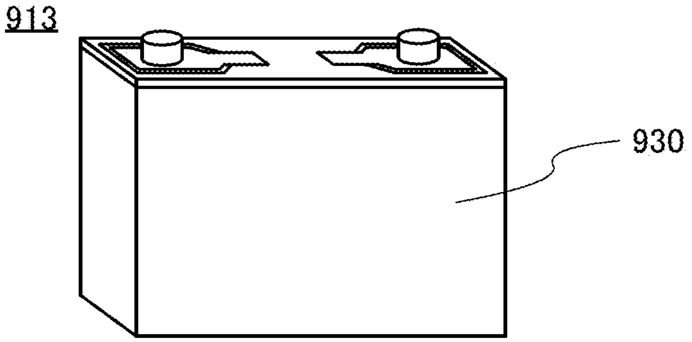

As illustrated in FIGS. 24A to 24C, a secondary battery 913 may include a wound body 950*a*. The wound body 950*a* illustrated in FIG. 24A includes a negative electrode 931, a positive electrode 932, and separators 933. The negative electrode 931 includes a negative electrode active material layer 931*a*. The positive electrode 932 includes a positive electrode active material layer 932*a*. The separator 933 has a larger width than the negative electrode active material layer 931*a* and the positive electrode active material layer 932*a*, and is wound to overlap the negative electrode active material layer 931*a* and the positive electrode active material layer 932*a*. In terms of safety, the width of the negative electrode active material layer 931*a* is preferably larger than that of the positive electrode active material layer 932*a*. The wound body 950*a* having such a shape is preferable because of its high degree of safety and high productivity.

As illustrated in FIG. 24B, the negative electrode 931 is electrically connected to a terminal 951. The terminal 951 is electrically connected to a terminal 911*a*. The positive electrode 932 is electrically connected to a terminal 952. The terminal 952 is electrically connected to a terminal 911*b*.

As illustrated in FIG. 24C, the wound body 950*a* and an electrolyte solution are covered with the housing 930, whereby the secondary battery 913 is obtained. The housing 930 is preferably provided with a safety valve, an overcurrent protection element, and the like.

As illustrated in FIG. 24B, the secondary battery 913 may include a plurality of wound bodies 950*a*. The use of the plurality of wound bodies 950*a* enables the secondary battery 913 to have higher charge and discharge capacity.

[Secondary Battery Pack]

Next, examples of a power storage device of one embodiment of the present invention will be described with reference to FIG. 25.

Figure 25A:
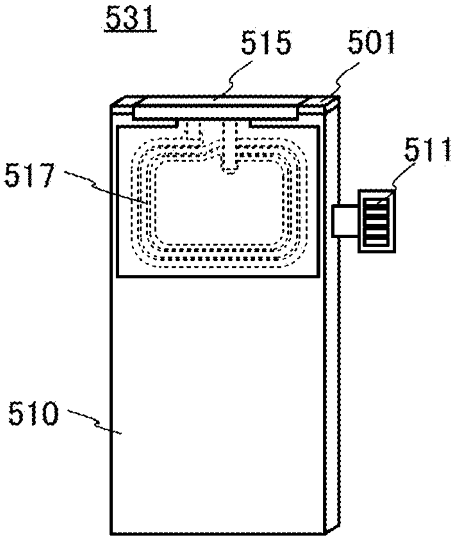
FIG. 25A, FIG. 25B, and FIG. 25C are diagrams illustrating examples of a secondary battery.
Figure 25B:
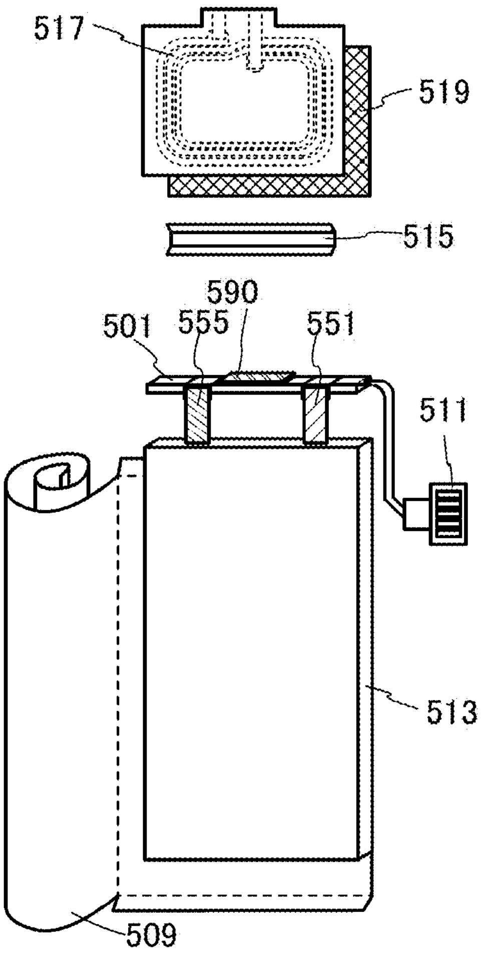

FIG. 25A is an external view of a secondary battery pack 531. FIG. 25B illustrates a structure of the secondary battery pack 531. The secondary battery pack 531 includes a circuit board 501 and a secondary battery 513. A label 509 is attached onto the secondary battery 513. The circuit board 501 is fixed by a sealant 515. The secondary battery pack 531 also includes an antenna 517.

The circuit board 501 includes a control circuit 590. As the control circuit 590, the control circuit described in the above embodiment can be used. For example, as illustrated in FIG. 25B, the control circuit 590 is provided over the circuit board 501. The circuit board 501 is electrically connected to a terminal 511. The circuit board 501 is electrically connected to the antenna 517, one 551 of a positive electrode lead and a negative electrode lead of the secondary battery 513, and the other 555 of the positive electrode lead and the negative electrode lead.

Figure 25C:
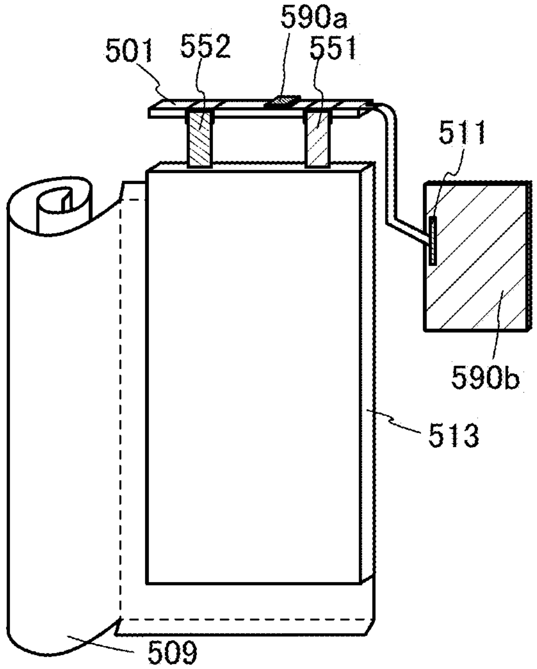

Alternatively, as illustrated in FIG. 25C, a circuit system 590*a* provided over the circuit 35 board 501 and a circuit system 590*b* electrically connected to the circuit board 501 through the terminal 511 may be included. For example, a part of the control circuit of one embodiment of the present invention is provided in the circuit system 590*a*, and another part of the control circuit of one embodiment of the present invention is provided in the circuit system 590*b*.

The shape of the antenna 517 is not limited to a coil shape and may be a linear shape or a plate shape. An antenna such as a planar antenna, an aperture antenna, a traveling-wave antenna, an EH antenna, a magnetic-field antenna, or a dielectric antenna may be used. Alternatively, the antenna 517 may be a flat-plate conductor. This flat-plate conductor can serve as one of conductors for electric field coupling. That is, the antenna 517 may serve as one of two conductors of a capacitor. Thus, electric power can be transmitted and received not only by an electromagnetic field or a magnetic field but also by an electric field.

The secondary battery pack 531 includes a layer 519 between the antenna 517 and the secondary battery 513. The layer 519 has a function of blocking an electromagnetic field from the secondary battery 513, for example. For the layer 519, a magnetic material can be used, for instance.

The secondary battery 513 is obtained, for example, by winding a sheet of a stack in which the negative electrode and the positive electrode overlap each other with the separator positioned therebetween.

This embodiment can be combined with any of the other embodiments as appropriate.

Embodiment 6

This embodiment will describe examples in which the power storage device of one embodiment of the present invention is mounted on a vehicle. Examples of vehicles include automobiles, motorcycles, and bicycles.

The use of power storage devices in vehicles enables production of next-generation clean 30 energy vehicles such as hybrid electric vehicles (HVs), electric vehicles (EVs), and plug-in hybrid electric vehicles (PHVs).

Figure 26A:
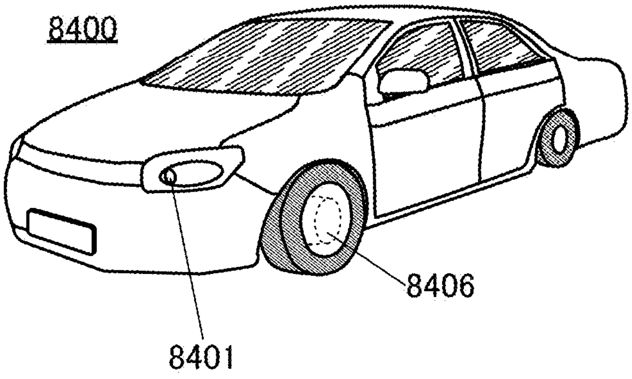
FIG. 26A, FIG. 26B, and FIG. 26C are diagrams illustrating electric devices of one embodiment of the present invention.

FIG. 26 illustrates examples of vehicles using the power storage device of one embodiment of the present invention. An automobile 8400 illustrated in FIG. 26A is an electric 35 vehicle that runs on the power of an electric motor as a power source. Alternatively, the automobile 8400 is a hybrid electric vehicle capable of driving appropriately using either an electric motor or an engine as a power source. The use of one embodiment of the present invention can achieve a high-mileage vehicle. The automobile 8400 includes a power storage device. The power storage device is used not only for driving an electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a navigation system or the like included in the automobile 8400.

Figure 26B:
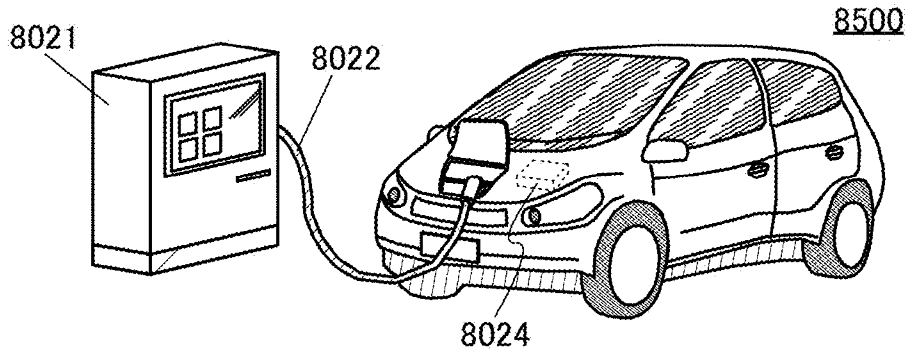

An automobile 8500 illustrated in FIG. 26B can be charged when a power storage device 8024 included in the automobile 8500 is supplied with electric power from external charge equipment by a plug-in system, a contactless power feeding system, or the like. FIG. 26B illustrates the state in which the power storage device 8024 included in the automobile 8500 is charged with a ground-based charge apparatus 8021 through a cable 8022. For charging, a given method such as CHAdeMO (registered trademark) or Combined Charging System is employed as a charge method, the standard of a connector, or the like as appropriate. The charge apparatus 8021 may be a charge station provided in a commerce facility or a household power source. With the use of a plug-in technique, the power storage device 8024 included in the automobile 8500 can be charged by being supplied with electric power from the outside, for example. The charge can be performed by converting AC electric power into DC electric power through a converter such as an AC-DC converter.

Furthermore, although not illustrated, the vehicle can include a power receiving device so as to be charged by being supplied with electric power from an above-ground power transmitting device in a contactless manner. In the case of the contactless power feeding system, by fitting a power transmitting device in a road, an exterior wall, or the like, charge can be performed not only when the vehicle is stopped but also when driven. The contactless power feeding system may be utilized to perform transmission and reception of electric power between vehicles. Furthermore, a solar cell may be provided in the exterior of the vehicle to charge the power storage device when the vehicle stops, moves, or the like. To supply electric power in such a contactless manner, an electromagnetic induction method, a magnetic resonance method, or the like can be used.

Figure 26C:
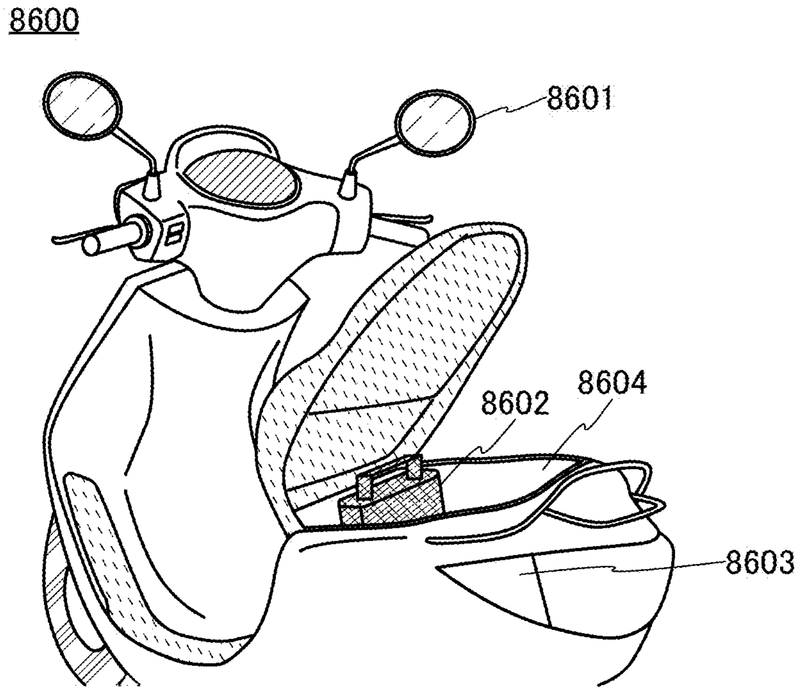

FIG. 26C shows an example of a motorcycle using the power storage device of one embodiment of the present invention. A motor scooter 8600 illustrated in FIG. 26C includes a power storage device 8602, side mirrors 8601, and indicator lights 8603. The power storage device 8602 can supply electricity to the indicator lights 8603.

In the motor scooter 8600 illustrated in FIG. 26C, the power storage device 8602 can be stored in an under-seat storage unit 8604. The power storage device 8602 can be stored in the under-seat storage unit 8604 even with a small size.

Figure 27A:
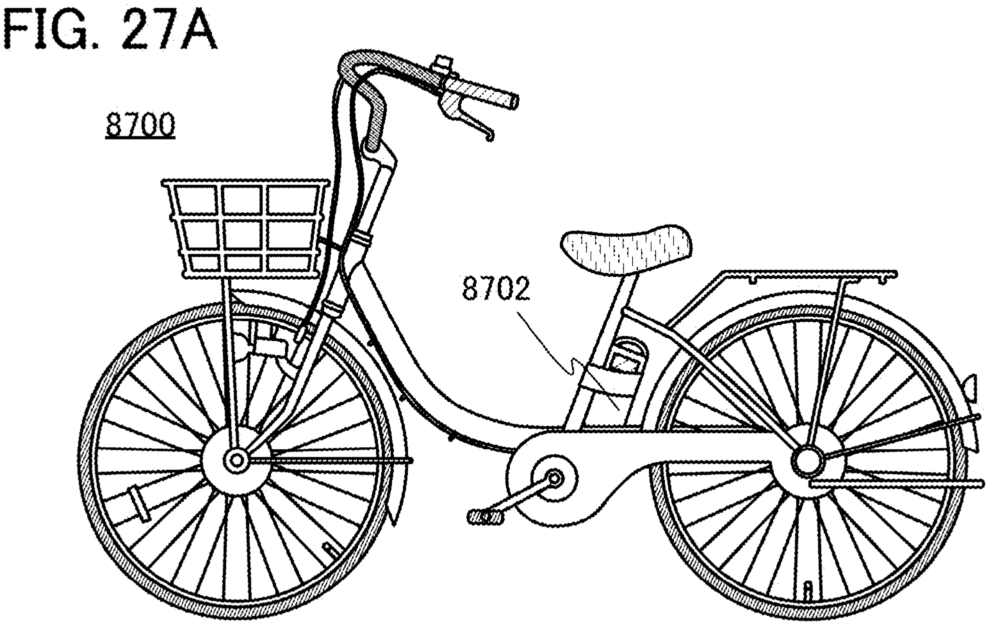
FIG. 27A and FIG. 27B are diagrams illustrating an electric device of one embodiment of the present invention.

FIG. 27A shows an example of an electric bicycle using the power storage device of one embodiment of the present invention. The power storage device of one embodiment of the present invention can be used for an electric bicycle 8700 illustrated in FIG. 27A. The power storage device of one embodiment of the present invention includes a plurality of storage batteries, a protection circuit, and a neural network, for example.

Figure 27B:
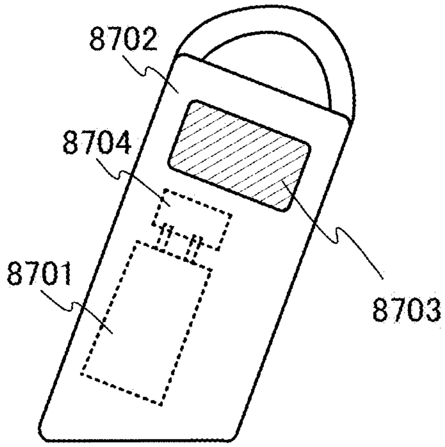

The electric bicycle 8700 includes a power storage device 8702. The power storage device 8702 can supply electricity to a motor that assists a rider. The power storage device 8702 is portable, and FIG. 27B illustrates the state where the power storage device 8702 is detached from the bicycle. A plurality of storage batteries 8701 included in the power storage device of one embodiment of the present invention are incorporated in the power storage device 8702, and the remaining battery capacity and the like can be displayed on a display portion 8703. The power storage device 8702 also includes a control circuit 8704 of one embodiment of the present invention. The control circuit 8704 is electrically connected to a positive electrode and a negative electrode of the storage battery 8701. The battery control circuit described in the above embodiment can be used as the control circuit 8704.

This embodiment can be combined with any of the other embodiments as appropriate.

Embodiment 7

This embodiment will describe examples in which the power storage device described in the above embodiment is mounted on an electronic device.

Figure 28A:
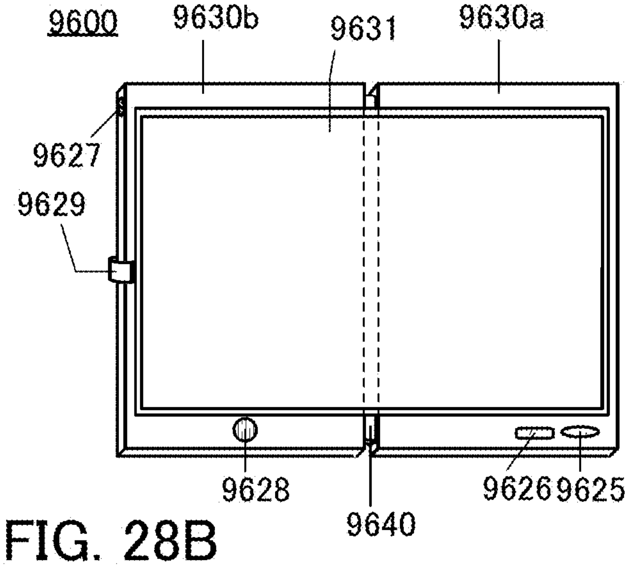
FIG. 28A, FIG. 28B, and FIG. 28C are diagrams illustrating electric devices of one embodiment of the present invention.
Figure 28B:
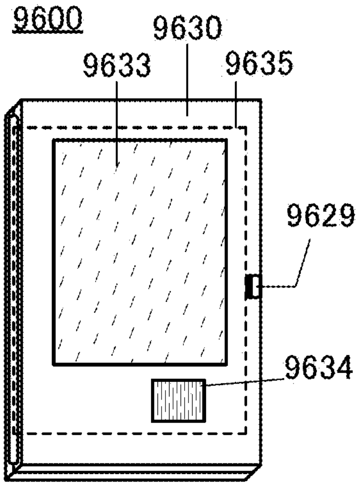

FIG. 28A and FIG. 28B illustrate an example of a tablet terminal that can be folded in 35 half (including a clamshell tablet). A tablet terminal 9600 illustrated in FIG. 28A and FIG. 28B includes a housing 9630*a*, a housing 9630*b*, a movable portion 9640 connecting the housing 9630*a* and the housing 9630*b*, a display portion 9631, a display mode changing switch 9626, a power switch 9627, a power saving mode changing switch 9625, a fastener 9629, and an operation switch 9628. A flexible panel is used for the display portion 9631, whereby a tablet terminal having a larger display portion can be provided. FIG. 28A illustrates the tablet terminal 9600 that is opened, and FIG. 28B illustrates the tablet terminal 9600 that is closed.

The tablet terminal 9600 includes a power storage unit 9635 inside the housing 9630*a* and the housing 9630*b*. The power storage unit 9635 is provided across the housing 9630*a* and the housing 9630*b*, passing through the movable portion 9640.

Part of the display portion 9631 can be a touch panel region, and data can be input when a displayed operation key is touched. When a position where a keyboard display switching button is displayed on the touch panel is touched with a finger, a stylus, or the like, keyboard buttons can be displayed on the display portion 9631.

The display mode changing switch 9626 can switch the display between a portrait mode and a landscape mode, and between monochrome display and color display, for example. With the power saving mode changing switch 9625, display luminance can be optimized in accordance with the amount of external light in use, which is detected with an optical sensor incorporated in the tablet terminal 9600. Another detection device including a sensor for detecting inclination, such as a gyroscope sensor or an acceleration sensor, may be incorporated in the tablet terminal, in addition to the optical sensor.

FIG. 28B is a closed state of the tablet terminal, and the tablet terminal includes the housing 9630, a solar cell 9633, and the power storage device of one embodiment of the present invention. The power storage device includes a control circuit 9634 and the power storage unit 9635. The battery control circuit described in the above embodiment can be used as the control circuit 9634.

The tablet terminal 9600 can be folded in half and thus can be folded such that the housing 9630*a* and the housing 9630*b* overlap with each other when not in use. Thus, the display portion 9631 can be protected owing to the folding, which increases the durability of the tablet terminal 9600.

The tablet terminal illustrated in FIG. 28A and FIG. 28B can also have a function of displaying various kinds of information (a still image, a moving image, a text image, and the like), a function of displaying a calendar, a date, the time, or the like on the display portion, a touch-input function of operating or editing information displayed on the display portion by touch input, a function of controlling processing by various kinds of software (programs), and the like.

The solar cell 9633, which is attached on the surface of the tablet terminal, supplies electric power to the touch panel, the display portion, an image signal processor, and the like. Note that the solar cell 9633 can be provided on one surface or both surfaces of the housing 9630, and the power storage unit 9635 can be charged efficiently.

Figure 28C:
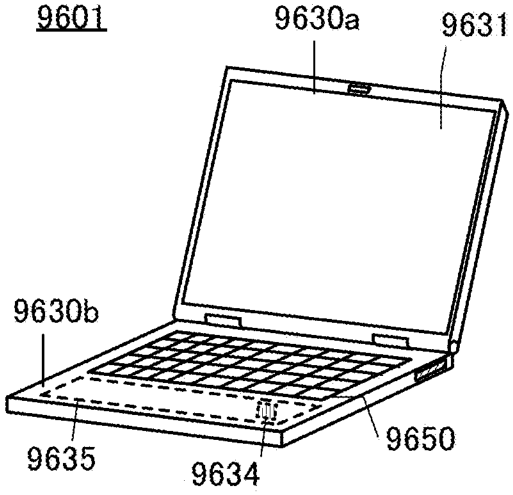

Note that although FIG. 28A and FIG. 28B illustrate a structure in which the control circuit using the battery control circuit described in the above embodiment is used for a tablet terminal that can be folded in half, another structure may be employed. For example, application to a laptop personal computer that is a clamshell terminal is possible as illustrated in FIG. 28C. FIG. 28C illustrates a laptop personal computer 9601 including a display portion 9631 in a housing 9630*a* and a keyboard portion 9650 in a housing 9630*b*. The laptop personal computer 9601 includes the control circuit 9634 and the power storage unit 9635, which are described with reference to FIG. 28A and FIG. 28B. The battery control circuit described in the above embodiment can be used as the control circuit 9634.

Figure 29:
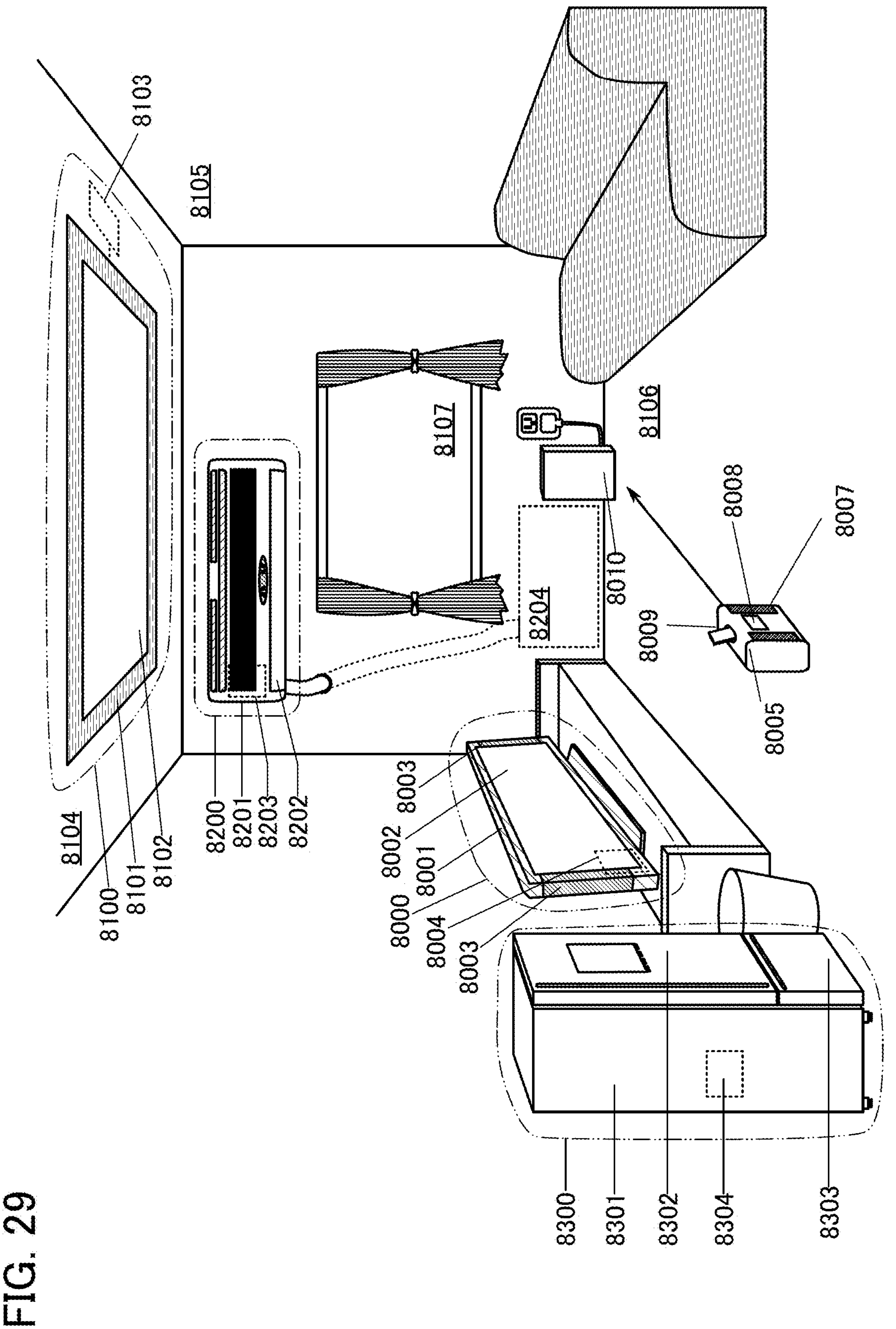
FIG. 29 is a diagram illustrating electric devices of one embodiment of the present invention.

FIG. 29 illustrates other examples of electronic devices. In FIG. 29, a display device 8000 is an example of an electronic device including the power storage device of one embodiment of the present invention. Specifically, the display device 8000 corresponds to a display device for TV broadcast reception and includes a housing 8001, a display portion 8002, speaker portions 8003, a secondary battery 8004, and the like. A detection system according to one embodiment of the present invention is provided in the housing 8001. The display device 8000 can receive electric power from a commercial power supply and can use electric power stored in the secondary battery 8004.

A semiconductor display device such as a liquid crystal display device, a light-emitting device in which a light-emitting element such as an organic EL element is provided in each pixel, an electrophoresis display device, a DMD (Digital Micromirror Device), a PDP (Plasma Display Panel), or an FED (Field Emission Display) can be used for the display portion 8002.

An audio input device 8005 also uses a secondary battery. The audio input device 8005 includes the power storage device described in the above embodiment. The audio input device 8005 includes a plurality of sensors (e.g., an optical sensor, a temperature sensor, a humidity sensor, a pressure sensor, an illuminance sensor, and a motion sensor) including a microphone, in addition to wireless communication elements. In accordance with an instruction spoken by a user, the audio input device 8005 can operate another device, for example, control power on/off of the display device 8000 and adjust the amount of light from a lighting device 8100. The audio input device 8005 is capable of operating a peripheral device with voice and substitutes for a manual remote controller.

The audio input device 8005 includes a wheel, a mechanical transfer means, and the like and is configured to be capable of, while listening to an instruction precisely with the incorporated microphone by moving in the direction in which speaking by the user can be heard, displaying the content on a display portion 8008 or performing touch input operation on the display portion 8008.

The audio input device 8005 can also function as a charging dock of a portable information terminal 8009 such as a smartphone. Electric power can be transmitted and received with a wire or wirelessly between the portable information terminal 8009 and the audio input device 8005. The portable information terminal 8009 does not particularly need to be carried indoors, and a load on the secondary battery and degradation thereof are desirably avoided while a necessary capacity is ensured. Thus, management, maintenance, and the like of the secondary battery are desirably performed by the audio input device 8005. Since the audio input device 8005 includes the speaker 8007 and the microphone, hands-free conversation is possible even while the portable information terminal 8009 is charged. When the capacity of the secondary battery of the audio input device 8005 decreases, the audio input device 8005 moves in the direction indicated by the arrow and is charged by wireless charging from a charging module 8010 connected to an external power source.

The audio input device 8005 may be put on a stand. The audio input device 8005 may be provided with a wheel, a mechanical transfer means, and the like to move to a desired position. Alternatively, without having a stand, a wheel, and the like, the audio input device 8005 may be fixed to a desired position, for example, on the floor or the like.

Note that the display device includes, in its category, all of information display devices for personal computers, advertisement displays, and the like besides for TV broadcast reception.

In FIG. 29, the installation lighting device 8100 is an example of an electronic device using a secondary battery 8103 that is controlled by a microprocessor for controlling charge (including an APS). Specifically, the lighting device 8100 includes a housing 8101, a light source 8102, the secondary battery 8103, and the like. Although FIG. 29 illustrates an example of the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply and can use electric power stored in the secondary battery 8103.

Note that although the installation lighting device 8100 provided on the ceiling 8104 is illustrated in FIG. 29 as an example, the secondary battery 8103 can be used in an installation lighting device provided in, for example, a side wall 8105, a floor 8106, a window 8107, or the like other than the ceiling 8104. Alternatively, the secondary battery can be used in a tabletop lighting device or the like.

As the light source 8102, an artificial light source that emits light artificially by using electric power can be used. Specific examples of the artificial light source include an incandescent lamp, a discharge lamp such as a fluorescent lamp, and light-emitting elements such as an LED and an organic EL element are given as.

In FIG. 29, an air conditioner including an indoor unit 8200 and an outdoor unit 8204 is an example of an electronic device using a secondary battery 8203. Specifically, the indoor unit 8200 includes a housing 8201, an air outlet 8202, the secondary battery 8203, and the like. Although FIG. 29 illustrates an example of the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply and can use electric power stored in the secondary battery 8203.

In FIG. 29, an electric refrigerator-freezer 8300 is an example of an electronic device using a secondary battery 8304. Specifically, the electric refrigerator-freezer 8300 includes a housing 8301, a refrigerator door 8302, a freezer door 8303, the secondary battery 8304, and the like. The secondary battery 8304 is provided in the housing 8301 in FIG. 29. The electric refrigerator-freezer 8300 can receive electric power from a commercial power supply and can use electric power stored in the secondary battery 8304.

In addition, in a time period when electronic devices are not used, particularly when the proportion of the amount of electric power that is actually used to the total amount of electric power that can be supplied from a commercial power supply source (such a proportion is referred to as a usage rate of electric power) is low, electric power is stored in the secondary battery, whereby the usage rate of electric power can be reduced in a time period other than the above time period. For example, in the case of the electric refrigerator-freezer 8300, electric power is stored in the secondary battery 8304 in night time when the temperature is low and the refrigerator door 8302 and the freezer door 8303 are not opened and closed. On the other hand, in daytime when the temperature is high and the refrigerator door 8302 and the freezer door 8303 are opened and closed, the secondary battery 8304 is used as an auxiliary power supply; thus, the usage rate of electric power in daytime can be reduced.

A secondary battery can be provided in any electronic device other than the above-described electronic devices. According to one embodiment of the present invention, the secondary battery can have excellent cycle characteristics. Thus, a microprocessor that controls charge (including an APS) of one embodiment of the present invention is mounted on the electronic device described in this embodiment, whereby an electronic device with a longer lifetime can be obtained. This embodiment can be implemented in appropriate combination with the other embodiments.

FIG. 30A to FIG. 30E show examples in which the power storage device of one embodiment of the present invention is mounted on an electronic device. Examples of electronic devices using the power storage device of one embodiment of the present invention include television sets (also referred to as televisions or television receivers), monitors of computers and the like, digital cameras, digital video cameras, digital photo frames, mobile phones (also referred to as cellular phones or mobile phone devices), portable game machines, portable information terminals, audio reproducing devices, and large game machines such as pachinko machines.

Figure 30A:
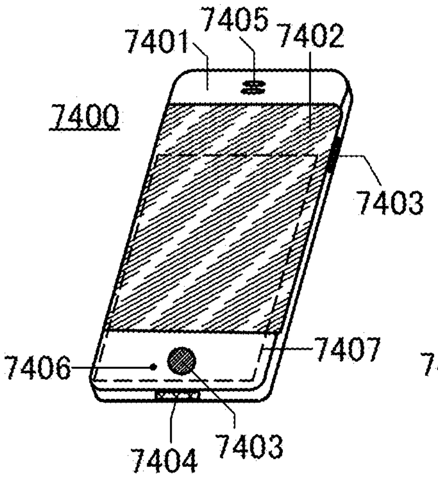
FIG. 30A, FIG. 30B, FIG. 30C, FIG. 30D, and FIG. 30E are diagrams illustrating electronic devices.

FIG. 30A illustrates an example of a mobile phone. A mobile phone 7400 includes an operation button 7403, an external connection port 7404, a speaker 7405, a microphone 7406, and the like in addition to a display portion 7402 incorporated in a housing 7401. The mobile phone 7400 includes the power storage device of one embodiment of the present invention. The power storage device of one embodiment of the present invention includes, for example, a storage battery 7407 and the battery control circuit described in the above embodiment.

Figure 30B:
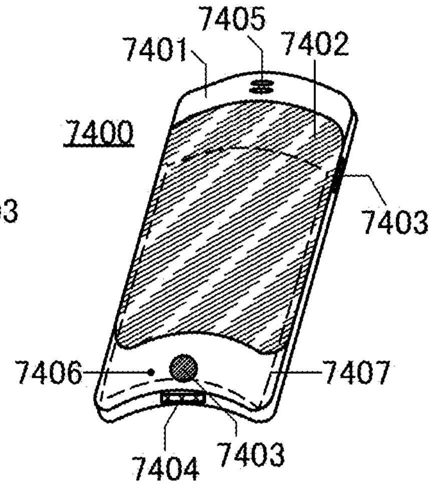
Figure 30C:
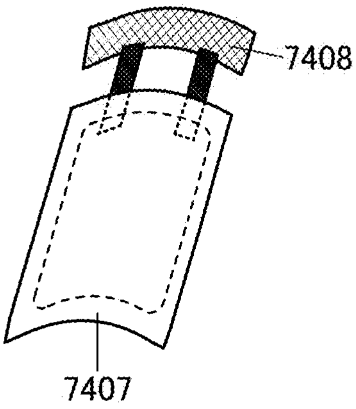

FIG. 30B illustrates the mobile phone 7400 in a bent state. When the mobile phone 7400 is entirely curved by external force, the storage battery 7407 provided therein is also curved in some cases. In such a case, a storage battery having flexibility is preferably used as the storage battery 7407. FIG. 30C illustrates the state where the storage battery having flexibility is curved. A control circuit 7408 is electrically connected to the storage battery. The battery control circuit described in the above embodiment can be used as the control circuit 7408.

A storage battery having a flexible shape can also be incorporated along a curved surface of an inside wall or an outside wall of a house or a building, or an interior or an exterior of an automobile, or the like.

Figure 30D:
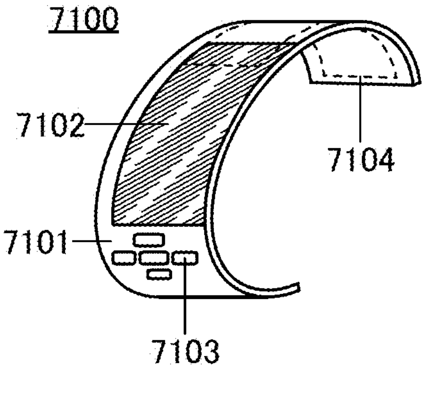

FIG. 30D illustrates an example of a bangle-type display device. A portable display device 7100 includes a housing 7101, a display portion 7102, operation buttons 7103, and the power storage device of one embodiment of the present invention. The power storage device of one embodiment of the present invention includes, for example, a storage battery 7104 and the battery control circuit described in the above embodiment.

Figure 30E:
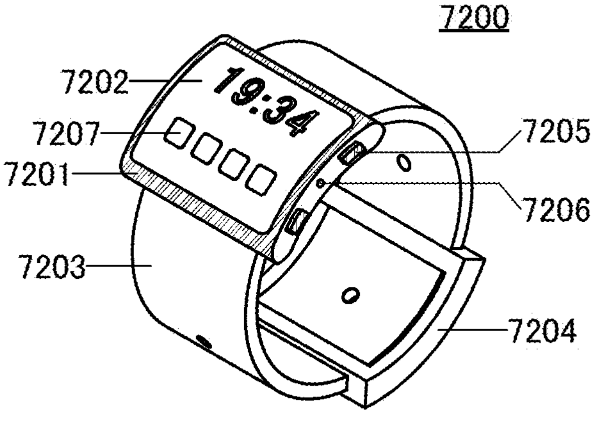

FIG. 30E illustrates an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can employ near field communication based on an existing communication standard. For example, mutual communication between the portable information terminal 7200 and a headset capable of wireless communication can be performed, and thus hands-free calling is possible.

The portable information terminal 7200 includes the input/output terminal 7206, and data can be directly transmitted to and received from another information terminal via a connector. In addition, charge via the input/output terminal 7206 is possible. Note that the charge operation may be performed by wireless power feeding without using the input/output terminal 7206.

The portable information terminal 7200 includes the power storage device of one embodiment of the present invention. The power storage device includes a storage battery and the battery control circuit described in the above embodiment.

The portable information terminal 7200 preferably includes a sensor. As the sensor, for example, a human body sensor such as a fingerprint sensor, a pulse sensor, or a temperature sensor, a touch sensor, a pressure sensitive sensor, and an acceleration sensor are preferably mounted.

This embodiment can be combined with any of the other embodiments as appropriate.

Embodiment 8

In this embodiment, examples of electronic devices or moving vehicles each including the power storage device of one embodiment of the present invention will be described.

First, FIG. 31A to FIG. 31D illustrate examples of electronic devices each including the power storage device described in the above embodiment. Examples of the electronic device including the bendable battery include television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines.

The power storage device can also be used in moving vehicles, typically automobiles. Examples of the automobiles include next-generation clean energy vehicles such as hybrid vehicles (HVs), electric vehicles (EVs), and plug-in hybrid vehicles (PHVs), and the power storage device can be used as one of the power sources provided for the automobiles. The moving vehicle is not limited to an automobile. Examples of moving vehicles include a train, a monorail train, a ship, a flying object (a helicopter, an unmanned aircraft (a drone), an airplane, and a rocket), an electric bicycle, and an electric motorcycle, and these moving vehicles can include the power storage device of one embodiment of the present invention.

The power storage device of this embodiment may be used in a ground-based charge apparatus provided for a house, a charge station provided in a commerce facility, or the like.

Figure 31A:
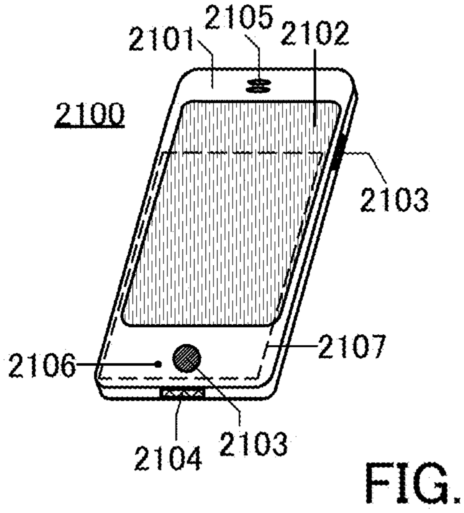
FIG. 31A, FIG. 31B, FIG. 31C, and FIG. 31D are diagrams illustrating electronic devices.

FIG. 31A illustrates an example of a mobile phone. A mobile phone 2100 includes a housing 2101 in which a display portion 2102 is incorporated, an operation button 2103, an external connection port 2104, a speaker 2105, a microphone 2106, and the like. Note that the mobile phone 2100 includes a power storage device 2107.

The mobile phone 2100 is capable of executing a variety of applications such as mobile phone calls, e-mailing, viewing and editing texts, music reproduction, Internet communication, and computer games.

With the operation button 2103, a variety of functions such as time setting, power on/off operation, wireless communication on/off operation, execution and cancellation of a silent mode, and execution and cancellation of a power saving mode can be performed. For example, the functions of the operation button 2103 can also be set freely by an operating system incorporated in the mobile phone 2100.

In addition, the mobile phone 2100 can execute near field communication conformable to a communication standard. For example, mutual communication with a headset capable of wireless communication allows hands-free calling.

Moreover, the mobile phone 2100 includes the external connection port 2104, and data can be directly transmitted to and received from another information terminal via a connector. In addition, charge can be performed via the external connection port 2104. Note that the charge operation may be performed by wireless power feeding without using the external connection port 2104.

The mobile phone 2100 preferably includes a sensor. As the sensor, for example, a human body sensor such as a fingerprint sensor, a pulse sensor, or a temperature sensor, a touch sensor, a pressure sensitive sensor, or an acceleration sensor is preferably mounted.

Figure 31B:
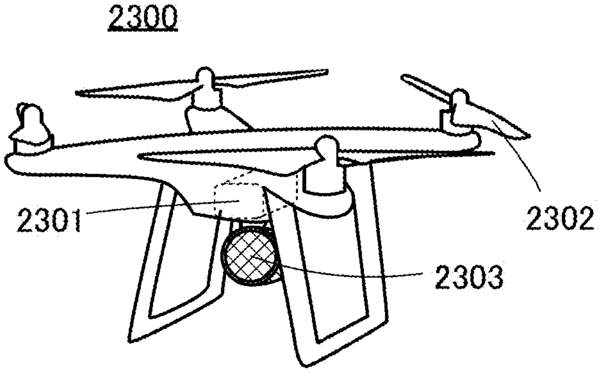

FIG. 31B illustrates an unmanned aircraft 2300 including a plurality of rotors 2302. The unmanned aircraft 2300 is also referred to as a drone. The unmanned aircraft 2300 includes a power storage device 2301 of one embodiment of the present invention, a camera 2303, and an antenna (not illustrated). The unmanned aircraft 2300 can be remotely controlled through the antenna.

Figure 31C:
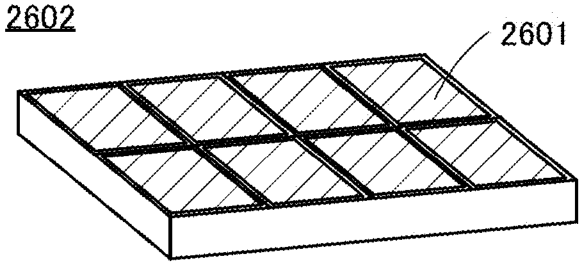

Furthermore, as illustrated in FIG. 31C, a power storage device 2602 including a plurality of power storage devices 2601 of one embodiment of the present invention may be mounted on a hybrid electric vehicle (HEV), an electric vehicle (EV), a plug-in hybrid electric vehicle (PHEV), or another electronic device.

Figure 31D:
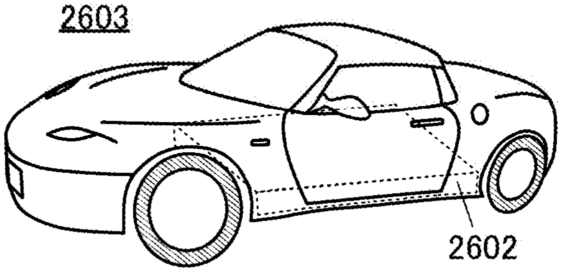

FIG. 31D illustrates an example of a vehicle including the power storage device 2602. A vehicle 2603 is an electric vehicle that runs using an electric motor as a power source. Alternatively, the vehicle 2603 is a hybrid electric vehicle that can run using a power source appropriately selected from an electric motor and an engine. The vehicle 2603 using the electric motor includes a plurality of ECUs (Electronic Control Units) and performs engine control by the ECUs. The ECU includes a microcomputer. The ECU is connected to a CAN (Controller Area Network) provided in the electric vehicle. The CAN is a type of a serial communication standard used as an in-vehicle LAN.

The power storage device not only drives the electric motor (not illustrated) but also can supply electric power to a light-emitting device such as a headlight or a room light. Furthermore, the power storage device can supply electric power to a display device and a semiconductor device included in the vehicle 2603, such as a speedometer, a tachometer, and a navigation system.

In the vehicle 2603, the power storage devices included in the power storage device 2602 can be charged by being supplied with electric power from external charge equipment by a plug-in system, a contactless power feeding system, and the like.

Figure 32A:
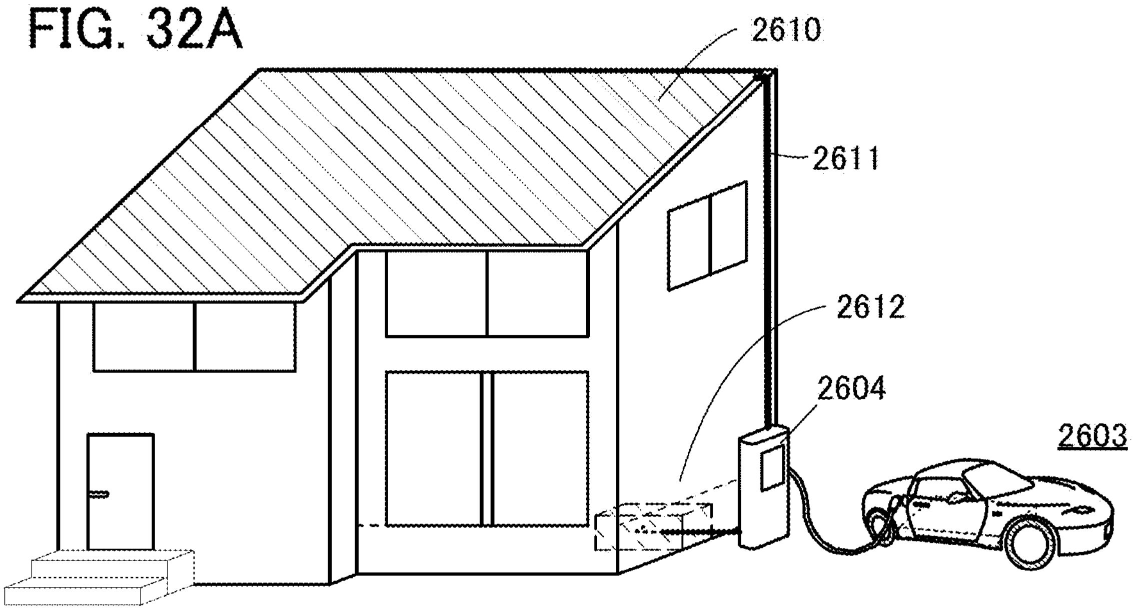
FIG. 32A and FIG. 32B are diagrams illustrating a system.

FIG. 32A illustrates a state in which the vehicle 2603 is supplied with electric power from ground-based charge equipment 2604 through a cable. In charging, a given method such as CHAdeMO (registered trademark) or Combined Charging System may be employed as a charge method, the standard of a connector, or the like as appropriate. For example, with a plug-in technique, the power storage device 2602 mounted on the vehicle 2603 can be charged by being supplied with electric power from the outside. The charge can be performed by converting AC power into DC power through a converter such as an ACDC converter. The charge equipment 2604 may be provided for a house as illustrated in FIG. 32A, or may be a charge station provided in a commercial facility.

Although not illustrated, the vehicle can include a power receiving device so as to be charged by being supplied with electric power from an above-ground power transmitting device in a contactless manner. In the case of the contactless power feeding system, by fitting a power transmitting device in a road, an exterior wall, or the like, charge can be performed not only when the vehicle is stopped but also when driven. In addition, this contactless power feeding system may be utilized to transmit and receive electric power between vehicles. Furthermore, a solar cell may be provided in the exterior of the vehicle to charge the power storage device when the vehicle stops, moves, or the like. To supply electric power in such a contactless manner, an electromagnetic induction method, a magnetic resonance method, or the like can be used.

Next, an example of the power storage device of one embodiment of the present invention is described with reference to FIG. 32A and FIG. 32B.

A house illustrated in FIG. 32A includes a power storage device 2612 including the power storage device of one embodiment of the present invention and a solar panel 2610. The power storage device 2612 is electrically connected to the solar panel 2610 through a wiring 2611 or the like. The power storage device 2612 may be electrically connected to a ground-based charge equipment 2604. The power storage device 2612 can be charged with electric power generated by the solar panel 2610. The power storage device 2602 included in the vehicle 2603 can be charged with the electric power stored in the power storage device 2612 through the charge equipment 2604. The power storage device 2612 is preferably provided in an underfloor space. The power storage device 2612 is provided in the underfloor space, in which case the space on the floor can be effectively used. Alternatively, the power storage device 2612 may be provided on the floor.

The electric power stored in the power storage device 2612 can also be supplied to other electronic devices in the house. Thus, with the use of the power storage device 2612 of one embodiment of the present invention as an uninterruptible power source, electronic devices can be used even when electric power cannot be supplied from a commercial power source due to power failure or the like.

Figure 32B:
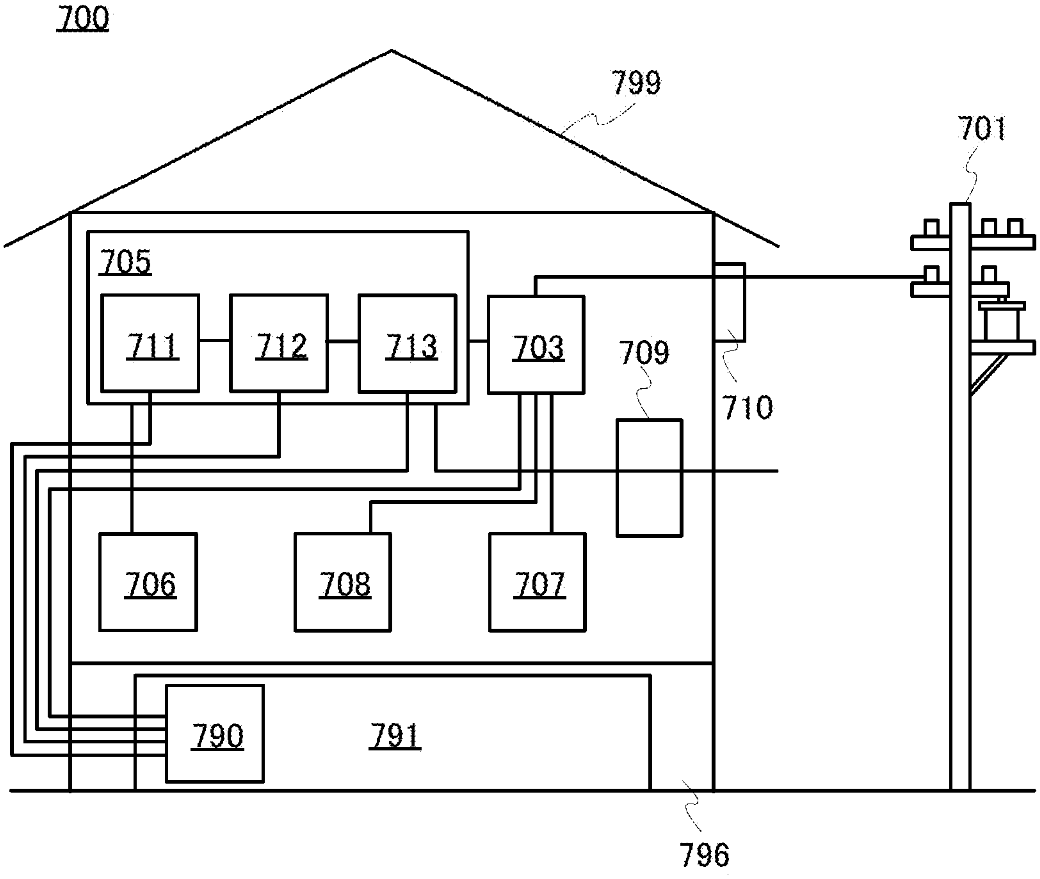

FIG. 32B illustrates an example of a power storage device 700 of one embodiment of the present invention. As illustrated in FIG. 32B, a power storage device 791 of one embodiment of the present invention is provided in an underfloor space 796 of a building 799.

The power storage device 791 is provided with a control device 790, and the control device 790 is electrically connected to a distribution board 703, a power storage controller (also referred to as control device) 705, an indicator 706, and a router 709 through wirings.

Electric power is transmitted from a commercial power source 701 to the distribution board 703 through a service wire mounting portion 710. Moreover, electric power is transmitted to the distribution board 703 from the power storage device 791 and the commercial power source 701, and the distribution board 703 supplies the transmitted electric power to a general load 707 and a power storage load 708 through outlets (not illustrated).

The general load 707 is, for example, an electric device such as a TV or a personal computer. The power storage load 708 is, for example, an electric device such as a microwave, a refrigerator, or an air conditioner.

The power storage controller 705 includes a measuring portion 711, a predicting portion 712, and a planning portion 713. The measuring portion 711 has a function of measuring the amount of electric power consumed by the general load 707 and the power storage load 708 during a day (e.g., from midnight to midnight). The measuring portion 711 may have a function of measuring the amount of electric power of the power storage device 791 and the amount of electric power supplied from the commercial power source 701. The predicting portion 712 has a 35 function of predicting, on the basis of the amount of electric power consumed by the general load 707 and the power storage load 708 during a given day, the demand for electric power consumed by the general load 707 and the power storage load 708 during the next day. The planning portion 713 has a function of making a charge and discharge plan of the power storage device 791 on the basis of the demand for electric power predicted by the predicting portion 712.

The amount of electric power consumed by the general load 707 and the power storage load 708 and measured by the measuring portion 711 can be checked with the indicator 706. It can be checked with an electric device such as a TV or a personal computer through the router 709. Furthermore, it can be checked with a portable electronic terminal such as a smartphone or a tablet through the router 709. With the indicator 706, the electric device, or the portable electronic terminal, for example, the demand for electric power depending on a time period (or per hour) that is predicted by the predicting portion 712 can be checked.

This embodiment can be implemented in appropriate combination with any of the other embodiments.

(Notes on Description of this Specification and the Like)

The description of the above embodiments and each structure in the embodiments are noted below.

One embodiment of the present invention can be constituted by appropriately combining the structure described in an embodiment with the structures described in the other embodiments. In addition, in the case where a plurality of structure examples are described in one embodiment, the structure examples can be combined as appropriate.

Note that content (or part of the content) described in one embodiment can be applied to, combined with, or replaced with another content (or part of the content) described in the embodiment and/or content (or part of the content) described in another embodiment or other embodiments.

Note that in each embodiment, content described in the embodiment is content described using a variety of diagrams or content described with text disclosed in the specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be formed.

In this specification and the like, components are classified on the basis of the functions and shown as independent blocks in block diagrams. However, in an actual circuit or the like, it is difficult to separate components on the basis of the functions, and there are such a case where one circuit is associated with a plurality of functions and a case where a plurality of circuits are associated with one function. Therefore, blocks in the block diagrams are not limited by the components described in the specification, and the description can be changed appropriately depending on the situation.

In the drawings, the size, the layer thickness, or the region is shown with given magnitude for description convenience. Therefore, the size, the layer thickness, or the region is not necessarily limited to the illustrated scale. Note that the drawings are schematically shown for clarity, and embodiments of the present invention are not limited to shapes, values or the like shown in the drawings. For example, variation in signal, voltage, or current due to noise, variation in signal, voltage, or current due to difference in timing, or the like can be included.

In this specification and the like, expressions "one of a source and a drain" (or a first electrode or a first terminal) and "the other of the source and the drain" (or a second electrode or a second terminal) for the other of the source and the drain are used in the description of the connection relation of a transistor. This is because the source and the drain of the transistor change depending on the structure, operating conditions, or the like of the transistor. Note that the source or the drain of the transistor can also be referred to as a source (drain) terminal, a source (drain) electrode, or the like as appropriate depending on the situation.

In this specification and the like, the terms "electrode," "wiring," and the like do not functionally limit these components. For example, an "electrode" is used as part of a "wiring" in some cases, and vice versa. Furthermore, the term "electrode," "wiring," or the like also includes the case where a plurality of "electrodes," "wirings," or the like are formed in an integrated manner, for example.

In this specification and the like, "voltage" and "potential" can be interchanged with each other as appropriate. The voltage refers to a potential difference from a reference potential, and when the reference potential is a ground voltage, for example, the voltage can be rephrased into the potential. The ground potential does not necessarily mean 0 V. Note that potentials are relative values, and a potential applied to a wiring or the like is sometimes changed depending on the reference potential.

Note that in this specification and the like, the terms such as "film" and "layer" can be interchanged with each other depending on the case or according to circumstances. For example, the term "conductive layer" can be changed into the term "conductive film" in some cases. As another example, the term "insulating film" can be changed into the term "insulating layer" in some cases.

In this specification and the like, a switch has a function of being in a conducting state (on state) or a non-conducting state (off state) to determine whether a current flows or not. Alternatively, a switch has a function of selecting and changing a current path.

In this specification and the like, channel length refers to, for example, the distance between a source and a drain in a region where a semiconductor (or a portion where a current flows in a semiconductor when a transistor is in an on state) and a gate overlap with each other or a region where a channel is formed in a top view of the transistor.

In this specification and the like, channel width refers to, for example, the length of a portion where a source and a drain face each other in a region where a semiconductor (or a portion where a current flows in a semiconductor when a transistor is in an on state) and a gate electrode overlap with each other or a region where a channel is formed.

In this specification and the like, the expression "A and B are connected" includes the case where A and B are electrically connected as well as the case where A and B are directly connected. Here, the expression "A and B are electrically connected" means the case where electrical signals can be transmitted and received between A and B when an object having any electric action exists between A and B.

REFERENCE NUMERALS

BG1 to BG3: back gate potential, C1 to C3: capacitor, FC1 to FC3: capacitor, FM1 to FM4: transistor, M1: transistor, M2: transistor, M3: transistor, M4: transistor, S: selection signal, 100: semiconductor device, 110: secondary battery, 120: control circuit, 130: load, 140: charger, 150: power transistor This application is based on Japanese Patent Application Serial No. 2020-149603 filed on Sep. 7, 2020, the entire contents are hereby incorporated herein by reference.

The invention claimed is:

1. A semiconductor device comprising:
a first transistor;
a first voltage generation circuit configured to generate a first voltage; and
a second voltage generation circuit configured to generate a second voltage,
wherein the first voltage generation circuit comprises a second transistor and a first capacitor,
wherein the second voltage generation circuit comprises a third transistor and a second capacitor, and
wherein a difference between the first voltage and the second voltage is set in accordance with a threshold voltage of the first transistor.

2. The semiconductor device according to claim 1,
wherein channels of the first transistor to the third transistor comprise oxide semiconductors.

3. The semiconductor device according to claim 1,
wherein channels of the first transistor to the third transistor comprise silicon.

4. An electric device comprising:
a housing;
a secondary battery inside the housing; and
the semiconductor device according to claim 1 inside the housing.

5. The semiconductor device according to claim 1,
wherein channels of the first transistor to the third transistor comprise indium oxide.

6. An electric device comprising:
a secondary battery;
the semiconductor device according to claim 1; and
a load,
wherein the secondary battery is connected to the load via the semiconductor device.

7. A semiconductor device comprising:
a first transistor;
a first voltage generation circuit configured to generate a first voltage;
a second voltage generation circuit configured to generate a second voltage; and
a voltage retention circuit,
wherein the first voltage generation circuit comprises a second transistor and a first capacitor,
wherein the second voltage generation circuit comprises a third transistor and a second capacitor,
wherein the first transistor comprises a back gate,
wherein the voltage retention circuit is configured to retain a voltage of the back gate, and
wherein a difference between the first voltage and the second voltage is set in accordance with a threshold voltage of the first transistor.

8. The semiconductor device according to claim 7,
wherein the voltage retention circuit comprises a fourth transistor and a third capacitor,
wherein the third capacitor comprises a ferroelectric layer between a pair of electrodes, and
wherein the third capacitor is configured to retain a voltage applied to the back gate by being applied with a voltage for polarization inversion in the ferroelectric layer.

9. The semiconductor device according to claim 8,
wherein the ferroelectric layer comprises at least one of hafnium oxide and zirconium oxide.

10. The semiconductor device according to claim 7,
wherein channels of the first transistor to the third transistor comprise oxide semiconductors.

11. The semiconductor device according to claim 7,
wherein channels of the first transistor to the third transistor comprise silicon.

12. An electric device comprising:
a housing;
a secondary battery inside the housing; and
the semiconductor device according to claim 7 inside the housing.

13. The semiconductor device according to claim 7,
wherein channels of the first transistor to the third transistor comprise indium oxide.

14. An electric device comprising:
a secondary battery;
the semiconductor device according to claim 7; and
a load,
wherein the secondary battery is connected to the load via the semiconductor device.

* * * * *